US012568184B2

(12) United States Patent
Reda et al.

(10) Patent No.: US 12,568,184 B2
(45) Date of Patent: Mar. 3, 2026

(54) TECHNIQUES TO GENERATE INTERPOLATED VIDEO FRAMES

(71) Applicant: NVIDIA Corporation, Santa Clara, CA (US)

(72) Inventors: Fitsum Reda, Santa Clara, CA (US); Karan Sapra, Santa Clara, CA (US); Robert Thomas Pottorff, Santa Clara, CA (US); Shiqiu Liu, Santa Clara, CA (US); Andrew Tao, Los Altos, CA (US); Bryan Christopher Catanzaro, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/944,071

(22) Filed: Jul. 30, 2020

(65) Prior Publication Data

US 2022/0038654 A1 Feb. 3, 2022

(51) Int. Cl.
H04N 7/01 (2006.01)

(52) U.S. Cl.
CPC ................................... H04N 7/014 (2013.01)

(58) Field of Classification Search
CPC ...................................................... H04N 7/014
See application file for complete search history.

(56) References Cited

U.S. PATENT DOCUMENTS

| | | | | | |
|---|---|---|---|---|---|
| 5,612,745 | A | * | 3/1997 | Ozcelik | H04N 19/553 |
| | | | | | 375/240.12 |
| 6,192,079 | B1 | | 2/2001 | Sharma et al. | |

| | | | | | |
|---|---|---|---|---|---|
| 6,618,439 | B1 | * | 9/2003 | Kuo | H04N 19/537 |
| | | | | | 375/240.16 |
| 6,792,043 | B1 | * | 9/2004 | Takahashi | G06F 16/7864 |
| | | | | | 375/240.01 |
| 8,085,986 | B2 | * | 12/2011 | Oyaizu | H04N 5/217 |
| | | | | | 382/107 |
| 8,335,257 | B2 | | 12/2012 | Nair et al. | |
| 8,787,443 | B2 | | 7/2014 | Sun et al. | |
| 8,902,359 | B1 | * | 12/2014 | Biswas | H04N 7/0137 |
| | | | | | 348/452 |
| 10,110,914 | B1 | * | 10/2018 | Chen | H04N 19/54 |

(Continued)

FOREIGN PATENT DOCUMENTS

| | | |
|---|---|---|
| CN | 105874783 A | 8/2016 |
| CN | 113711207 | 11/2021 |

(Continued)

OTHER PUBLICATIONS

Andreev, "Real-time Frame Rate Up-conversion for Video Games," SIGGRAPH, 2010, 60 pages.

(Continued)

*Primary Examiner* — Peter D Le
(74) *Attorney, Agent, or Firm* — Davis Wright Tremaine LLP

(57) ABSTRACT

Apparatuses, systems, and techniques to generate interpolated video frames. In at least one embodiment, an interpolated video frame is generated based, at least in part, on a first set of pixel data sampled from a first video frame, and a second set of pixel data sampled from a second video frame based, at least in part, on a set of forward pointing motion vectors from the first video frame to the second video frame.

35 Claims, 51 Drawing Sheets

(56) References Cited

U.S. PATENT DOCUMENTS

| | | | |
|---|---|---|---|
| 10,798,401 B2 * | 10/2020 | Kim | H04N 19/51 |
| 2003/0215014 A1 | 11/2003 | Koto et al. | |
| 2004/0046891 A1 * | 3/2004 | Mishima | H04N 7/014 |
| | | | 348/459 |
| 2004/0101058 A1 | 5/2004 | Sasai et al. | |
| 2004/0120404 A1 * | 6/2004 | Sugahara | H03M 7/40 |
| | | | 375/240.23 |
| 2004/0151392 A1 * | 8/2004 | Miyakoshi | H04N 19/61 |
| | | | 382/239 |
| 2004/0233991 A1 * | 11/2004 | Sugimoto | H04N 19/117 |
| | | | 375/240.16 |
| 2004/0234143 A1 * | 11/2004 | Hagai | H04N 19/58 |
| | | | 382/238 |
| 2004/0240743 A1 * | 12/2004 | Hamada | H04N 19/523 |
| | | | 382/233 |
| 2004/0246374 A1 | 12/2004 | Mishima et al. | |
| 2004/0264576 A1 | 12/2004 | Woods et al. | |
| 2005/0030316 A1 * | 2/2005 | Sirtori | G06T 15/005 |
| | | | 348/412.1 |
| 2005/0100095 A1 * | 5/2005 | Itoh | G06T 7/231 |
| | | | 348/E7.013 |
| 2005/0226332 A1 * | 10/2005 | Uetani | H04N 19/423 |
| | | | 375/240.16 |
| 2005/0265451 A1 | 12/2005 | Shi et al. | |
| 2006/0165302 A1 | 7/2006 | Han et al. | |
| 2006/0245495 A1 | 11/2006 | Han et al. | |
| 2006/0256866 A1 * | 11/2006 | Ziauddin | H04N 19/114 |
| | | | 375/240.15 |
| 2007/0047653 A1 * | 3/2007 | Kim | H04N 19/57 |
| | | | 375/240.16 |
| 2007/0071100 A1 | 3/2007 | Shi et al. | |
| 2007/0286284 A1 * | 12/2007 | Ito | H04N 19/53 |
| | | | 375/240.16 |
| 2008/0049837 A1 * | 2/2008 | Tanaka | H04N 19/139 |
| | | | 375/240.16 |
| 2008/0069225 A1 * | 3/2008 | Suzuki | H04N 19/573 |
| | | | 375/240.16 |
| 2008/0317128 A1 * | 12/2008 | Zhou | H04N 19/55 |
| | | | 375/240.16 |
| 2009/0016623 A1 | 1/2009 | Higewake | |
| 2009/0041342 A1 * | 2/2009 | Chen | G06T 11/001 |
| | | | 382/162 |
| 2009/0148058 A1 * | 6/2009 | Dane | H04N 19/154 |
| | | | 382/251 |
| 2009/0245694 A1 * | 10/2009 | Sartor | G06T 3/4069 |
| | | | 382/300 |
| 2010/0284627 A1 * | 11/2010 | Lin | H04N 5/145 |
| | | | 382/275 |
| 2011/0142289 A1 | 6/2011 | Barenbrug et al. | |
| 2011/0170602 A1 * | 7/2011 | Lee | H04N 19/70 |
| | | | 375/240.16 |
| 2011/0211125 A1 * | 9/2011 | Petrides | H04N 19/513 |
| | | | 348/616 |
| 2011/0228840 A1 * | 9/2011 | Yamori | H04N 19/573 |
| | | | 375/240.03 |
| 2011/0255592 A1 * | 10/2011 | Sung | H04N 13/111 |
| | | | 375/E7.141 |
| 2012/0033130 A1 | 2/2012 | Piek | |
| 2012/0033737 A1 * | 2/2012 | Sato | H04N 19/593 |
| | | | 375/240.16 |
| 2012/0288006 A1 * | 11/2012 | Sato | H04N 19/46 |
| | | | 375/240.16 |
| 2012/0300849 A1 * | 11/2012 | Yasugi | H04N 19/61 |
| | | | 375/240.16 |
| 2012/0314776 A1 | 12/2012 | Shimizu et al. | |
| 2012/0320986 A1 | 12/2012 | Shimizu et al. | |
| 2013/0044183 A1 * | 2/2013 | Jeon | H04N 19/395 |
| | | | 348/43 |
| 2013/0051471 A1 | 2/2013 | Ahn et al. | |
| 2013/0083851 A1 * | 4/2013 | Alshin | H04N 19/182 |
| | | | 375/240.14 |
| 2013/0094581 A1 * | 4/2013 | Tanizawa | H04N 19/129 |
| | | | 375/240.12 |
| 2013/0148730 A1 | 6/2013 | Robert et al. | |
| 2013/0170551 A1 | 7/2013 | Liu et al. | |
| 2013/0342644 A1 | 12/2013 | Rusanovskyy et al. | |
| 2014/0035905 A1 * | 2/2014 | Lee | H04N 13/271 |
| | | | 345/419 |
| 2014/0078254 A1 * | 3/2014 | Lin | H04N 13/161 |
| | | | 348/43 |
| 2014/0079125 A1 * | 3/2014 | Tanizawa | H04N 19/70 |
| | | | 375/240.16 |
| 2014/0240456 A1 * | 8/2014 | Kang | H04N 19/513 |
| | | | 348/42 |
| 2014/0328388 A1 * | 11/2014 | Kim | H04N 19/513 |
| | | | 375/240.02 |
| 2015/0078449 A1 * | 3/2015 | Diggins | H04N 19/86 |
| | | | 375/240.16 |
| 2015/0085933 A1 * | 3/2015 | Yie | H04N 19/52 |
| | | | 375/240.16 |
| 2015/0117526 A1 * | 4/2015 | Choi | H04N 19/61 |
| | | | 375/240.12 |
| 2015/0245065 A1 * | 8/2015 | Lee | H04N 19/597 |
| | | | 375/240.16 |
| 2015/0281727 A1 * | 10/2015 | Park | H04N 19/597 |
| | | | 375/240.16 |
| 2015/0382019 A1 | 12/2015 | Chen et al. | |
| 2016/0140733 A1 | 5/2016 | Gu et al. | |
| 2016/0295213 A1 * | 10/2016 | Zan | H04N 19/176 |
| 2016/0360225 A1 | 12/2016 | Diggins et al. | |
| 2017/0006284 A1 | 1/2017 | Gokhale et al. | |
| 2018/0288433 A1 | 10/2018 | Oh et al. | |
| 2018/0352248 A1 * | 12/2018 | Nishi | H04N 19/172 |
| 2019/0141335 A1 * | 5/2019 | Nishi | H04N 19/139 |
| 2019/0191171 A1 * | 6/2019 | Ikai | H04N 19/51 |
| 2020/0053388 A1 | 2/2020 | Schroers et al. | |

FOREIGN PATENT DOCUMENTS

| | | |
|---|---|---|
| TW | 202014916 | 4/2020 |
| WO | 2009085205 A1 | 7/2009 |
| WO | 2014175995 A1 | 10/2014 |

OTHER PUBLICATIONS

Baker et al., "A Database and Evaluation Methodology for Optical Flow," International Journal Computer Vision, 2011, 31 pages.

Bao et al., "Depth-Aware Video Frame Interpolation," IEEE Conference on Computer Vision and Pattern Recognition, 2019, 10 pages.

Bao et al., "MEMC-Net: Motion Estimation and Motion Compensation Driven Neural Network for Video Interpolation and Enhancement," Oct. 20, 2018, 14 pages.

Castagno et al., "A Method for Motion Adaptive Frame Rate Up-Conversion," IEEE Transactions on Circuits and Systems for Video Technology 6, 1996, 24 pages.

Chen et al., "Framerate Up-Conversion using Transmitted True Motion Vectors," Proceedings IEEE Second Workshop on Multimedia Signal Processing, 1998, 6 pages.

Gower et al., "Procrustes Problems," Oxford University Press, 2004, 3 pages.

IEEE, "IEEE Standard 754-2008 (Revision of IEEE Standard 754-1985): IEEE Standard for Floating-Point Arithmetic," Aug. 29, 2008, 70 pages.

Jaderberg et al., "Spatial Transformer Networks," In Neural Information Processing Systems, 2015, 9 pages.

Jiang et al., "Super SloMo: High Quality Estimation of Multiple Intermediate Frames for Video Interpolation," IEEE Conference on Computer Vision and Pattern Recognition, 2018, 9 pages.

Liu et al., "Deep Video Frame Interpolation Using Cyclic Frame Generation," AAAI Conference on Artificial Intelligence, 2019, 9 pages.

Liu et al., "Video Frame Synthesis Using Deep Voxel Flow," IEEE International Conference on Computer Vision, Aug. 5, 2017, 9 pages.

(56) References Cited

OTHER PUBLICATIONS

Mather, "Introduction to Motion Perception," retrieved from the Internet on Jun. 4, 2021, from http://www.georgemather.com/MotionMP4.html, 2006, 1 pages.

Montoya-Vozmediano, "Tangled: The Pixels Behind the People Behind the Pixels," ACM SIGGRAPH Dailies, Jul. 2010, 2 pages.

Niklaus et al., "Context-Aware Synthesis for Video Frame Interpolation," IEEE Conference on Computer Vision and Pattern Recognition, 2018, 10 pages.

Niklaus et al., "Video Frame Interpolation via Adaptive Convolution," CVPR, 2017, 10 pages.

Niklaus et al., "Video Frame Interpolation via Adaptive Separable Convolution," ICCV, 2017, 10 pages.

Niklaus et al., "Softmax Splatting for Video Frame Interpolation," Mar. 11, 2020, 10 pages.

Nvidia, "Why Does High FPS Matter for Esports?" retrieved from the Internet on Mar. 23, 2020, from https://www.nvidia.com/en-us/geforce/news/what-is-fps-and-how-it-helps-you-win-games/?cjevent=c2bce943177811ea80de03000a24060b, Dec. 3, 2019, 16 pages.

Pelagotti et al., "High Quality Picture Rate Up-Conversion for Video on TV and PC," Proc. Philips Conference on Digital Signal Processing, Paper 4.1, 1999, 7 pages.

Poynton, "Motion Portrayal, Eye Tracking, and Emerging Display Technology," Proceedings Advanced Motion Imaging Conference, 1998, 11 pages.

Raket et al., "Motion Compensated Frame Interpolation With a Symmetric Optical Flow Constraint," Advances in Visual Computing, 2012, 11 pages.

Reda et al., "Unsupervised Video Interpolation Using Cycle Consistency," IEEE International Conference on Computer Vision, 2019, 9 pages.

Rosado, "Motion Blur as a Post-Processing Effect," retrieved from the Internet on Apr. 21, 2020, from https://developer.nvidia.com/gpugems/gpugems3/foreword, 5 pages.

Simonyan et al., "AviSynth MSU Frame Rate Conversion Filter," Mar. 10, 2011, 8 pages.

Office Action for United Kingdom Application No. GB2203100.9, mailed Aug. 27, 2024, 2 pages.

United Kingdom Examination Report for Application No. GB2203100.9, mailed Mar. 26, 2025, 5 pages.

Office Action for Chinese Application No. 202180012231.2, mailed Jan. 13, 2025, 17 pages.

Office Action for Chinese Application No. 202180060483.2, mailed Aug. 7, 2025, 21 pages.

United Kingdom Examination Report for Application No. GB2203100.9, mailed Aug. 1, 2025, 4 pages.

Office Action for Chinese Application No. 202180012231.2, mailed Jun. 9, 2025, 13 pages.

Decision of Rejection for Chinese Application No. 202180012231.2, mailed Aug. 19, 2025, 13 pages.

Examination Report for United Kingdom Application No. GB2203100.9, mailed Aug. 1, 2025, 6 pages.

* cited by examiner

BiMV: Intermediate Frame Synthesis

FIG. 3

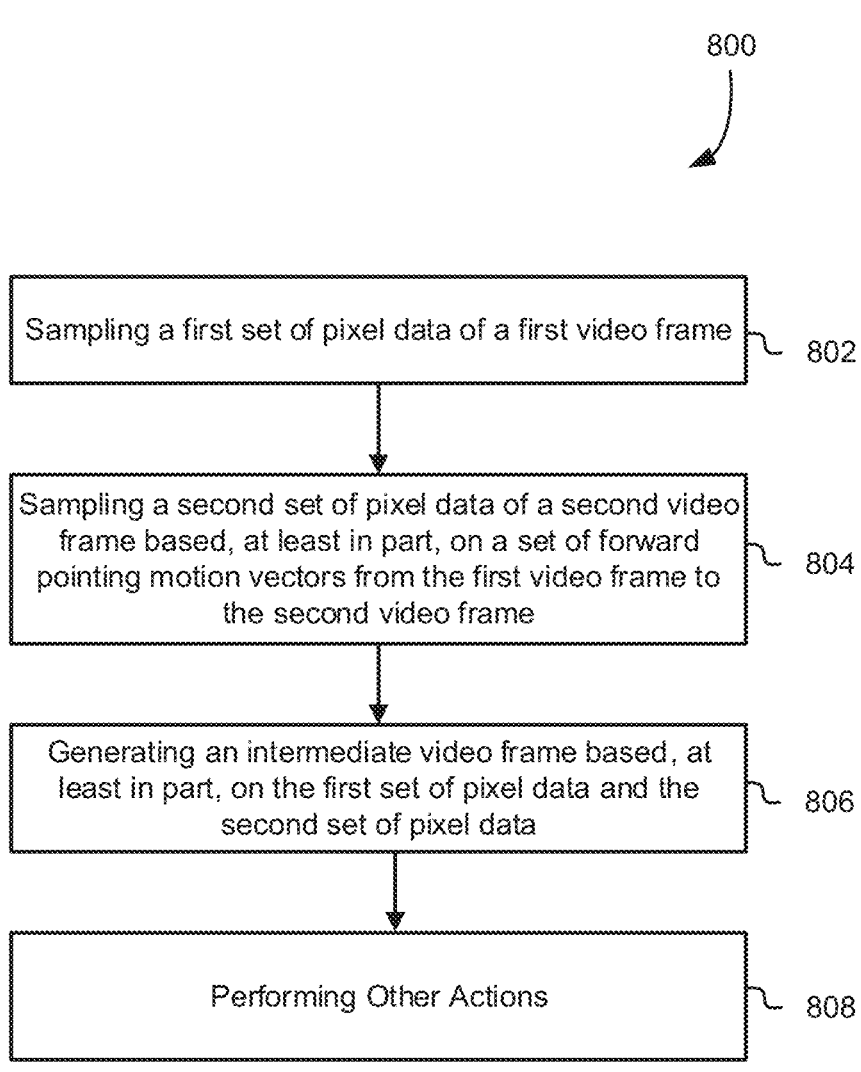

800

Sampling a first set of pixel data of a first video frame ⌐ 802

Sampling a second set of pixel data of a second video frame based, at least in part, on a set of forward pointing motion vectors from the first video frame to the second video frame ⌐ 804

Generating an intermediate video frame based, at least in part, on the first set of pixel data and the second set of pixel data ⌐ 806

Performing Other Actions ⌐ 808

Generating a set of intermediate backward pointing motion vectors ~ 902

Generating an occlusion mask ~ 904

Sampling a first set of pixel data of a first video frame based, at least in part, on the set of intermediate backward pointing motion vectors and the occlusion mask ~ 906

Performing Other Actions ~ 908

1000

Generating a set of intermediate forward pointing motion vectors — 1002

Generating a disocclusion mask — 1004

Sampling a second set of pixel data of a second video frame based, at least in part, on the set of intermediate forward pointing motion vectors and the disocclusion mask — 1006

Performing Other Actions — 1008

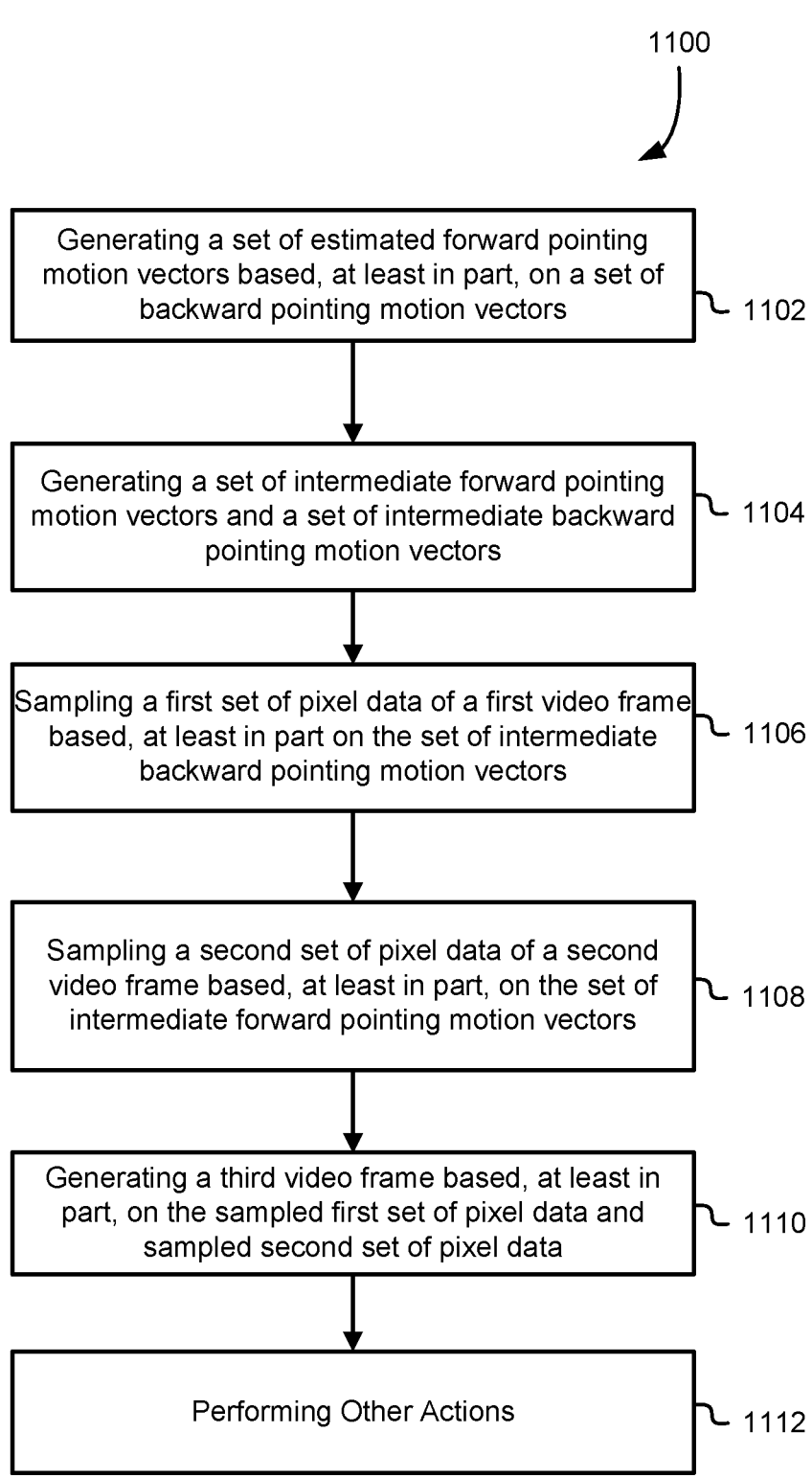

1100

Generating a set of estimated forward pointing motion vectors based, at least in part, on a set of backward pointing motion vectors ⁓ 1102

Generating a set of intermediate forward pointing motion vectors and a set of intermediate backward pointing motion vectors ⁓ 1104

Sampling a first set of pixel data of a first video frame based, at least in part on the set of intermediate backward pointing motion vectors ⁓ 1106

Sampling a second set of pixel data of a second video frame based, at least in part, on the set of intermediate forward pointing motion vectors ⁓ 1108

Generating a third video frame based, at least in part, on the sampled first set of pixel data and sampled second set of pixel data ⁓ 1110

Performing Other Actions ⁓ 1112

FIG. 11

1200
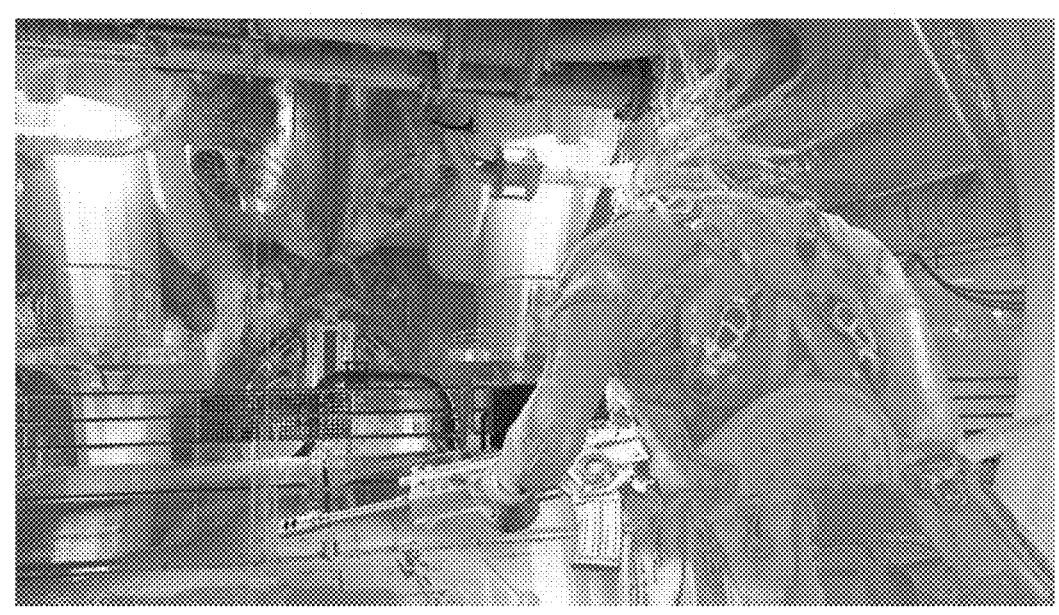
1202
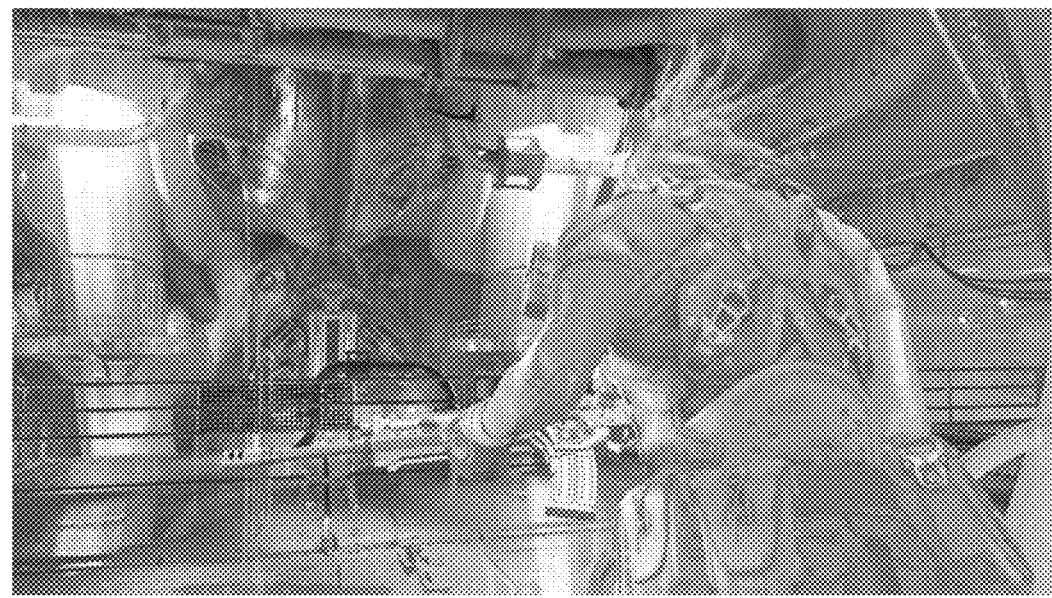
FIG. 12

1300
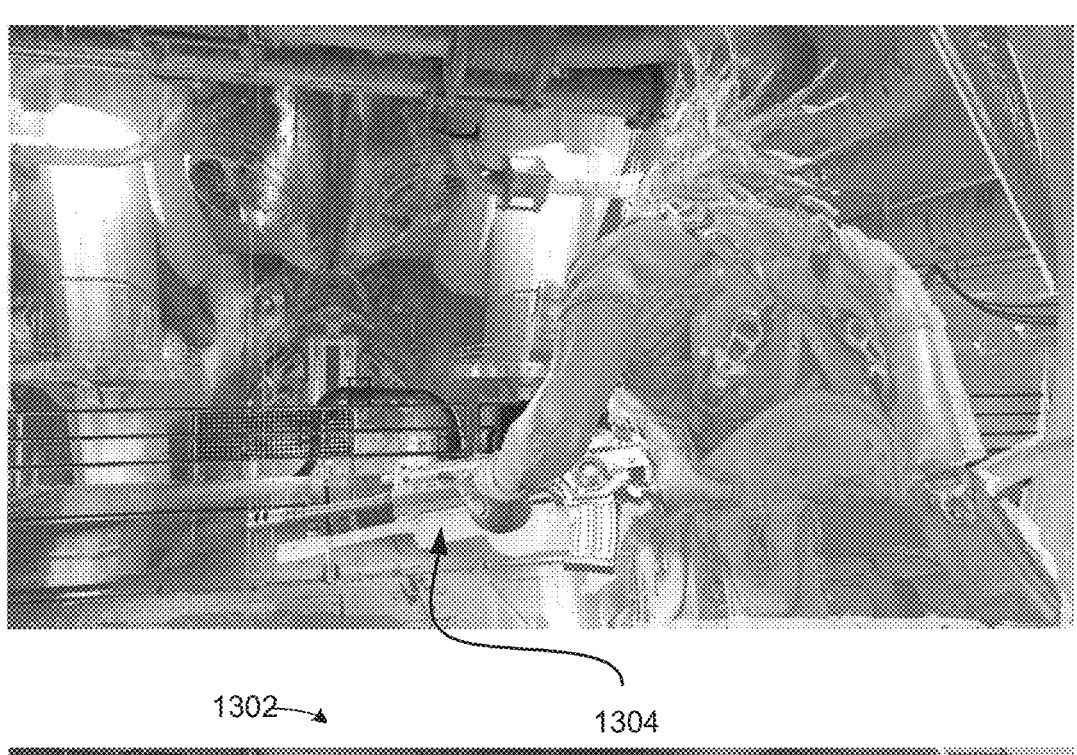
1302
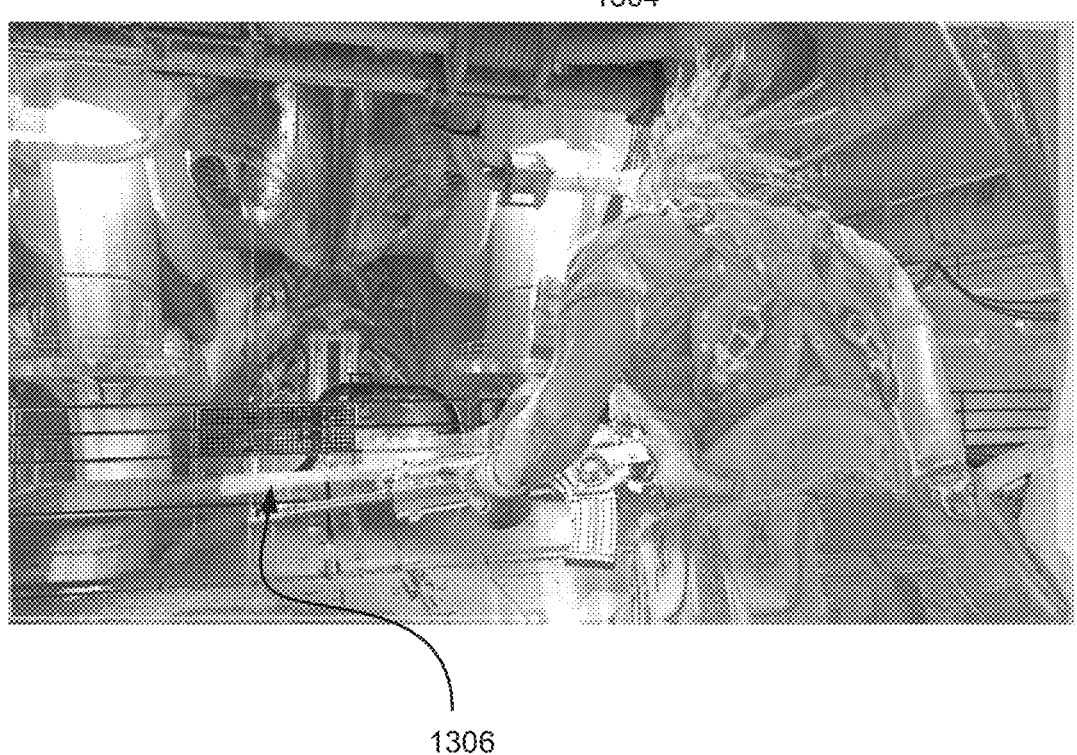
1304
1306
FIG. 13

1400

DATA CENTER
1500
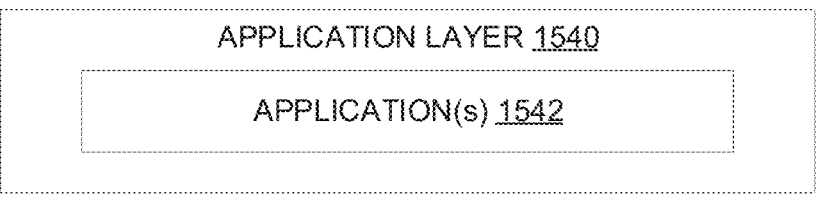
APPLICATION LAYER 1540
APPLICATION(s) 1542
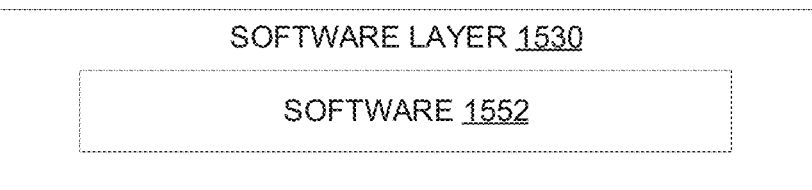
SOFTWARE LAYER 1530
SOFTWARE 1552
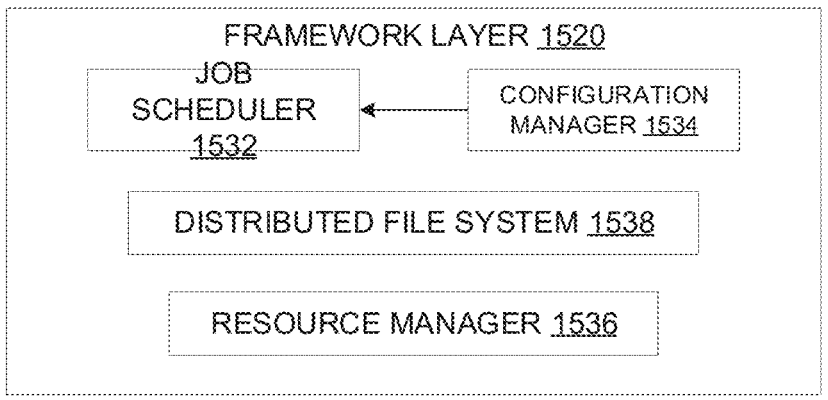
FRAMEWORK LAYER 1520
JOB SCHEDULER 1532 ← CONFIGURATION MANAGER 1534
DISTRIBUTED FILE SYSTEM 1538
RESOURCE MANAGER 1536
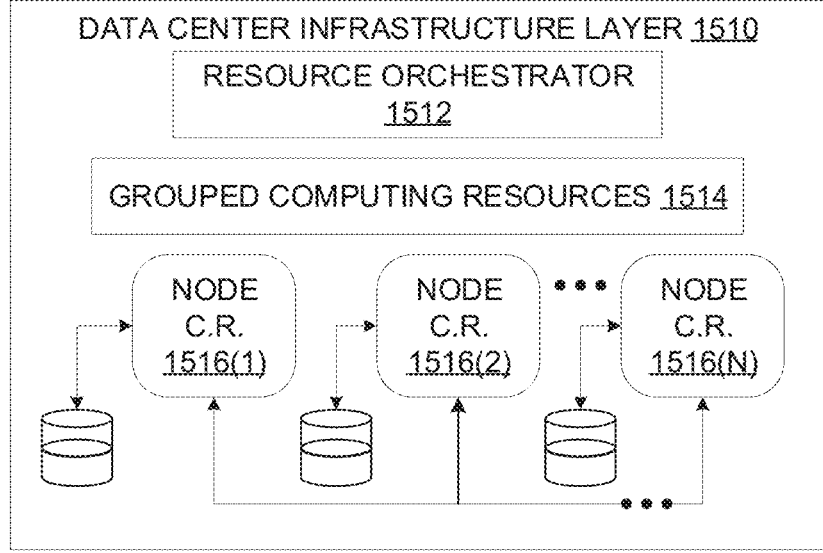
DATA CENTER INFRASTRUCTURE LAYER 1510
RESOURCE ORCHESTRATOR 1512
GROUPED COMPUTING RESOURCES 1514
NODE C.R. 1516(1)    NODE C.R. 1516(2)   • • •   NODE C.R. 1516(N)
FIG. 15

INTEGRATED
CIRCUIT
1900

APPLICATION
PROCESSOR(S)
1905

GRAPHICS
PROCESSOR
1910

IMAGE
PROCESSOR
1915

VIDEO
PROCESSOR
1920

USB
1925

UART
1930

SPI/
SDIO
1935

I²S/I²C
1940

DISPLAY
1945

SECURITY
ENGINE
1970

MEMORY
1965

FLASH
1960

MIPI
1955

HDMI
1950

GRAPHICS PROCESSOR
2440

PARALLEL PROCESSOR 2600

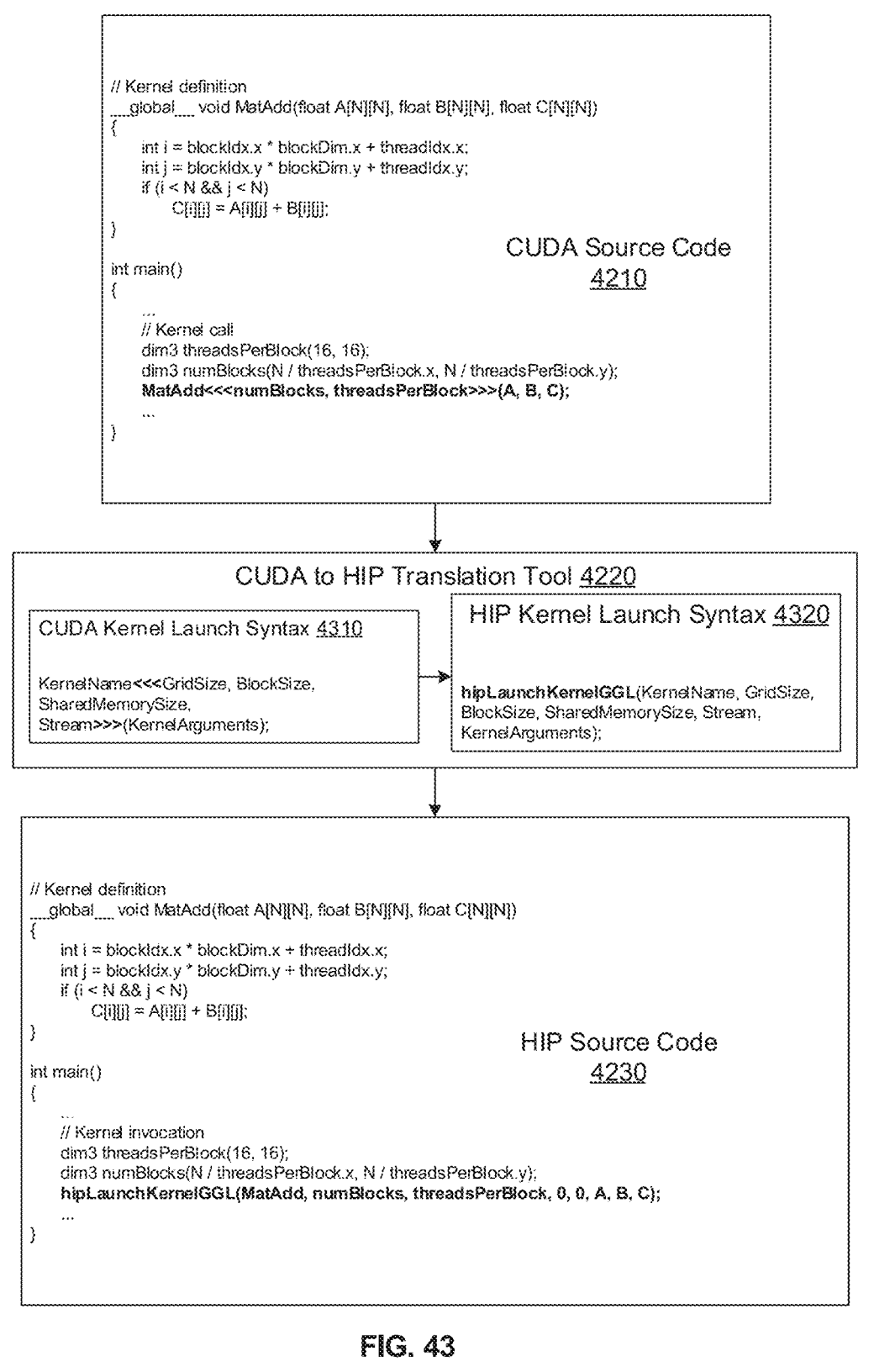

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}
int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code
4210

CUDA to HIP Translation Tool 4220

CUDA Kernel Launch Syntax 4310

KernelName<<<GridSize, BlockSize, SharedMemorySize, Stream>>>(KernelArguments);

HIP Kernel Launch Syntax 4320 hipLaunchKernelGGL(KernelName, GridSize, BlockSize, SharedMemorySize, Stream, KernelArguments);

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}
int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code
4230

FIG. 43

TECHNIQUES TO GENERATE INTERPOLATED VIDEO FRAMES

FIELD OF INVENTION

At least one embodiment pertains to processing resources used to generate video frames. For example, at least one embodiment pertains to processors or computing systems used to generate interpolated video frames according to various novel techniques described herein.

BACKGROUND

Generating video frames can use significant memory, time, or computing resources. The amount of memory, time, or computing resources used to generate video frames can be improved.

BRIEF DESCRIPTION OF THE DRAWINGS

FIG. 3 is a diagram that illustrates intermediate frame synthesis, in accordance with at least one embodiment;

FIG. 8 illustrates a flowchart of a technique of generating an intermediate video frame, in accordance with at least one embodiment;

FIG. 11 illustrates a flowchart of a technique of generating an intermediate video frame, in accordance with at least one embodiment;

FIG. 12 illustrates first and second input video frames, in accordance with at least one embodiment;

FIG. 13 illustrates occlusion and dis-occlusion masks overlaying an intermediate video frame, in accordance with at least one embodiment;

FIG. 15 illustrates an exemplary data center, in accordance with at least one embodiment;

FIG. 43 illustrates an exemplary kernel translated by CUDA-to-HIP translation tool of FIG. 42C, in accordance with at least one embodiment;

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
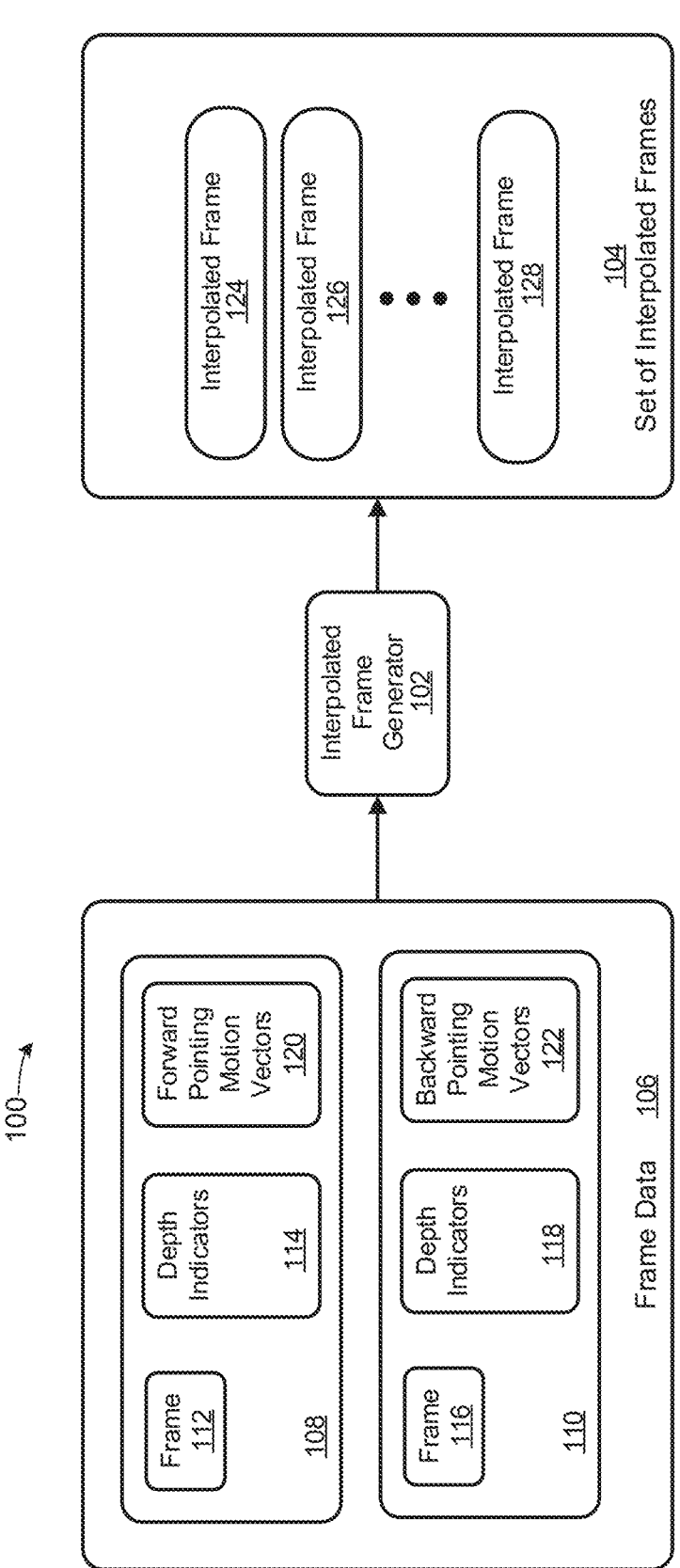
FIG. 1 is a block diagram that illustrates a system to generate interpolated video frames, in accordance with at least one embodiment.

FIG. 1 is a block diagram of a system 100 that generates interpolated video frames, according to at least one embodiment. In at least one embodiment, system 100 includes an interpolated frame generator 102 that generates a set of interpolated frames 104 based, at least in part, on frame data 106. In at least one embodiment, interpolated frame generator 102 is a computer program accessible via an application programming interface (API). In at least one embodiment, interpolated frame generator 102 runs on a processor (e.g., a central processing unit (CPU), not shown for clarity). It should be understood that when one or more computer programs and/or APIs (e.g., in relation to interpolated frame generator 102) is referred to as performing an action with respect to an embodiment, or an aspect of a technique, that one or more hardware components (e.g., a CPU, GPU, and/or other hardware component) of a computer system running computer program(s) and/or API(s) perform action or aspect of technique.

In at least one embodiment, frame data 106 includes first video frame information 108 and second video frame information 110. In at least one embodiment, first video frame information 108 includes a first video frame 112 and a set of depth indicators 114. In at least one embodiment, second video frame information 110 includes a second video frame 116 and a set of depth indicators 118. In at least one embodiment, first video frame 112 includes a first set of pixel values and second video frame 116 includes a second set of pixel values. In at least one embodiment, sets of pixel values for first video frame 112 and second video frame 116 include color information (e.g., RGB values) for pixels (e.g., at locations in a two-dimensional grid represented by x and y values). In at least one embodiment, set of depth indicators 114 is a set of depth values (e.g., z values in a z buffer) for pixels of first video frame 112. In at least one embodiment, set of depth indicators 118 is a set of depth values for pixels of second video frame 116. In at least one embodiment, some or all of frame data 106 is available in one or more buffers (e.g., in memory such as graphics memory) from a video game engine, and is available for use by interpolated frame generator 102.

In at least one embodiment, first video frame information 108 includes a set of forward pointing motion vectors 120 and second video frame information 110 includes a set of backward pointing motion vectors 122. In at least one embodiment, set of forward pointing motion vectors 120 includes motion vectors for pixels in first video frame 112 that point to pixel locations in second video frame 116. In at least one embodiment, set of backward pointing motion vectors 122 includes motion vectors for pixels in second video frame 116 that point to pixel locations in first video frame 112. In at least one embodiment, each forward pointing motion vector is a projected vertex movement (e.g., to a pixel location in a second video frame) and each backward pointing motion vector is a projected vertex movement (e.g., from a pixel location in a first video frame). Although only two sets of video frame information are shown with respect to frame data 106, it should be understood that in at least one embodiment, frame data 106 includes additional video frame information (e.g., information for video frames that occur before frame 112 and/or after frame 116). In at least one embodiment, video frame information for a particular video frame includes both forward pointing and backward pointing motion vectors (e.g., in at least one embodiment, second video frame information 110 also includes forward pointing motion vectors that point to pixels of a subsequent video frame, not shown for clarity).

In at least one embodiment, interpolated frame generator 102 generates a first interpolated frame 124, a second interpolated frame 126, and a third interpolated frame 128 between first video frame 112 and second video frame 116. In at least one embodiment, interpolated frame generator 102 generates a different number of frames between first video frame 112 and second video frame 116 than shown (e.g., a single frame, or more than three frames).

Figure 2:
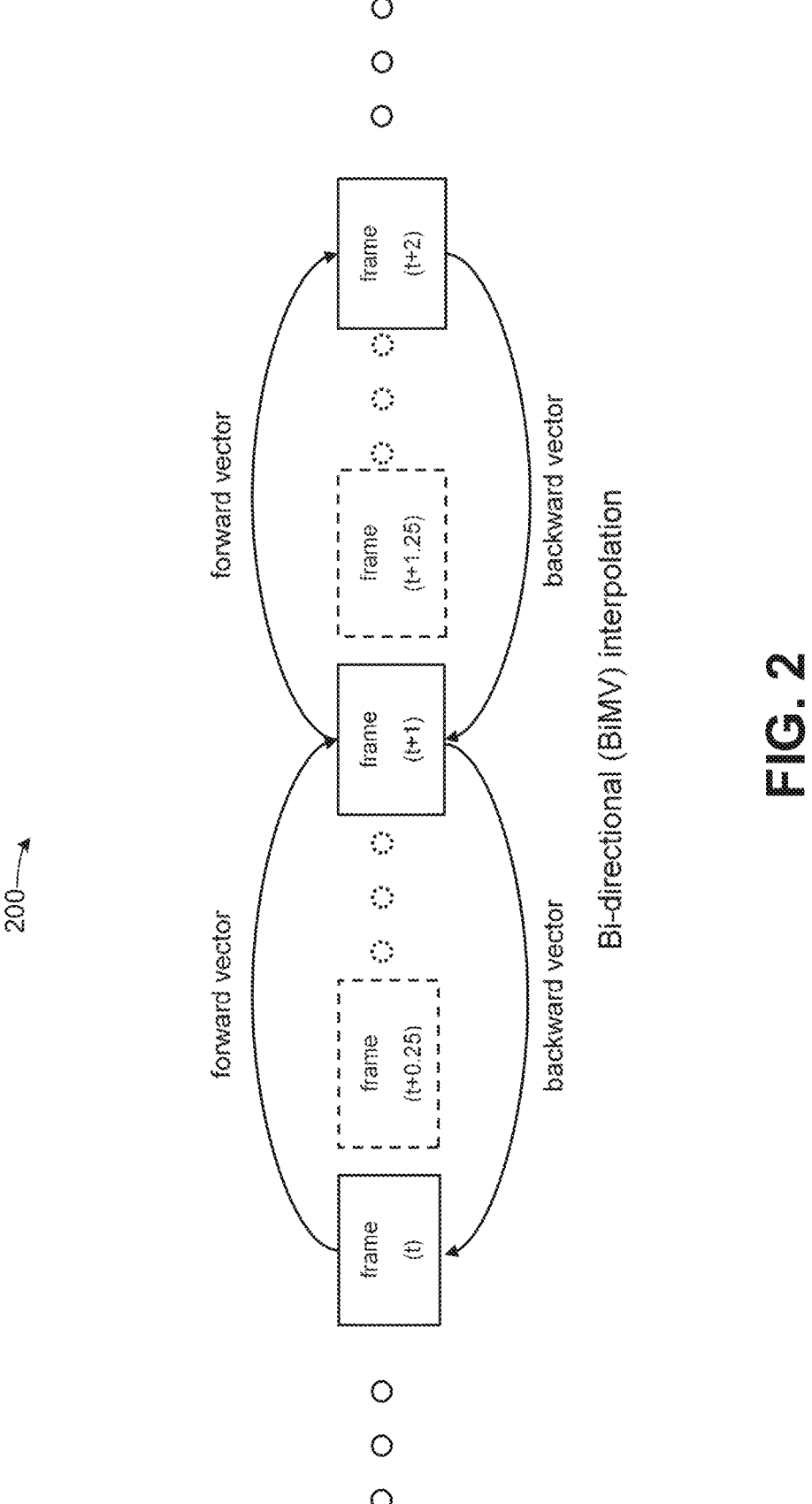
FIG. 2 is a block diagram that illustrates frame interpolation, in accordance with at least one embodiment.

FIG. 2 is a diagram that illustrates frame interpolation 200 based, at least in part, on forward pointing motion vectors (e.g., forward pointing motion vectors 120) and backward pointing motion vectors (e.g., backward pointing motion vectors 122), according to at least one embodiment. In at least one embodiment, an interpolated frame generator (e.g., interpolated frame generator 102) performs frame interpolation 200. In at least one embodiment, frame interpolation 200 is referred to as a Bi-directional motion vector (BiMV) interpolation technique. In at least one embodiment, interpolated frame generator generates interpolated frames based, at least in part, on video frame information for frames shown at times (t), (t+1), and (t+2) (e.g., using pixel color data, depth, and motion vectors). In at least one embodiment, given a frame pair (e.g., at time (t) and (t+1)), interpolated frame generator synthesizes an interpolated frame at a predetermined time (e.g., at (t+0.25)).

In at least one embodiment, interpolated frame generator performs frame interpolation 200 based, at least in part, on input RGB color images (e.g., first video frame 112 and second video frame 116), depth buffers (e.g., depth indicators 114 and 118), and geometric motion vectors (e.g., forward pointing motion vectors 120 and backward pointing motion vectors 122). In at least one embodiment, these inputs are represented as $(I_0, D_0, F_{0 \to 1})$ and $(I_1, D_1, F_{1 \to 0})$, which correspond to input RGB color images, depth buffers, and geometric motion vectors at time T=0 and T=1, respectively. In at least one embodiment, input RGB color images are low frame per second (FPS) images.

In at least one embodiment, frame interpolation 200 is based, at least in part, on an assumption that pixels move linearly from T=0 to T=1 (or T=1 to T=0) along motion vectors $F_{0 \to 1}$ and $F_{1 \to 0}$ that relate source and destination pixels. In at least one embodiment, interpolated frame generator estimates an intermediate frame as pixel landing at t (e.g. t=0.5, or half way) along linear paths when interpolated frame generator generates an intermediate interpolated frame at time t=0.5. In at least one embodiment, frame interpolation 200 is based, at least in part, on an acceleration parameter (e.g., an acceleration inferred by interpolated frame generator 102 based, at least in part, on using information from one or more additional frames before T=0).

In at least one embodiment, moving pixels only from T=0 or T=1 to an intermediate time t is sufficient to get a reasonable intermediate pixel, in most cases. In at least one embodiment, however, appearance of pixels could drastically change from T=0 to T=1, such as when a well-lighted scene becomes dark. In at least one embodiment, such changes cannot be fully explained by geometric motion vectors and, moving pixels from a single source alone will lead to suboptimal interpolation. In at least one embodiment, to account for this, a pixel at an intermediate time t is synthesized by a linear combination of pixels pulled from two source images, along linear lines defined by motion vectors. In at least one embodiment, this is represented mathematically as, $$I_t = (1-t)*\text{Warp}(I_0, F_{t\to 0}) + t*\text{Warp}(I_1, F_{t\to 1}), \quad (1)$$

where $F_{t\to 0}$ and $F_{t\to 1}$ are bi-directional intermediate motion vectors generated by interpolated frame generator (e.g., as described with respect to FIG. 4), and Warp is a bilinear sampling operation that pulls pixels from a source RGB image guided by motion vectors.

Figure 3:
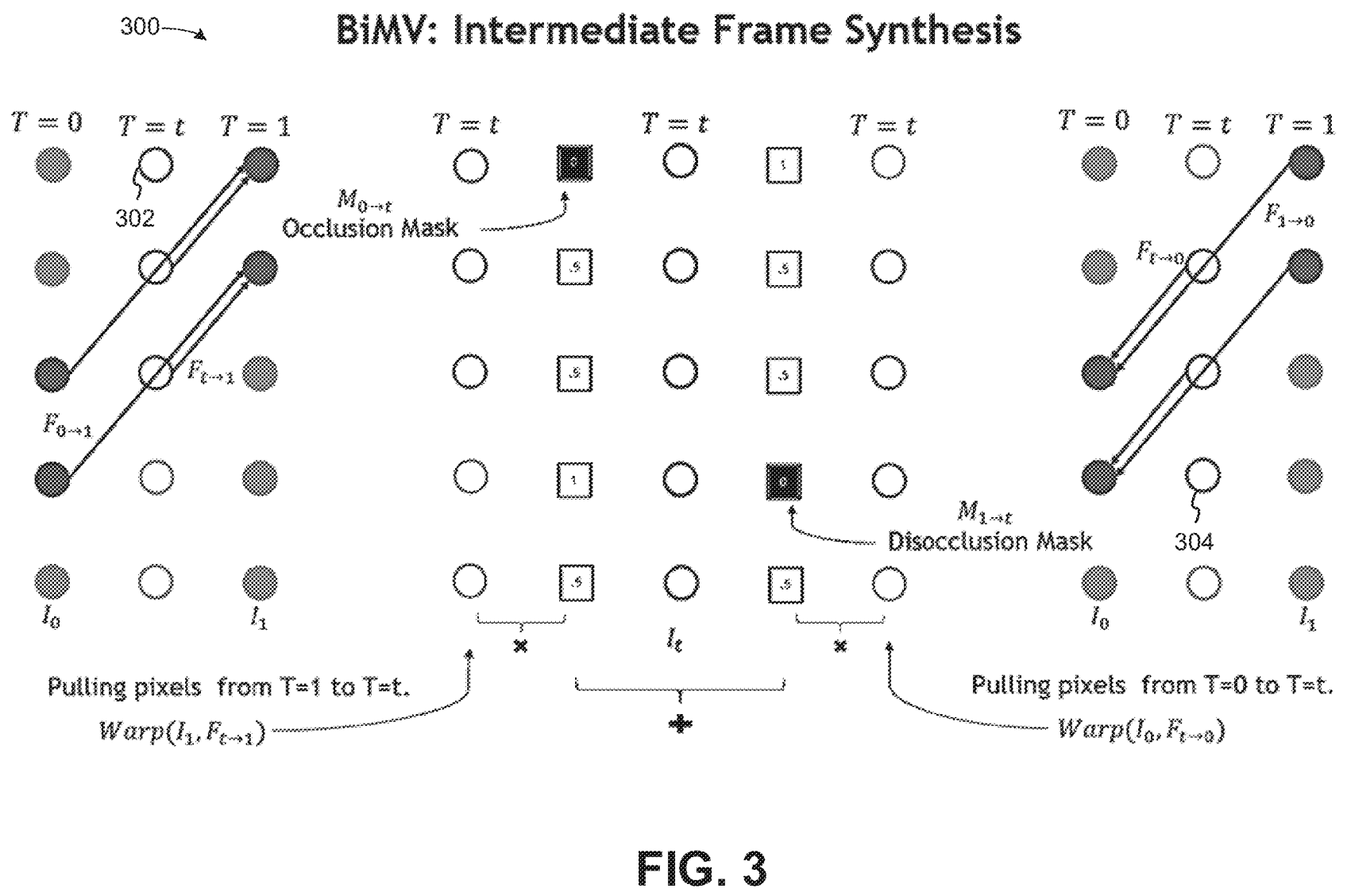

FIG. 3 is a diagram that illustrates intermediate frame synthesis 300 based, at least in part, on forward pointing motion vectors (e.g., forward pointing motion vectors 120) and backward pointing motion vectors (e.g., backward pointing motion vectors 122), according to at least one embodiment. In at least one embodiment, intermediate frame synthesis 300 is a simplified representation for purposes of illustration that shows only five pixels in one dimension at different times rather than a larger number of pixels in two dimensions as would be used in at least one embodiment. In at least one embodiment, interpolated frame generator 102 performs intermediate frame synthesis 300. In at least one embodiment, intermediate frame synthesis 300 is referred to as Bi-directional motion vector (BiMV) intermediate frame synthesis. In at least one embodiment, intermediate frame synthesis 300 includes intermediate motion vectors ($F_{t\to 1}$, $F_{t\to 0}$), and intermediate frame synthesis 300 is guided by occlusion and dis-occlusion masks. In at least one embodiment, circle 302 indicates an occlusion artifact of warping frames from T=1, and circle 304 indicates a dis-occlusion artifact of warping from T=0.

In at least one embodiment, source pixels may not be visible in both input images for all intermediate pixels, because they have been occluded. In at least one embodiment, for instance, sampling $I_0$ with $F_{t\to 0}$ will create trailing edge artifacts (also referred to as dis-occlusion artifacts) because correct content to fill-in occluded regions is invisible in $I_0$, but could likely be visible in $I_1$ (second image). In at least one embodiment, similarly, sampling $I_1$ with $F_{t\to 1}$ will result in leading edge artifacts (also referred to as occlusion artifacts). For most intermediate pixels, however, source pixels are visible in both input frames, hence Equation (1) will lead to reasonable interpolations, in those regions.

In at least one embodiment, to account for leading edge and trailing edge artifacts not accounted for by Equation (1), Equation (2) is used to model occluded regions, dis-occluded regions, and visible regions, as:

$$I_t^{occluded} = (M_{0\to t})*(\text{Warp}(I_0, F_{t\to 0}))$$

$$I_t^{disoccluded} = (M_{1\to t})*(\text{Warp}(I_1, F_{t\to 1}))$$

$$I_t^{visible} = (1 - M_{0\to t} - M_{1\to t})*((1-t)*\text{Warp}(I_0, F_{t\to 0}) + t*\text{Warp}(I_1, F_{t\to 1}))$$

$$I_t = I_t^{occluded} + I_t^{disoccluded} + I_t^{visible} \quad (2)$$

where $M_{0\to t}$ and $M_{1\to t}$ are occlusion and dis-occlusion masks. In at least one embodiment, $M_{0\to t}$ allows sampling of pixels visible only from input $I_0$ and $M_{1\to t}$ allows sampling of pixels visible only from input $I_1$. In at least one embodiment, FIG. 3 illustrates an example process of frame synthesis using Equation (2). In at least one embodiment, interpolated frame generator samples pixels of an additional input frame (e.g., a first frame that occurs before $I_0$ in which corresponding pixel is visible) for pixels of intermediate frame not visible from input $I_0$ or $I_1$ (e.g., disoccluded and occluded simultaneously).

In at least one embodiment, interpolated frame generator applies weighting factors to pixel data pulled from pixels from first video frame (e.g., at T=0) and second video frame (e.g., at T=1) based, at least in part, on whether occlusion and/or dis-occlusion masks apply, and/or based on a relative time value of interpolated frame in relation to first video frame and second video frame (e.g., whether interpolated frame corresponds to time t=0.25, t=0.5, or t=0.75). In at least one embodiment, for pixels affected by an occlusion mask (e.g., circle 302), interpolated frame generator applies a weighting factor of 1 to pixel pulled from first frame (e.g., from T=0 to T=t) and a weighting factor of 0 to pixel pulled from second frame (e.g., from T=1 to T=t) as shown in FIG. 3. In at least one embodiment, for pixels affected by an dis-occlusion mask (e.g., circle 304), interpolated frame generator applies a weighting factor of 0 to pixel pulled from first frame (e.g., from T=0 to T=t) and a weighting factor of 1 to pixel pulled from second frame (e.g., from T=1 to T=t) as shown in FIG. 3. In at least one embodiment, for pixels not affected by an occlusion mask or a dis-occlusion mask, interpolated frame generator applies weighting factors according to a relative distance in time of interpolated frame to first video frame and second video frame (e.g., 0.5 applied to both when interpolated frame is half way between as shown in FIG. 3).

Figure 4:
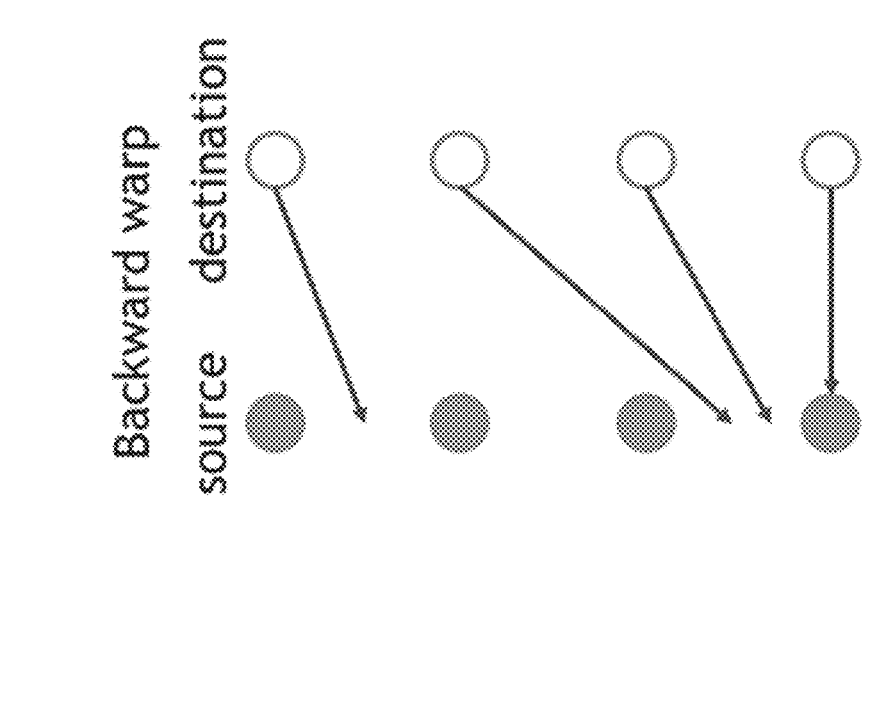
FIG. 4 is a diagram that illustrates forward and backward warping, in accordance with at least one embodiment.

FIG. 4 is a diagram that illustrates backward and forward warping 400, according to at least one embodiment. In at least one embodiment, for a forward warp, each pixel in source is migrated to a destination pixel guided by a motion vector pointing from source to destination. In at least one embodiment, for a forward warp, destination pixels may never be reached and assigned a value (e.g., in set of pixels 402), or multiple source pixels could point to same destination pixel (e.g., pixel 404), creating ambiguities in forward warping.

In at least one embodiment, in intermediate frame synthesis 300 of FIG. 3, an interpolated frame generator (e.g., interpolated frame generator 102) approximates intermediate motion vectors ($F_{t\to 1}$, $F_{t\to 0}$) by projecting input bi-directional motion vectors ($F_{0\to 1}$, $F_{1\to 0}$) that pass through intermediate pixel locations. In at least one embodiment, interpolated frame generator forward warps input motion vectors from T=0 or T=1 to T=t, then at destination pixel in T=t, interpolated frame generator assigns motion vector at source pixel, after scaling them by a factor of (1−t). In at least one embodiment, scale factor is larger when t is small, and vice versa.

In at least one embodiment, interpolated frame generator resolves ambiguities of forward warping using depth at source pixels (e.g., from depth indicators 114 and/or depth indicators 118). In at least one embodiment, among multiple pixels arriving at same destination pixel, interpolated frame generator records motion vector of source pixel with smallest depth, that is pixel not occluded from source. In at least one embodiment, this is represented mathematically as, $$F_{t \to 1}(x,y) = (1-t) * F_{0 \to 1}(x',y'), \text{ with}$$

$$(x',y') = (x,y) - t * F_{0 \to 1}(x,y), \quad (3)$$

and $F_{0 \to 1}(x,y)$ being a motion vector, among all possible vectors arriving at (x,y) when warped from T=0 to T=t, with smallest depth, $D_0^{min}(x, y)$. In at least one embodiment, interpolated frame generator generates other intermediate motion vector(s) pointing from T=t to T=0 (e.g., intermediate backward pointing motion vector), as $$F_{t \to 0}(x,y) = t * F_{1 \to 0}(x',y'), \text{ with}$$

$$(x',y') = (x,y) - (1-t) * F_{1 \to 0}(x,y), \quad (4)$$

and $F_{1 \to 0}(x,y)$ being a motion vector, among all possible vectors arriving at (x,y) when warped from T=1 to T=t, with smallest depth, $D_1^{min}(x, y)$.

In at least one embodiment, intermediate frame synthesis 300 includes generation of masks to provide for masking out of occlusion and dis-occlusion artifacts that occur in backward image warping with respect to Equation (2). In at least one embodiment, intermediate frame synthesis 300 uses forward projection of depths at time T=0 or T=1 to T=t, and defines an intermediate pixel as an occluded/dis-occluded pixel, if no source pixel can reach it when source pixels are forward projected with their motion vector. In at least one embodiment, an occlusion mask is mathematically represented by, $M_{0 \to t}(x, y) = 1$, if $D_t (x, y) = 0$, i.e., (x, y) is unreachable in forward movement from $1 \to t$, else
$M_{0 \to t}(x, y) = 0$, where $$D_t = \text{ForwardWarp}(D_1, (1-t)F_{1 \to 0}). \quad (5)$$

In at least one embodiment, similarly, a dis-occlusion mask is represented by, $M_{1 \to t}(x, y) = 1$, if $D_t (x, y) = 0$, i.e., (x, y) is unreachable in forward movement from $0 \to t$, else
$M_{1 \to t}(x, y) = 0$, where $$D_t = \text{ForwardWarp}(D_0, tF_{0 \to 1}). \quad (6)$$

Figure 5:
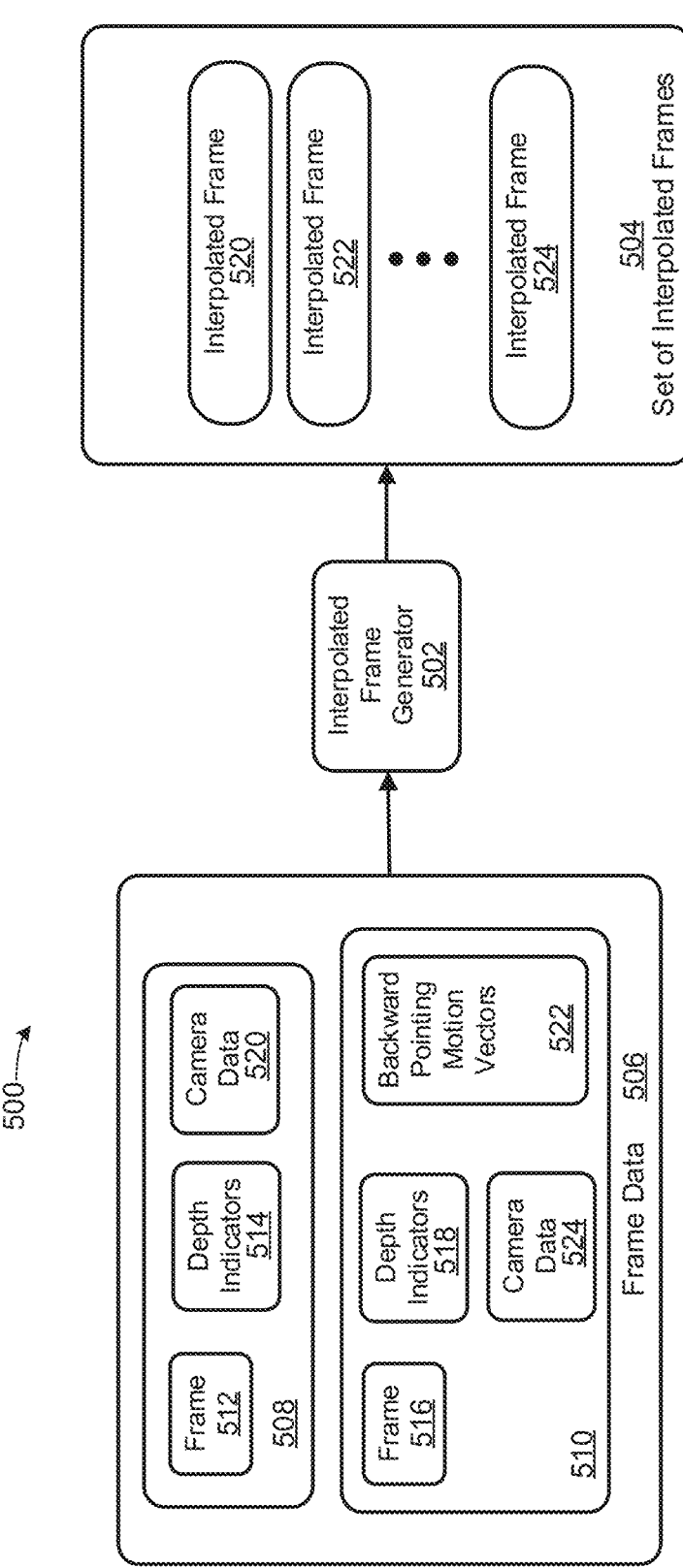
FIG. 5 is a block diagram that illustrates a system to generate interpolated video frames, in accordance with at least one embodiment.

FIG. 5 is a block diagram of a system 500 that generates interpolated video frames, according to at least one embodiment. In at least one embodiment, system 500 includes an interpolated frame generator 502 that generates a set of interpolated frames 504 based, at least in part, on frame data 506. In at least one embodiment, interpolated frame generator 502 is a computer program accessible via an application programming interface (API). In at least one embodiment, interpolated frame generator 502 runs on a processor (e.g., a central processing unit (CPU), not shown for clarity). In at least one embodiment, some or all of frame data 506 is available in one or more buffers (e.g., in memory such as graphics memory) from a video game engine, and is available for use by interpolated frame generator 502.

In at least one embodiment, frame data 506 includes first video frame information 508 and second video frame information 510. In at least one embodiment, first video frame information 508 includes a first video frame 512 and a set of depth indicators 514. In at least one embodiment, forward pointing motion vectors are not available in frame data 506. In at least one embodiment, second video frame information 510 includes a second video frame 516 and a set of depth indicators 518. In at least one embodiment, first video frame 512 includes a first set of pixel values and second video frame 516 includes a second set of pixel values. In at least one embodiment, sets of pixel values for first video frame 512 and second video frame 516 include color information (e.g., RGB values) for pixels (e.g., at locations in a two-dimensional grid represented by x and y values). In at least one embodiment, set of depth indicators 514 is a set of depth values (e.g., z values in a z buffer) for pixels of first video frame 512. In at least one embodiment, set of depth indicators 518 is a set of depth values for pixels of second video frame 516.

In at least one embodiment, first video frame information 508 includes camera data 520 and second video frame information 510 includes a set of backward pointing motion vectors 522 and camera data 524. In at least one embodiment, camera data 520 and camera data 524 are stored as matrices in a buffer. In at least one embodiment, set of backward pointing motion vectors 522 includes motion vectors for pixels in second video frame 516 that point to pixel locations in first video frame 512. In at least one embodiment, each backward pointing motion vector is a projection of a vertex movement (e.g., from a pixel location in a first video frame). Although only two sets of video frame information are shown with respect to frame data 506, it should be understood that in at least one embodiment, frame data 506 includes additional video frame information (e.g., information for video frames that occur before frame 512 and/or after frame 516).

In at least one embodiment, interpolated frame generator 502 generates a first interpolated frame 526, a second interpolated frame 528, and a third interpolated frame 530 between first video frame 512 and second video frame 516. In at least one embodiment, interpolated frame generator 502 generates a different number of frames between first video frame 512 and second video frame 516 than shown (e.g., a single frame, or more than three frames).

Figure 6:
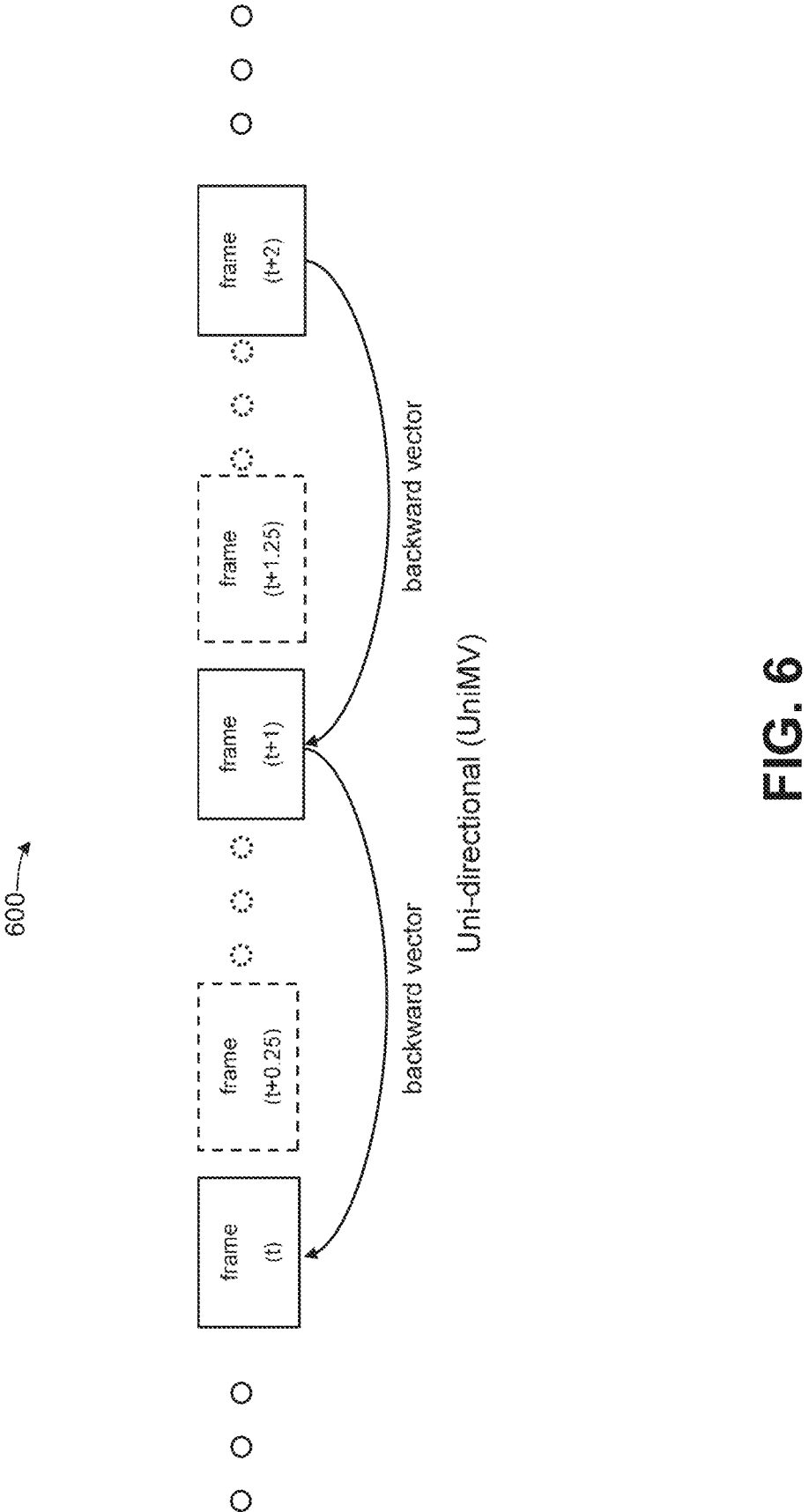
FIG. 6 is a block diagram that illustrates frame interpolation, in accordance with at least one embodiment.

FIG. 6 is a diagram that illustrates frame interpolation 600 based, at least in part, on backward pointing motion vectors (e.g., backward pointing motion vectors 522), according to at least one embodiment. In at least one embodiment, an interpolated frame generator (e.g., interpolated frame generator 502) performs frame interpolation 600. In at least one embodiment, frame interpolation 600 is referred to as a Uni-directional motion vector (UniMV) interpolation technique. In at least one embodiment, interpolated frame generator generates interpolated frames based, at least in part, on video frame information for frames shown at times (t), (t+1), and (t+2) (e.g., using pixel color data, depth, and backward pointing motion vectors).

In at least one embodiment, interpolated frame generator performs frame interpolation 600 based, at least in part, on input RGB color images (e.g., first video frame 512 and second video frame 516), depth buffers (e.g., depth indicators 514 and 518), and geometric motion vectors (e.g., backward pointing motion vectors 522). In at least one embodiment, these inputs are represented as $(I_0, D_0)$ and $(I_1, D_1)$, which correspond to input RGB color images and depth buffers at time T=0 and T=1, respectively, and $F_{1 \to 0}$ which is a uni-directional backward pointing motion vector. In at least one embodiment, input RGB color images are low frame per second (FPS) images.

Figure 7:
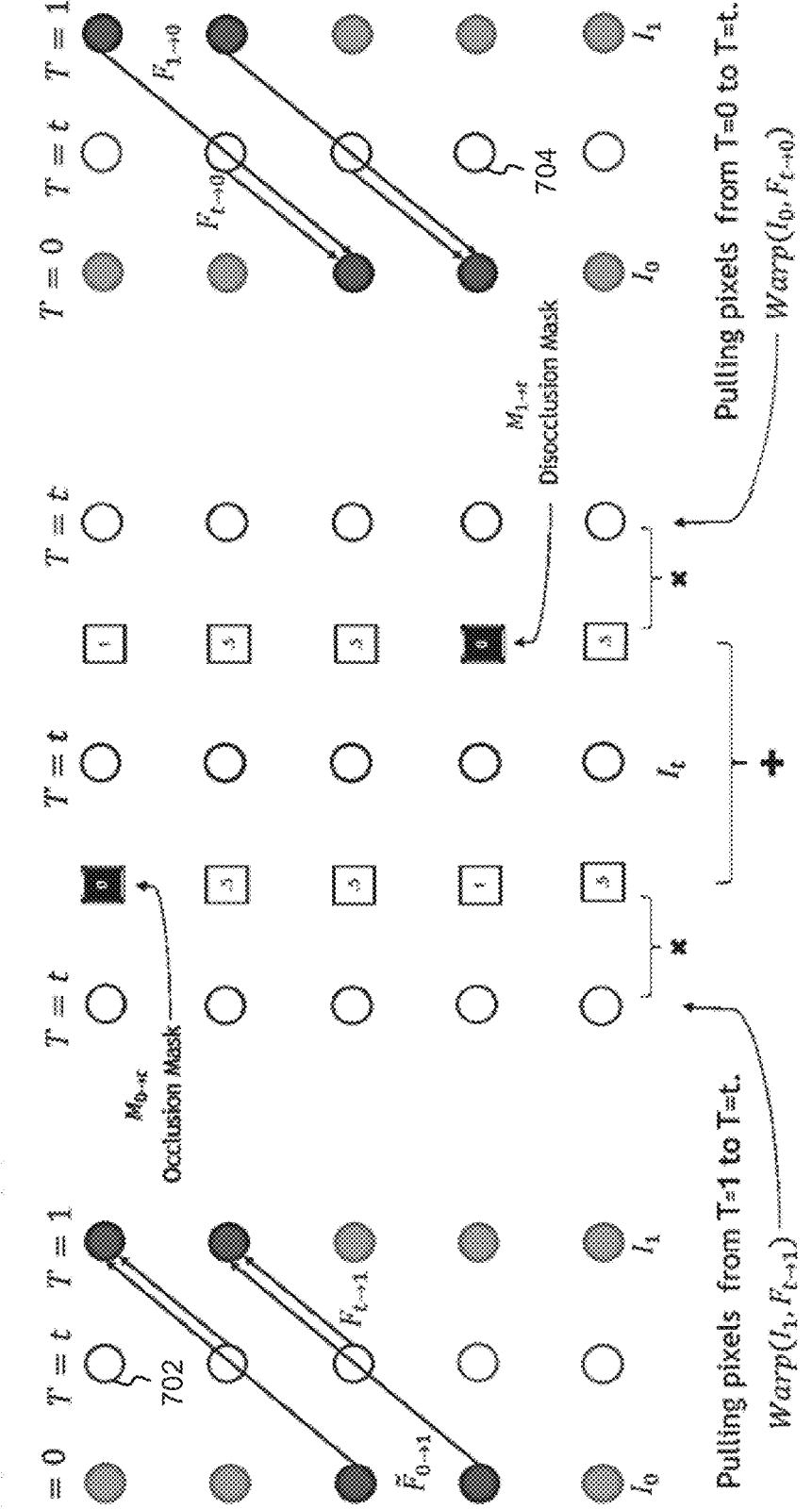
FIG. 7 is a diagram that illustrates intermediate frame synthesis, in accordance with at least one embodiment.

FIG. 7 is a diagram that illustrates intermediate frame synthesis 700 based, at least in part, on backward pointing motion vectors (e.g., backward pointing motion vectors 522), according to at least one embodiment. In at least one embodiment, interpolated frame generator 502 performs intermediate frame synthesis 700. In at least one embodiment, intermediate frame synthesis 700 is a simplified representation for purposes of illustration that shows only five pixels in one dimension at different times rather than a larger number of pixels in two dimensions as would be used in at least one embodiment. In at least one embodiment, intermediate frame synthesis 700 is referred to as Uni-directional motion vector (UniMV) intermediate frame synthesis. In at least one embodiment, intermediate frame synthesis 700 includes intermediate motion vectors ($F_{t \to 1}$, $F_{t \to 0}$), and intermediate frame synthesis 700 is guided by occlusion and dis-occlusion masks. In at least one embodiment, circle 702 indicates occlusion artifacts of warping frames from T=1, and circle 704 indicates dis-occlusion artifact of warping from T=0.

In at least one embodiment, forward pointing motion vectors are not available for intermediate frame synthesis 700, and technique of intermediate frame synthesis 300 described with respect to FIG. 3 cannot be used. In at least one embodiment, intermediate frame synthesis 700 includes estimating missing forward motion vector from given backward motion vector via a forward warping operation. In at least one embodiment, forward warping operation is referred to as a scattering operation. In at least one embodiment, intermediate frame synthesis 700 includes generating intermediate motion vectors using estimated forward pointing motion vectors and given backward pointing motion vectors.

In at least one embodiment, intermediate frame synthesis 700 includes estimating forward motion vectors $\hat{F}_{0 \to 1}$ by scattering and then flipping backward vectors. In at least one embodiment, estimating forward motion vectors is described mathematically as, $$\hat{F}_{0 \to 1}(x,y) = -1 * F_{1 \to 0}(x',y') \text{ with}$$

$$(x',y') = (x,y) - F_{1 \to 0}(x,y), \quad (7)$$

and $F_{1 \to 0}(x,y)$ being a motion vector, among all possible vectors arriving at (x,y) when warped from T=0 to T=1, with smallest depth, $D_1^{min}(x, y)$. In at least one embodiment, this scattering and preserving of information with minimum depth is used by intermediate frame synthesis 700 to resolve occlusions, because pixels with a same destination but larger depth are essentially occluded when moved from T=1 to T=0, and hence they are suppressed.

In at least one embodiment, as discussed with respect to FIG. 4, a forward warping leads to ambiguities such as holes in destination pixels. In at least one embodiment, intermediate frame synthesis 700, includes marking these holes as an occlusion mask (when forward warping from T=1 to T=0), or a dis-occlusion mask (when forward warping from T=0 to T=1). In at least one embodiment, forward motion vector estimation with Equation (7) will lead to holes at destination (T=0), creating pixels with undefined motion vectors in occlusion regions.

In at least one embodiment, interpolated frame generator applies weighting factors to pixel data pulled from pixels from first video frame (e.g., at T=0) and second video frame (e.g., at T=1) based, at least in part, on whether occlusion and/or dis-occlusion masks apply, and/or based on a relative time value of interpolated frame in relation to first video frame and second video frame (e.g., whether interpolated frame corresponds to time t=0.25, t=0.5, or t=0.75). In at least one embodiment, for pixels affected by an occlusion mask (e.g., circle 702), interpolated frame generator applies a weighting factor of 1 to pixel pulled from first frame (e.g., from T=0 to T=t) and a weighting factor of 0 to pixel pulled from second frame (e.g., from T=1 to T=t) as shown in FIG. 7. In at least one embodiment, for pixels affected by an dis-occlusion mask (e.g., circle 704), interpolated frame generator applies a weighting factor of 0 to pixel pulled from first frame (e.g., from T=0 to T=t) and a weighting factor of 1 to pixel pulled from second frame (e.g., from T=1 to T=t) as shown in FIG. 7. In at least one embodiment, for pixels not affected by an occlusion mask or a dis-occlusion mask, interpolated frame generator applies weighting factors according to a relative distance in time of interpolated frame to first video frame and second video frame (e.g., 0.5 applied to both when interpolated frame is half way between as shown in FIG. 7). In at least one embodiment, interpolated frame generator samples pixels of an additional input frame (e.g., an additional frame that occurs before T=0 in which corresponding pixel is visible, or an additional frame T=2 that occurs after T=1 in which the corresponding pixel is visible) for pixels of intermediate frame not visible from frame at T=0 or T=1 (e.g., disoccluded and occluded simultaneously).

In at least one embodiment, an interpolated frame generator (e.g., interpolated frame generator 502) recovers (e.g., generates) one or more motion vectors for an occlusion region at T=0 (e.g., region where Equation (7) produces undefined vectors). In at least one embodiment, interpolated frame generator recovers motion vectors based, at least in part, on an implementation of a Procrustes analysis. In at least one embodiment, while using this approximation generally leads to acceptable intermediate frame synthesis, it can only capture static object movement, also referred to as camera movement. In at least one embodiment, interpolated frame generator uses dis-occlusion region at T=t that is visible from T=1. In at least one embodiment, interpolated frame generator establishes a one-to-one correspondence between each point in dis-occlusion region with corresponding point in frame at T=1, guided by intermediate motion vector $F_{t \to 1}$. In at least one embodiment, interpolated frame generator generates intermediate motion vectors in similar manner to that described with respect to FIG. 3 and FIG. 4, but based, at least in part, on estimated forward pointing motion vectors when actual forward pointing motion vectors are not available from a buffer (e.g., not available from a buffer in system 500). In at least one embodiment, once correspondence is established, interpolated frame generator forms a 3D point set for each pixel, treating integral indices (x,y) and their depth z, as a point in 3D (x,y,z). In at least one embodiment, interpolated frame generator computes a matrix that registers those 3D point sets, giving an approximate estimation of a global or camera translation, rotation and zoom information. In at least one embodiment, when camera information is available from a buffer (e.g., camera data 520 and camera data 524), interpolated frame generator determines camera position and/or movement (e.g., translation, rotation, and/or zoom) based, at least in part, on buffered camera information (e.g., camera matrix at time of first video frame and second video frame) instead of estimating camera movement based, at least in part, on 3D point sets.

In at least one embodiment, since a camera matrix is global information applicable to an entire video frame, interpolated frame generator extrapolates same camera matrix to other regions (e.g., non dis-occlusion region), including occlusion region. In at least one embodiment, forward motion vectors are undefined in occlusion region, and extrapolation of camera matrix to occlusion region generates approximate motion vectors that are used where forward motion vectors are undefined. In at least one embodiment, once a camera matrix is generated, interpolated frame generator creates corresponding motion vectors on each corresponding pixel (e.g., in regions with undefined vectors), $F_{t \to 1}^{cam}$.

In at least one embodiment, a final estimated intermediate vector pointing from T=t to T=1 is given mathematically by, $$F_{t \to 1}(x,y)=(1-M_{0 \to t})\hat{F}_{t \to 1}+M_{0 \to t}F_{t \to 1}{}^{cam}, \qquad (8)$$

where $\hat{F}_{t \to 0}$ is generated using $\hat{F}_{0 \to 1}$ in a similar manner as that described with respect to FIGS. 3 and 4. In at least one embodiment, other information ($\hat{F}_{t \to 1}$, $M_{0 \to t}$, $M_{1 \to t}$) for intermediate frame synthesis using Equation (2) is generated as described with respect to FIGS. 3 and 4, after replacing $F_{0 \to 1}$ with $\hat{F}_{0 \to 1}$.

FIG. 8 illustrates a flowchart of a technique 800 of generating an intermediate video frame, according to at least on embodiment. In at least one embodiment, technique 800 is performed by at least one circuit, at least one system (e.g., system 100), at least one processor, at least one graphics processing unit, at least one parallel processor, and/or at least some other processor or component thereof described and/or shown herein. In at least one embodiment, an inter-polated frame generator (e.g., interpolated frame generator 102) performs technique 800.

In at least one embodiment, at a block 802, technique 800 includes sampling a first set of pixel data of a first video frame (e.g., frame 112). In at least one embodiment, at a block 804, technique 800 includes sampling a second set of pixel data of a second video frame (e.g., frame 116) based, at least in part, on a set of forward pointing motion vectors (e.g., forward pointing motion vectors 120) from first video frame to second video frame. In at least one embodiment, at a block 806, technique 800 includes generating an interme-diate video frame (e.g., interpolated frame 124) based, at least in part, on first set of pixel data and second set of pixel data. In at least one embodiment, at a block 808, technique 800 includes performing other actions.

In at least one embodiment, performing other actions includes storing generated intermediate video frame in a buffer. In at least one embodiment, performing other actions includes displaying intermediate video frame. In at least one embodiment, performing other actions includes transmitting intermediate video frame over a network. In at least one embodiment, performing other actions includes generating one or more additional intermediate video frames between first video frame and second video frame based, at least in part, on first video frame, second video frame, a set of forward pointing motion vectors, a set of backward pointing motion vectors, and a set of depth indicators. In at least one embodiment, performing other actions includes identifying a pixel of intermediate video frame that does not have a corresponding pixel in second video frame identified using a forward pointing motion vector (e.g., along a forward pointing motion vector and/or corresponding to a function of a forward pointing motion vector), or a corresponding pixel in first video frame identified using a backward pointing motion vector (e.g., along a backward pointing motion vector and/or corresponding to a function of a backward pointing motion vector), and setting identified pixel of intermediate video frame to a color of one of a pixel at same location as identified pixel in first video frame or second video frame based, at least in part, on depth values of pixels at same location of identified pixel in first video frame and second video frame. In at least one embodiment, setting identified pixel color is based, at least in part, on setting pixel color to a color of a pixel at a same location in first video frame or second video frame that has greatest depth. In at least one embodiment, performing other actions includes storing one or more interpolated frames in a buffer and/or notifying (e.g., by setting a flag value or sending an indicator) a game engine that interpolated frames are avail-able for display.

Figure 9:
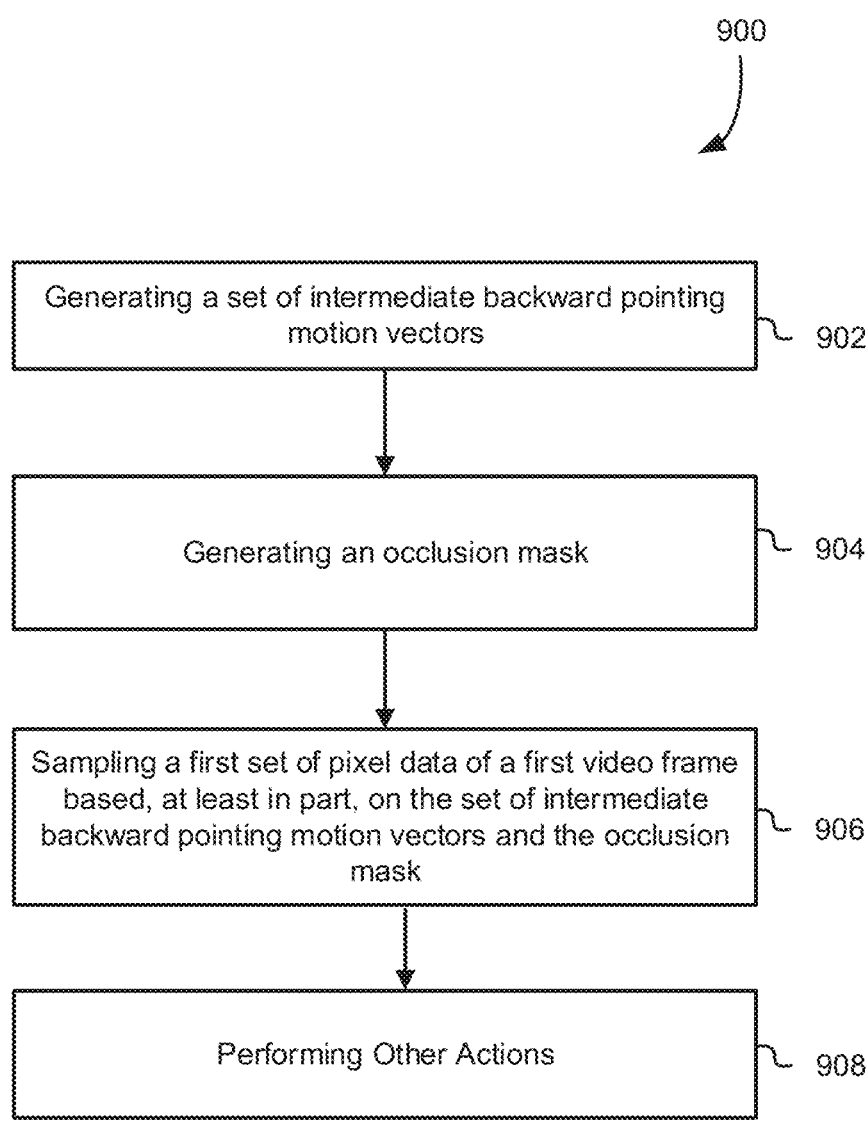
FIG. 9 illustrates a flowchart of a technique of sampling a first set of pixel data, in accordance with at least one embodiment.

FIG. 9 illustrates a flowchart of a technique 900 of sampling a first set of pixel data, according to at least one embodiment. In at least one embodiment, technique 900 is performed by at least one circuit, at least one system (e.g., system 100), at least one processor, at least one graphics processing unit, at least one parallel processor, and/or at least some other processor or component thereof described and/or shown herein. In at least one embodiment, an inter-polated frame generator (e.g., interpolated frame generator 102) performs technique 900. In at least one embodiment, technique 900 is a more detailed representation of block 802 of FIG. 8.

In at least one embodiment, at a block 902, technique 900 includes generating a set of intermediate backward pointing motion vectors (e.g., including $F_{t \to 0}$ shown in FIG. 3). In at least one embodiment, at a block 904, technique 900 includes generating an occlusion mask (e.g., $M_{0 \to t}$ shown in FIG. 3). In at least one embodiment, at a block 906, technique 900 includes sampling a first set of pixel data of a first video frame based, at least in part, on set of interme-diate backward pointing motion vectors and generated occlusion mask. In at least one embodiment, at a block 908, technique 900 includes performing other actions.

Figure 10:
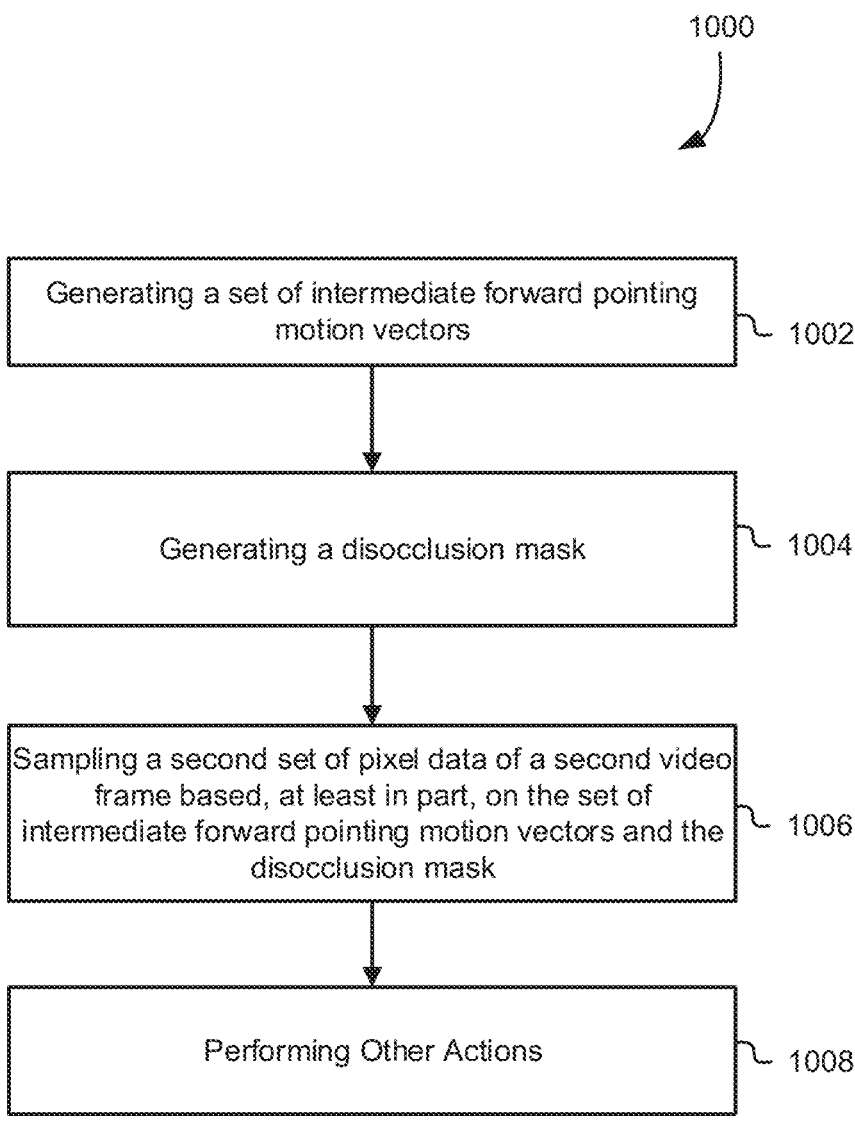
FIG. 10 illustrates a flowchart of a technique of sampling a second set of pixel data, in accordance with at least one embodiment.

FIG. 10 illustrates a flowchart of a technique 1000 of sampling a second set of pixel data, according to at least one embodiment. In at least one embodiment, technique 1000 is performed by at least one circuit, at least one system (e.g., system 100), at least one processor, at least one graphics processing unit, at least one parallel processor, and/or at least some other processor or component thereof described and/or shown herein. In at least one embodiment, an inter-polated frame generator (e.g., interpolated frame generator 102) performs technique 1000. In at least one embodiment, technique 1000 is a more detailed representation of block 804 of FIG. 8.

In at least one embodiment, at a block 1002, technique 1000 includes generating a set of intermediate forward pointing motion vectors (e.g., including $F_{t \to 1}$ shown in FIG. 3). In at least one embodiment, at a block 1004, technique 1000 includes generating a dis-occlusion mask (e.g., $M_{1 \to t}$ shown in FIG. 3). In at least one embodiment, at a block 1006, technique 1000 includes sampling a second set of pixel data based, at least in part, on set of intermediate forward pointing motion vectors and generated dis-occlu-sion mask. In at least one embodiment, at a block 1008, technique 1000 include performing other actions.

FIG. 11 illustrates a flowchart of a technique 1100 of generating an intermediate video frame, according to at least on embodiment. In at least one embodiment, technique 1100 is performed by at least one circuit, at least one system (e.g., system 500), at least one processor, at least one graphics processing unit, at least one parallel processor, and/or at least some other processor or component thereof described and/or shown herein. In at least one embodiment, an inter-polated frame generator (e.g., interpolated frame generator 502) performs technique 1100.

In at least one embodiment, at a block 1102, technique 1100 includes generating a set of estimated forward pointing motion vectors (e.g., including $\hat{F}_{0 \to 1}$ shown in FIG. 7) based, at least in part, on a set of backward pointing motion vectors (e.g., backward pointing motion vectors 522). In at least one embodiment, at a block 1104, technique 1100 includes generating a set of intermediate forward pointing motion vectors (e.g., including $F_{t \to 1}$ shown in FIG. 7) and a set of intermediate backward pointing motion vectors (e.g., including $F_{t \to 0}$ shown in FIG. 7). In at least one embodiment, interpolated frame generator generates set of intermediate forward pointing motion vectors based, at least in part, on generated set of estimated forward pointing motion vectors. In at least one embodiment, interpolated frame generator generates set of intermediate backward pointing motion vectors based, at least in part, on set of backward pointing motion vectors.

In at least one embodiment, at a block 1106, technique 1100 includes sampling a first set of pixel data of a first video frame (e.g., video frame 512) based, at least in part, on generated set of intermediate backward pointing motion vectors. In at least one embodiment, sampling first set of pixel data includes generating an occlusion mask (e.g., $M_{0 \to t}$ shown in FIG. 7) and sampling first set of pixel data based, at least in part, on generated occlusion mask. In at least one embodiment, at a block 1108, technique 1100 includes sampling a second set of pixel data of a second video frame (e.g., video frame 516) based, at least in part, on generated set of intermediate forward pointing motion vectors. In at least one embodiment, sampling second set of pixel data includes generating a dis-occlusion mask (e.g., $M_{1 \to t}$ shown in FIG. 7) and sampling second set of pixel data based, at least in part, on generated dis-occlusion mask.

In at least one embodiment, at a block 1110, technique 1100 includes generating a third video frame (e.g., interpolated frame 520) based, at least in part, on sampled first set of pixel data and sampled second set of pixel data. In at least one embodiment, third video frame is an intermediate video frame between first video frame and second video frame. In at least one embodiment, generating third video frame is referred to as interpolating third video frame. In at least one embodiment, interpolating third video frame is based, at least in part, on one of a plurality of possible motions of pixels from first video frame to second video frame, where plurality of possible motions corresponds to a set of backward pointing motion vectors that point to same destination pixel in first video frame, and interpolated frame generator selects one of set of backward pointing motion vectors based, at least in part, on a shortest depth of source pixel associated with selected backward pointing motion vector compared to other source pixels of backward pointing motion vectors that point to same destination pixel. In at least one embodiment, at a block 1112, technique 1100 includes performing other actions.

In at least one embodiment, performing other actions includes storing generated third video frame in a buffer. In at least one embodiment, performing other actions includes displaying intermediate video frame. In at least one embodiment, performing other actions includes transmitting intermediate video frame over a network. In at least one embodiment, performing other actions includes generating one or more additional intermediate video frames (e.g., interpolated frame 522 and/or interpolated frame 524) between first video frame and second video frame based, at least in part, on first video frame, second video frame, set of backward pointing motion vectors (e.g., backward pointing motion vectors 522), and a set of depth indicators (e.g., depth indicators 514 and/or depth indicators 518). In at least one embodiment, performing other actions includes storing one or more interpolated frames in a buffer and/or notifying (e.g., by setting a flag value or sending an indicator) a game engine that interpolated frames are available for display.

FIG. 12 illustrates a first video frame 1200 and a second video frame 1202, according to at least one embodiment. In at least one embodiment, first video frame 1200 corresponds to frame 112 and second video frame 1202 corresponds to frame 116. In at least one embodiment, first video frame 1200 corresponds to frame 512 and second video frame 1202 corresponds to frame 516. In at least one embodiment, first video frame 1200 corresponds to first video frame of technique 800 and second video frame 1202 corresponds to second video frame of technique 800. In at least one embodiment, first video frame 1200 corresponds to first video frame of technique 1100 and second video frame 1202 corresponds to second video frame of technique 1100. In at least one embodiment, first video frame 1200 occurs before second video frame 1202 in a video frame sequence. In at least one embodiment, pixel data (e.g., RGB color values), depth data, and one or more of backward pointing motion vectors and forward pointing motion vectors are generated by a video game engine and stored in one or more buffers before displaying. Although first video frame 1200 and second video frame 1202 are shown in grayscale, it should be understood that first video frame 1200 and second video frame 1202 will typically be displayed in color. In at least one embodiment, it can be seen that a character represented in first video frame 1200 and second video frame 1202 moves a bit leftward and raises a gun barrel slightly between a first time associated with first video frame 1200 and a second, later time, associated with second video frame 1202.

FIG. 13 illustrates an intermediate video frame 1300 with an overlaid dis-occlusion mask, and an intermediate video frame 1302 with an overlaid occlusion mask, according to at least one embodiment. In at least one embodiment, dis-occlusion mask includes a region 1304 that shows a region, originally hidden by gun in first video frame 1200 that was dis-occluded. In at least one embodiment, occlusion mask includes a region 1306 that shows a region that corresponds to a region hidden by gun barrel in second video frame 1202. In at least one embodiment, dis-occlusion mask includes additional regions and/or occlusion mask includes additional regions, however not all dis-occlusion regions and occlusion regions in intermediate video frame 1300 and intermediate video frame 1302 are specifically identified, for clarity.

Figure 14:
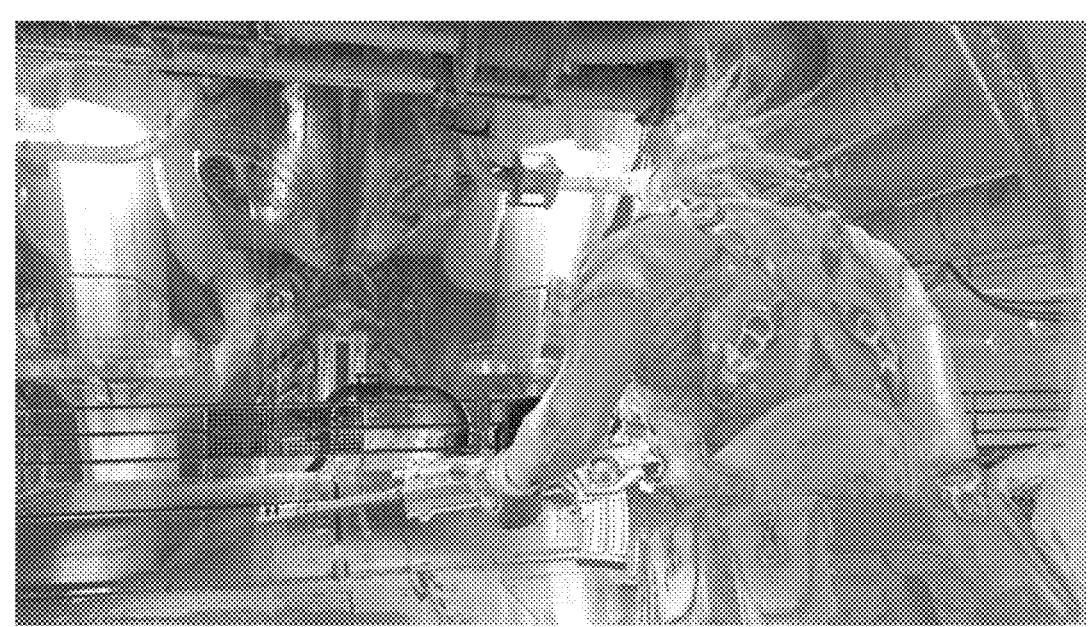
FIG. 14 illustrates a generated intermediate video frame, in accordance with at least one embodiment.

FIG. 14 illustrates a generated intermediate video frame 1400, in accordance with at least one embodiment. In at least one embodiment, generated intermediate video frame 1400 corresponds to an interpolated frame in set of interpolated frames 104. In at least one embodiment, generated intermediate video frame 1400 corresponds to an interpolated frame in set of interpolated frames 504. In at least one embodiment, generated intermediate video frame 1400 corresponds to generated intermediate video frame of technique 800. In at least one embodiment, generated intermediate video frame 1400 corresponds to generated third video frame of technique 1100. In at least one embodiment, regions of intermediate video frame 1400 that correspond to dis-occluded regions of intermediate video frame 1300 (e.g., region 1304) include pixel data sampled from second video frame 1202, but not first video frame 1200. In at least one embodiment, regions of intermediate video frame 1400 that correspond to occluded regions of intermediate video frame 1302 (e.g., region 1306) include pixel data sampled from first video frame 1200, but not second video frame 1202. In at least one embodiment, regions of intermediate video frame 1400 that do not correspond to a dis-occluded region of intermediate video frame 1300 or an occluded region of intermediate video frame 1302, are interpolated based, at least in part, on pixel data sampled from both first video frame 1200 and second video frame 1202.

In at least one embodiment, intermediate video frame 1300, intermediate video frame 1302, and/or intermediate video frame 1400 would differ depending on whether intermediate video frames correspond to an interpolated frame in set of interpolated frames 104, or an interpolated frame in set of interpolated frames 504, based, at least in part, on differences in interpolation due to having forward pointing motion vectors available in a buffer for interpolated frame in set of interpolated frames 104, but estimating forward pointing motion vectors using backward pointing motion vectors and depth information for interpolated frame in set of interpolated frames 504. In at least one embodiment, although intermediate video frame 1300 and intermediate video frame 1302 are shown for purposes of illustration, an interpolated frame generator (e.g., interpolated frame generator 102 or interpolated frame generator 502) would generate intermediate frame 1400 based, at least in part, on occlusion and dis-occlusion information (e.g., occlusion and dis-occlusion masks) without generating and/or using intermediate frames having overlaid dis-occlusion and occlusion regions (e.g., intermediate video frame 1300 and/or intermediate video frame 1302). In at least one embodiment, interpolated frame generator (e.g., interpolated frame generator 102 or interpolated frame generator 502) generates interpolated frame (e.g., intermediate video frame 1400) in real time (e.g., quickly enough that interpolated frame is generated during game play). In at least one embodiment, interpolated frame generator generates interpolated frame in a video game and/or a ray tracing application.

In at least one embodiment, interpolated frame generator (e.g., interpolated frame generator 102 or interpolated frame generator 502) performs frame interpolation by synthesizing a high frames-per-second (FPS) video for a low FPS video. In at least one embodiment, interpolated frame generator synthesizes one or more intermediate frames from a given pair of consecutive input frames (e.g., first video frame 1200 and second video frame 1202). In at least one embodiment, synthesizing high FPS video using interpolated frame generator provides advantages over alternative approaches such as using high speed cameras, which come with a high power cost, large storage requirements, and reduced video resolutions. In at last one embodiment, synthesizing high FPS video using interpolated frame generator provides advantages over using an initially high rate of frame rendering in video games by graphics processing units (GPUs), which comes at a cost of reduced image quality and/or power consumption. In at least one embodiment, synthesizing high FPS video using interpolated frame generator produces arbitrarily high FPS frame sequences from low FPS frame sequences, with minimal latency or power requirements, which can improve a player's game performance during game play, and provides advantages over other approaches that have higher power requirements (e.g., initially high FPS sequence by a GPU) or higher latency (e.g., some machine learning approaches). In at least one embodiment, synthesizing high FPS video using interpolated frame generator does not use inferencing operations from a machine learning (e.g., deep learning) approach. In at least one embodiment, synthesizing high FPS video using interpolated frame generator provides advantages (e.g., better handling of occluded and dis-occluded regions) than some deep learning approaches. In at least one embodiment, interpolating frames using interpolated frame generator is based, at least in part, on an assumption that pixels move linearly in time, and samples pixels along a linear path formed by graphics motion vectors to create full frames at arbitrarily many (e.g., a predetermined number, or a parametrically controlled number such as via an API) intermediate time points. In at least one embodiment, interpolating frames using interpolated frame generator is based, at least in part, on an assumption that pixels move in a manner that corresponds to a function of graphics motion vectors, and samples pixels identified using graphics motion vectors to create full frames (e.g., sampling pixels along graphics motion vectors, sampling pixels approximately along graphics motion vectors such as by sampling based on a graphics motion vector and a noise value, sampling based on a graphics motion vector and a predetermined acceleration parameter, and/or some other suitable sampling methodology). In at least one embodiment, interpolating frames using interpolated frame generator based, at least in part, on two consecutive frames provides advantages (e.g., reduced level of artifacts) over approaches that do not use both frames.

Data Center

FIG. 15 illustrates an exemplary data center 1500, in accordance with at least one embodiment. In at least one embodiment, data center 1500 includes, without limitation, a data center infrastructure layer 1510, a framework layer 1520, a software layer 1530 and an application layer 1540.

In at least one embodiment, as shown in FIG. 15, data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (solid state or disk drives), network input/output ("NW I/O") devices, network switches, virtual machines ("VMs"), power modules, and cooling modules, etc. In at least one embodiment, one or more node C.R.s from among node C.R.s 1516(1)-1516(N) may be a server having one or more of above-mentioned computing resources.

In at least one embodiment, grouped computing resources 1514 may include separate groupings of node C.R.s housed within one or more racks (not shown), or many racks housed in data centers at various geographical locations (also not shown). Separate groupings of node C.R.s within grouped computing resources 1514 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1512 may configure or otherwise control one or more node C.R.s 1516(1)-1516(N) and/or grouped computing resources 1514. In at least one embodiment, resource orchestrator 1512 may include a software design infrastructure ("SDI") management entity for data center 1500. In at least one embodiment, resource orchestrator 1512 may include hardware, software or some combination thereof.

In at least one embodiment, as shown in FIG. 15, framework layer 1520 includes, without limitation, a job scheduler 1532, a configuration manager 1534, a resource manager 1536 and a distributed file system 1538. In at least one embodiment, framework layer 1520 may include a framework to support software 1552 of software layer 1530 and/or one or more application(s) 1542 of application layer 1540. In at least one embodiment, software 1552 or application(s) 1542 may respectively include web-based service software or applications, such as those provided by Amazon Web Services, Google Cloud and Microsoft Azure. In at least one embodiment, framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1532 may include a Spark driver to facilitate scheduling of workloads supported by various layers of data center 1500. In at least one embodiment, configuration manager 1534 may be capable of configuring different layers such as software layer 1530 and framework layer 1520, including Spark and distributed file system 1538 for supporting large-scale data processing. In at least one embodiment, resource manager 1536 may be capable of managing clustered or grouped computing resources mapped to or allocated for support of distributed file system 1538 and job scheduler 1532. In at least one embodiment, clustered or grouped computing resources may include grouped computing resource 1514 at data center infrastructure layer 1510. In at least one embodiment, resource manager 1536 may coordinate with resource orchestrator 1512 to manage these mapped or allocated computing resources.

In at least one embodiment, software 1552 included in software layer 1530 may include software used by at least portions of node C.R.s 1516(1)-1516(N), grouped computing resources 1514, and/or distributed file system 1538 of framework layer 1520. One or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516 (1)-1516(N), grouped computing resources 1514, and/or distributed file system 1538 of framework layer 1520. In at least one or more types of applications may include, without limitation, CUDA applications.

In at least one embodiment, any of configuration manager 1534, resource manager 1536, and resource orchestrator 1512 may implement any number and type of self-modifying actions based on any amount and type of data acquired in any technically feasible fashion. In at least one embodiment, self-modifying actions may relieve a data center operator of data center 1500 from making possibly bad configuration decisions and possibly avoiding underutilized and/or poor performing portions of a data center.

Computer-Based Systems

The following figures set forth, without limitation, exemplary computer-based systems that can be used to implement at least one embodiment. In at least one embodiment, one or more computer-based systems of following figures can implement one or more aspects of an embodiment described with respect to one or more of FIGS. 1-14, and/or one or more techniques described with respect to FIGS. 8-11.

Figure 16:
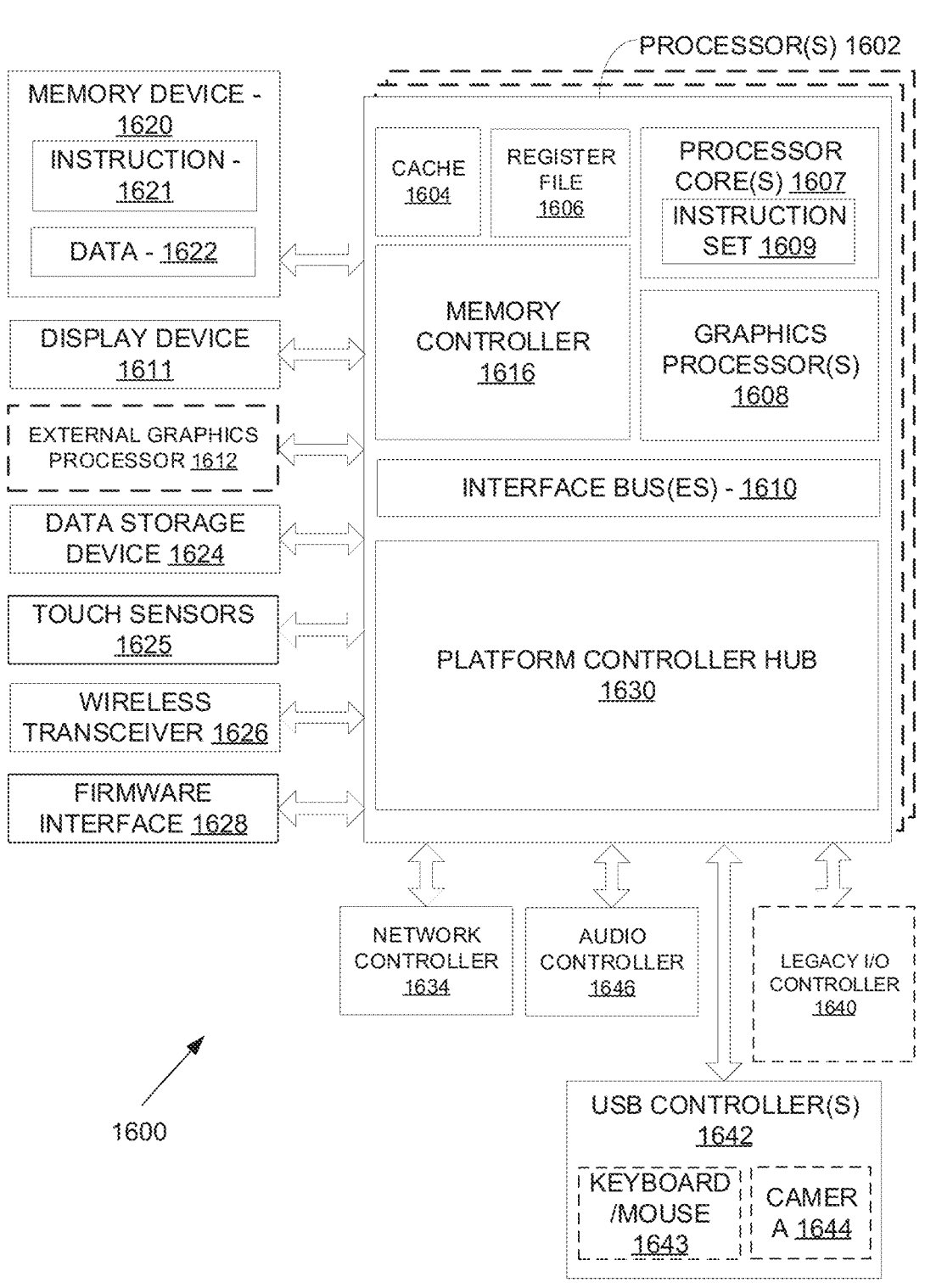
FIG. 16 illustrates a processing system, in accordance with at least one embodiment.

FIG. 16 illustrates a processing system 1600, in accordance with at least one embodiment. In at least one embodiment, processing system 1600 includes one or more processors 1602 and one or more graphics processors 1608, and may be a single processor desktop system, a multiprocessor workstation system, or a server system having a large number of processors 1602 or processor cores 1607. In at least one embodiment, processing system 1600 is a processing platform incorporated within a system-on-a-chip ("SoC") integrated circuit for use in mobile, handheld, or embedded devices.

In at least one embodiment, processing system 1600 can include, or be incorporated within a server-based gaming platform, a game console, a media console, a mobile gaming console, a handheld game console, or an online game console. In at least one embodiment, processing system 1600 is a mobile phone, smart phone, tablet computing device or mobile Internet device. In at least one embodiment, processing system 1600 can also include, couple with, or be integrated within a wearable device, such as a smart watch wearable device, smart eyewear device, augmented reality device, or virtual reality device. In at least one embodiment, processing system 1600 is a television or set top box device having one or more processors 1602 and a graphical interface generated by one or more graphics processors 1608.

In at least one embodiment, one or more processors 1602 each include one or more processor cores 1607 to process instructions which, when executed, perform operations for system and user software. In at least one embodiment, each of one or more processor cores 1607 is configured to process a specific instruction set 1609. In at least one embodiment, instruction set 1609 may facilitate Complex Instruction Set Computing ("CISC"), Reduced Instruction Set Computing ("RISC"), or computing via a Very Long Instruction Word ("VLIW"). In at least one embodiment, processor cores 1607 may each process a different instruction set 1609, which may include instructions to facilitate emulation of other instruction sets. In at least one embodiment, processor core 1607 may also include other processing devices, such as a digital signal processor ("DSP").

In at least one embodiment, processor 1602 includes cache memory ("cache") 1604. In at least one embodiment, processor 1602 can have a single internal cache or multiple levels of internal cache. In at least one embodiment, cache memory is shared among various components of processor 1602. In at least one embodiment, processor 1602 also uses an external cache (e.g., a Level 3 ("L3") cache or Last Level Cache ("LLC")) (not shown), which may be shared among processor cores 1607 using known cache coherency techniques. In at least one embodiment, register file 1606 is additionally included in processor 1602 which may include different types of registers for storing different types of data (e.g., integer registers, floating point registers, status registers, and an instruction pointer register). In at least one embodiment, register file 1606 may include general-purpose registers or other registers.

In at least one embodiment, one or more processor(s) 1602 are coupled with one or more interface bus(es) 1610 to transmit communication signals such as address, data, or control signals between processor 1602 and other components in processing system 1600. In at least one embodiment interface bus 1610, in one embodiment, can be a processor bus, such as a version of a Direct Media Interface ("DMI") bus. In at least one embodiment, interface bus 1610 is not limited to a DMI bus, and may include one or more Peripheral Component Interconnect buses (e.g., "PCI," PCI Express ("PCIe")), memory buses, or other types of interface buses. In at least one embodiment processor(s) 1602 include an integrated memory controller 1616 and a platform controller hub 1630. In at least one embodiment, memory controller 1616 facilitates communication between a memory device and other components of processing system 1600, while platform controller hub ("PCH") 1630 provides connections to Input/Output ("I/O") devices via a local I/O bus.

In at least one embodiment, memory device 1620 can be a dynamic random access memory ("DRAM") device, a static random access memory ("SRAM") device, flash memory device, phase-change memory device, or some other memory device having suitable performance to serve as processor memory. In at least one embodiment memory device 1620 can operate as system memory for processing system 1600, to store data 1622 and instructions 1621 for use when one or more processors 1602 executes an application or process. In at least one embodiment, memory controller 1616 also couples with an optional external graphics processor 1612, which may communicate with one or more graphics processors 1608 in processors 1602 to perform graphics and media operations. In at least one embodiment, a display device 1611 can connect to processor(s) 1602. In at least one embodiment display device 1611 can include one or more of an internal display device, as in a mobile electronic device or a laptop device or an external display device attached via a display interface (e.g., DisplayPort, etc.). In at least one embodiment, display device 1611 can include a head mounted display ("HMD") such as a stereoscopic display device for use in virtual reality ("VR") applications or augmented reality ("AR") applications.

In at least one embodiment, platform controller hub 1630 enables peripherals to connect to memory device 1620 and processor 1602 via a high-speed I/O bus. In at least one embodiment, I/O peripherals include, but are not limited to, an audio controller 1646, a network controller 1634, a firmware interface 1628, a wireless transceiver 1626, touch sensors 1625, a data storage device 1624 (e.g., hard disk drive, flash memory, etc.). In at least one embodiment, data storage device 1624 can connect via a storage interface (e.g., SATA) or via a peripheral bus, such as PCI, or PCIe. In at least one embodiment, touch sensors 1625 can include touch screen sensors, pressure sensors, or fingerprint sensors. In at least one embodiment, wireless transceiver 1626 can be a Wi-Fi transceiver, a Bluetooth transceiver, or a mobile network transceiver such as a 3G, 4G, or Long Term Evolution ("LTE") transceiver. In at least one embodiment, firmware interface 1628 enables communication with system firmware, and can be, for example, a unified extensible firmware interface ("UEFI"). In at least one embodiment, network controller 1634 can enable a network connection to a wired network. In at least one embodiment, a high-performance network controller (not shown) couples with interface bus 1610. In at least one embodiment, audio controller 1646 is a multi-channel high definition audio controller. In at least one embodiment, processing system 1600 includes an optional legacy I/O controller 1640 for coupling legacy (e.g., Personal System 2 ("PS/2")) devices to processing system 1600. In at least one embodiment, platform controller hub 1630 can also connect to one or more Universal Serial Bus ("USB") controllers 1642 connect input devices, such as keyboard and mouse 1643 combinations, a camera 1644, or other USB input devices.

In at least one embodiment, an instance of memory controller 1616 and platform controller hub 1630 may be integrated into a discreet external graphics processor, such as external graphics processor 1612. In at least one embodiment, platform controller hub 1630 and/or memory controller 1616 may be external to one or more processor(s) 1602. For example, in at least one embodiment, processing system 1600 can include an external memory controller 1616 and platform controller hub 1630, which may be configured as a memory controller hub and peripheral controller hub within a system chipset that is in communication with processor(s) 1602.

Figure 17:
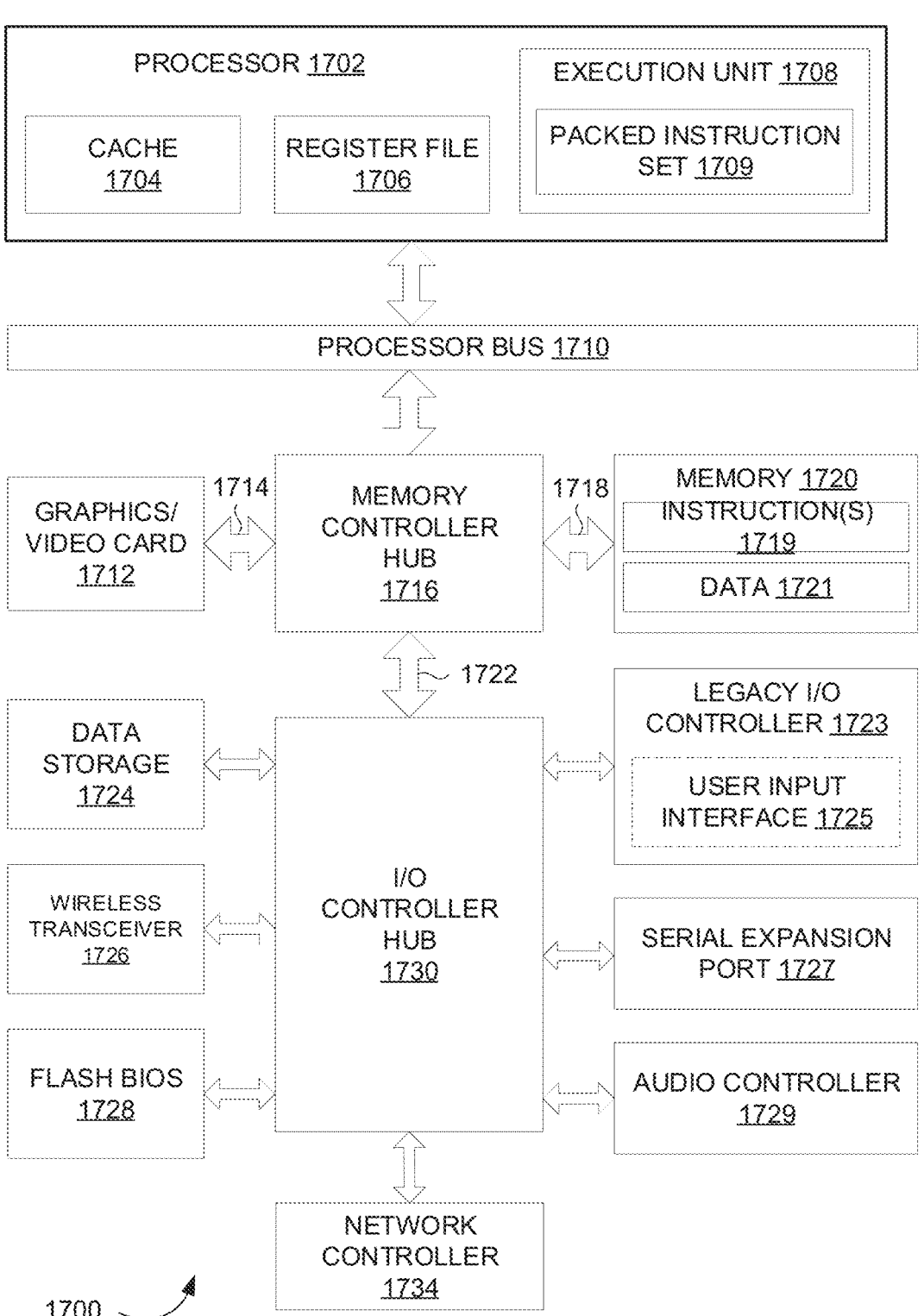
FIG. 17 illustrates a computer system, in accordance with at least one embodiment.

FIG. 17 illustrates a computer system 1700, in accordance with at least one embodiment. In at least one embodiment, computer system 1700 may be a system with interconnected devices and components, an SOC, or some combination. In at least on embodiment, computer system 1700 is formed with a processor 1702 that may include execution units to execute an instruction. In at least one embodiment, computer system 1700 may include, without limitation, a component, such as processor 1702 to employ execution units including logic to perform algorithms for processing data. In at least one embodiment, computer system 1700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1700 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), an SoC, network computers ("NetPCs"), set-top boxes, network hubs, wide area network ("WAN") switches, or any other system that may perform one or more instructions.

In at least one embodiment, computer system 1700 may include, without limitation, processor 1702 that may include, without limitation, one or more execution units 1708 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1700 is a single processor desktop or server system. In at least one embodiment, computer system 1700 may be a multiprocessor system. In at least one embodiment, processor 1702 may include, without limitation, a CISC microprocessor, a RISC microprocessor, a VLIW microprocessor, a processor implementing a combination of instruction sets, or any other processor device, such as a digital signal processor, for example. In at least one embodiment, processor 1702 may be coupled to a processor bus 1710 that may transmit data signals between processor 1702 and other components in computer system 1700.

In at least one embodiment, processor 1702 may include, without limitation, a Level 1 ("L1") internal cache memory ("cache") 1704. In at least one embodiment, processor 1702 may have a single internal cache or multiple levels of internal cache. In at least one embodiment, cache memory may reside external to processor 1702. In at least one embodiment, processor 1702 may also include a combination of both internal and external caches. In at least one embodiment, a register file 1706 may store different types of data in various registers including, without limitation, integer registers, floating point registers, status registers, and instruction pointer register.

In at least one embodiment, execution unit 1708, including, without limitation, logic to perform integer and floating point operations, also resides in processor 1702. Processor 1702 may also include a microcode ("ucode") read only memory ("ROM") that stores microcode for certain macro instructions. In at least one embodiment, execution unit 1708 may include logic to handle a packed instruction set 1709. In at least one embodiment, by including packed instruction set 1709 in an instruction set of a general-purpose processor 1702, along with associated circuitry to execute instructions, operations used by many multimedia applications may be performed using packed data in a general-purpose processor 1702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1708 may also be used in microcontrollers, embedded processors, graphics devices, DSPs, and other types of logic circuits. In at least one embodiment, computer system 1700 may include, without limitation, a memory 1720. In at least one embodiment, memory 1720 may be implemented as a DRAM device, an SRAM device, flash memory device, or other memory device. Memory 1720 may store instruction(s) 1719 and/or data 1721 represented by data signals that may be executed by processor 1702.

In at least one embodiment, a system logic chip may be coupled to processor bus 1710 and memory 1720. In at least one embodiment, the system logic chip may include, without limitation, a memory controller hub ("MCH") 1716, and processor 1702 may communicate with MCH 1716 via processor bus 1710. In at least one embodiment, MCH 1716 may provide a high bandwidth memory path 1718 to memory 1720 for instruction and data storage and for storage of graphics commands, data and textures. In at least one embodiment, MCH 1716 may direct data signals between processor 1702, memory 1720, and other components in computer system 1700 and to bridge data signals between processor bus 1710, memory 1720, and a system I/O 1722. In at least one embodiment, system logic chip may provide a graphics port for coupling to a graphics controller. In at least one embodiment, MCH 1716 may be coupled to memory 1720 through high bandwidth memory path 1718 and graphics/video card 1712 may be coupled to MCH 1716 through an Accelerated Graphics Port ("AGP") interconnect 1714.

In at least one embodiment, computer system 1700 may use system I/O 1722 that is a proprietary hub interface bus to couple MCH 1716 to I/O controller hub ("ICH") 1730. In at least one embodiment, ICH 1730 may provide direct connections to some I/O devices via a local I/O bus. In at least one embodiment, local I/O bus may include, without limitation, a high-speed I/O bus for connecting peripherals to memory 1720, a chipset, and processor 1702. Examples may include, without limitation, an audio controller 1729, a firmware hub ("flash BIOS") 1728, a wireless transceiver 1726, a data storage 1724, a legacy I/O controller 1723 containing a user input interface 1725 and a keyboard interface, a serial expansion port 1727, such as a USB, and a network controller 1734. Data storage 1724 may comprise a hard disk drive, a floppy disk drive, a CD-ROM device, a flash memory device, or other mass storage device.

In at least one embodiment, FIG. 17 illustrates a system, which includes interconnected hardware devices or "chips." In at least one embodiment, FIG. 17 may illustrate an exemplary SoC. In at least one embodiment, devices illustrated in FIG. 17 may be interconnected with proprietary interconnects, standardized interconnects (e.g., PCIe), or some combination thereof. In at least one embodiment, one or more components of system 1700 are interconnected using compute express link ("CXL") interconnects.

Figure 18:
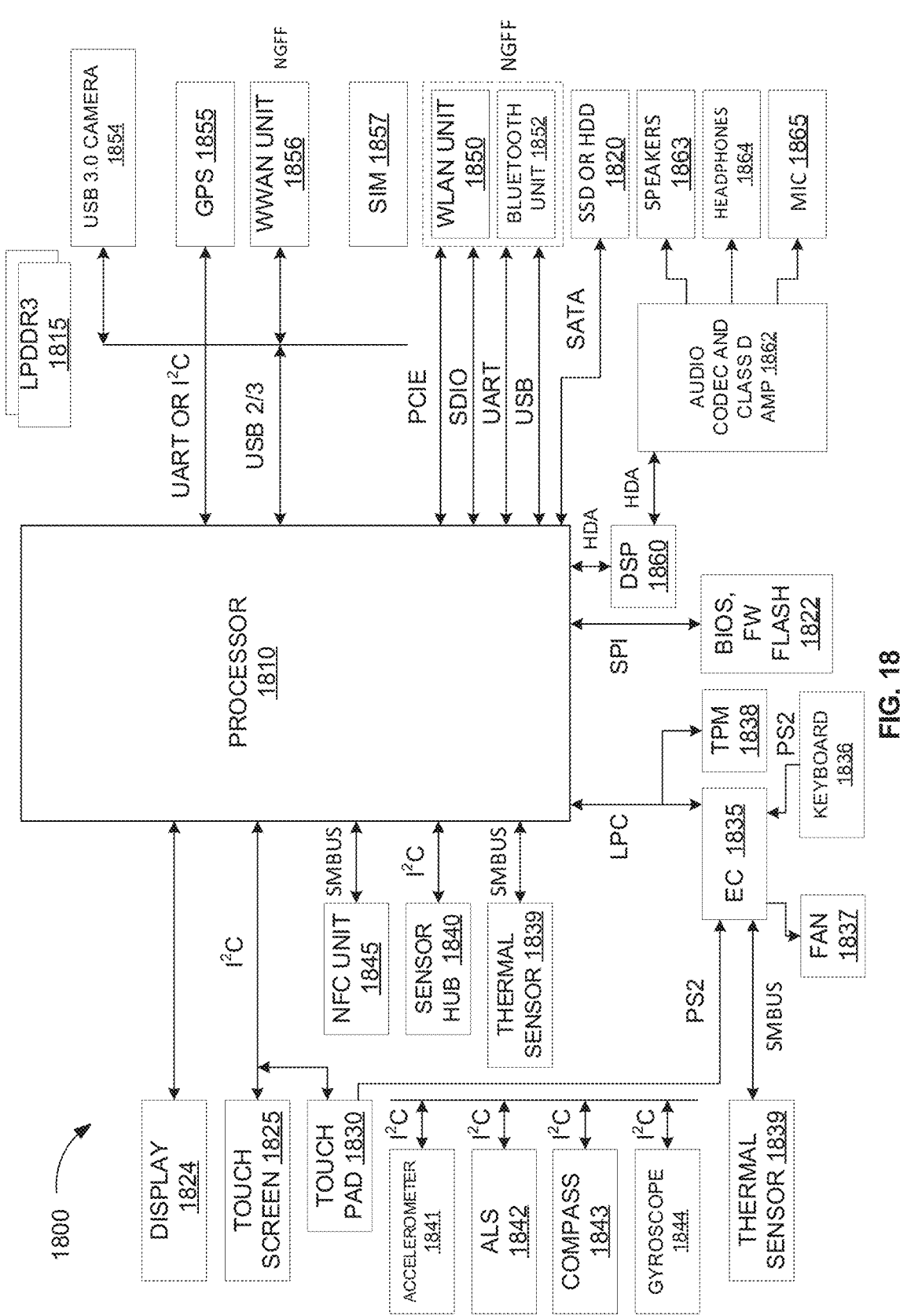
FIG. 18 illustrates a system, in accordance with at least one embodiment.

FIG. 18 illustrates a system 1800, in accordance with at least one embodiment. In at least one embodiment, system 1800 is an electronic device that utilizes a processor 1810. In at least one embodiment, system 1800 may be, for example and without limitation, a notebook, a tower server, a rack server, a blade server, a laptop, a desktop, a tablet, a mobile device, a phone, an embedded computer, or any other suitable electronic device.

In at least one embodiment, system 1800 may include, without limitation, processor 1810 communicatively coupled to any suitable number or kind of components, peripherals, modules, or devices. In at least one embodiment, processor 1810 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 18 illustrates a system which includes interconnected hardware devices or "chips." In at least one embodiment, FIG. 18 may illustrate an exemplary SoC. In at least one embodiment, devices illustrated in FIG. 18 may be interconnected with proprietary interconnects, standardized interconnects (PCIe) or some combination thereof. In at least one embodiment, one or more components of FIG. 18 are interconnected using CXL interconnects.

In at least one embodiment, FIG. 18 may include a display 1824, a touch screen 1825, a touch pad 1830, a Near Field Communications unit ("NFC") 1845, a sensor hub 1840, a thermal sensor 1846, an Express Chipset ("EC") 1835, a Trusted Platform Module ("TPM") 1838, BIOS/firmware/flash memory ("BIOS, FW Flash") 1822, a DSP 1860, a Solid State Disk ("SSD") or Hard Disk Drive ("HDD") 1820, a wireless local area network unit ("WLAN") 1850, a Bluetooth unit 1852, a Wireless Wide Area Network unit ("WWAN") 1856, a Global Positioning System ("GPS") 1855, a camera ("USB 3.0 camera") 1854 such as a USB 3.0 camera, or a Low Power Double Data Rate ("LPDDR") memory unit ("LPDDR3") 1815 implemented in, for example, LPDDR3 standard. These components may each be implemented in any suitable manner.

In at least one embodiment, other components may be communicatively coupled to processor 1810 through components discussed above. In at least one embodiment, an accelerometer 1841, an Ambient Light Sensor ("ALS") 1842, a compass 1843, and a gyroscope 1844 may be communicatively coupled to sensor hub 1840. In at least one embodiment, a thermal sensor 1839, a fan 1837, a keyboard 1836, and a touch pad 1830 may be communicatively coupled to EC 1835. In at least one embodiment, a speaker 1863, a headphones 1864, and a microphone ("mic") 1865 may be communicatively coupled to an audio unit ("audio codec and class d amp") 1862, which may in turn be communicatively coupled to DSP 1860. In at least one embodiment, audio unit 1862 may include, for example and without limitation, an audio coder/decoder ("codec") and a class D amplifier. In at least one embodiment, a SIM card ("SIM") 1857 may be communicatively coupled to WWAN unit 1856. In at least one embodiment, components such as WLAN unit 1850 and Bluetooth unit 1852, as well as WWAN unit 1856 may be implemented in a Next Generation Form Factor ("NGFF").

Figure 19:
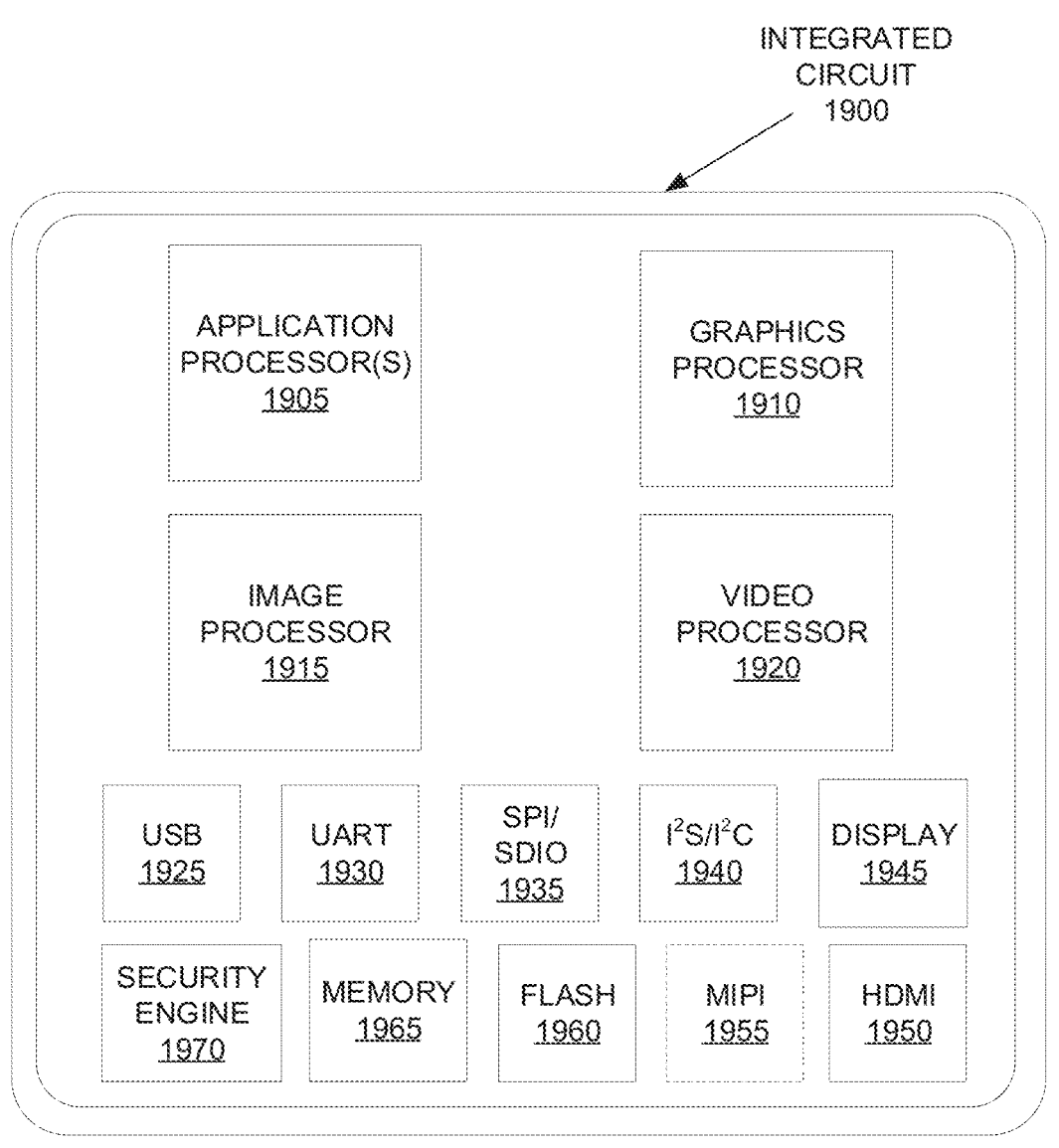
FIG. 19 illustrates an exemplary integrated circuit, in accordance with at least one embodiment.

FIG. 19 illustrates an exemplary integrated circuit 1900, in accordance with at least one embodiment. In at least one embodiment, exemplary integrated circuit 1900 is an SoC that may be fabricated using one or more IP cores. In at least one embodiment, integrated circuit 1900 includes one or more application processor(s) 1905 (e.g., CPUs), at least one graphics processor 1910, and may additionally include an image processor 1915 and/or a video processor 1920, any of which may be a modular IP core. In at least one embodiment, integrated circuit 1900 includes peripheral or bus logic including a USB controller 1925, a UART controller 1930, an SPI/SDIO controller 1935, and an I²S/I²C controller 1940. In at least one embodiment, integrated circuit 1900 can include a display device 1945 coupled to one or more of a high-definition multimedia interface ("HDMI") controller 1950 and a mobile industry processor interface ("MIPI") display interface 1955. In at least one embodiment, storage may be provided by a flash memory subsystem 1960 including flash memory and a flash memory controller. In at least one embodiment, a memory interface may be provided via a memory controller 1965 for access to SDRAM or SRAM memory devices. In at least one embodiment, some integrated circuits additionally include an embedded security engine 1970.

Figure 20:
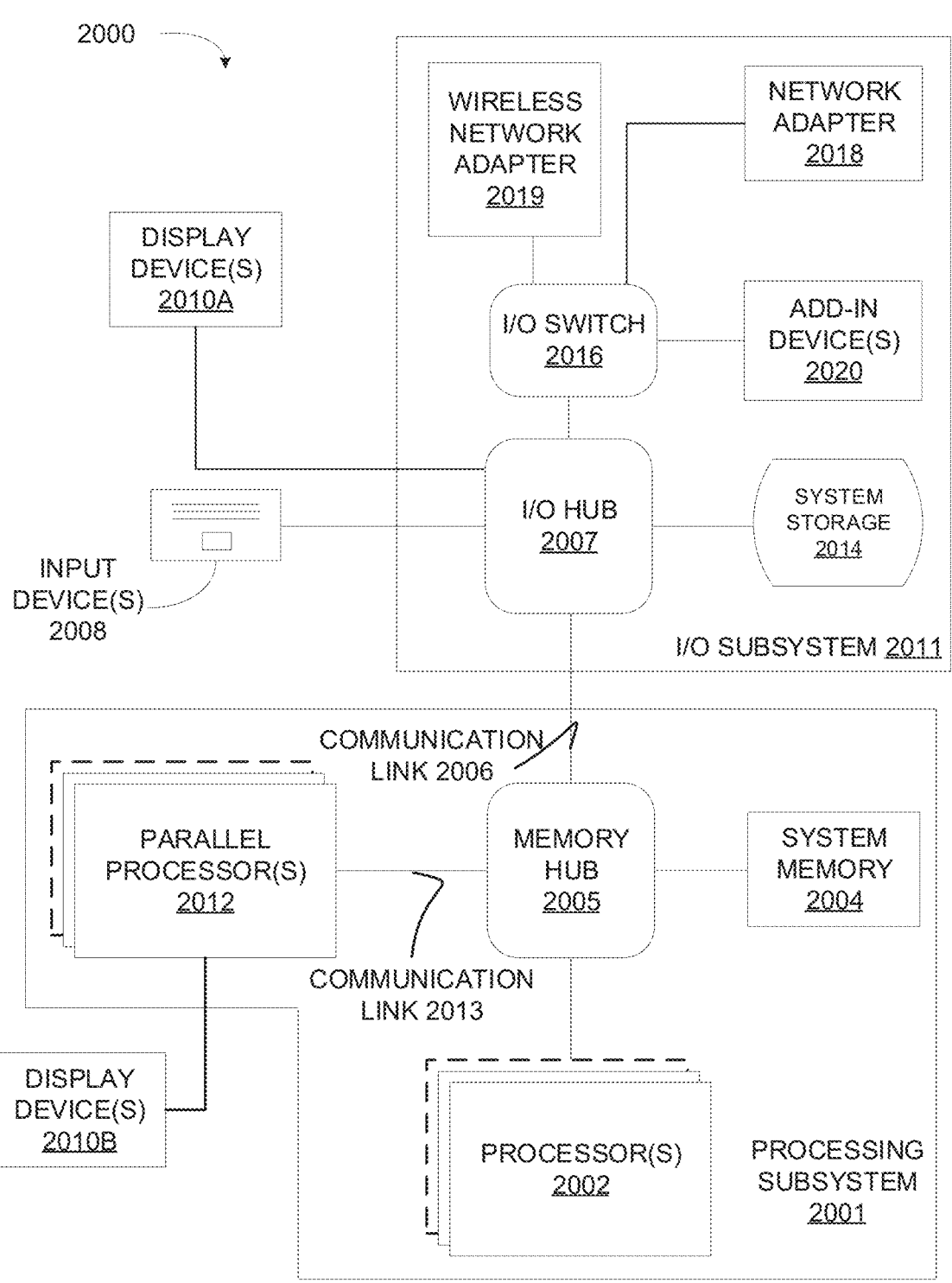
FIG. 20 illustrates a computing system, according to at least one embodiment.

FIG. 20 illustrates a computing system 2000, according to at least one embodiment; In at least one embodiment, computing system 2000 includes a processing subsystem 2001 having one or more processor(s) 2002 and a system memory 2004 communicating via an interconnection path that may include a memory hub 2005. In at least one embodiment, memory hub 2005 may be a separate component within a chipset component or may be integrated within one or more processor(s) 2002. In at least one embodiment, memory hub 2005 couples with an I/O subsystem 2011 via a communication link 2006. In at least one embodiment, I/O subsystem 2011 includes an I/O hub 2007 that can enable computing system 2000 to receive input from one or more input device(s) 2008. In at least one embodiment, I/O hub 2007 can enable a display controller, which may be included in one or more processor(s) 2002, to provide outputs to one or more display device(s) 2010A. In at least one embodiment, one or more display device(s) 2010A coupled with I/O hub 2007 can include a local, internal, or embedded display device.

In at least one embodiment, processing subsystem 2001 includes one or more parallel processor(s) 2012 coupled to memory hub 2005 via a bus or other communication link 2013. In at least one embodiment, communication link 2013 may be one of any number of standards based communication link technologies or protocols, such as, but not limited to PCIe, or may be a vendor specific communications interface or communications fabric. In at least one embodiment, one or more parallel processor(s) 2012 form a computationally focused parallel or vector processing system that can include a large number of processing cores and/or processing clusters, such as a many integrated core processor. In at least one embodiment, one or more parallel processor(s) 2012 form a graphics processing subsystem that can output pixels to one of one or more display device(s) 2010A coupled via I/O Hub 2007. In at least one embodiment, one or more parallel processor(s) 2012 can also include a display controller and display interface (not shown) to enable a direct connection to one or more display device(s) 2010B.

In at least one embodiment, a system storage unit 2014 can connect to I/O hub 2007 to provide a storage mechanism for computing system 2000. In at least one embodiment, an I/O switch 2016 can be used to provide an interface mechanism to enable connections between I/O hub 2007 and other components, such as a network adapter 2018 and/or wireless network adapter 2019 that may be integrated into a platform, and various other devices that can be added via one or more add-in device(s) 2020. In at least one embodiment, network adapter 2018 can be an Ethernet adapter or another wired network adapter. In at least one embodiment, wireless network adapter 2019 can include one or more of a Wi-Fi, Bluetooth, NFC, or other network device that includes one or more wireless radios.

In at least one embodiment, computing system 2000 can include other components not explicitly shown, including USB or other port connections, optical storage drives, video capture devices, and the like, that may also be connected to I/O hub 2007. In at least one embodiment, communication paths interconnecting various components in FIG. 20 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 2012 incorporate circuitry optimized for graphics and video processing, including, for example, video output circuitry, and constitutes a graphics processing unit ("GPU"). In at least one embodiment, one or more parallel processor(s) 2012 incorporate circuitry optimized for general purpose processing. In at least embodiment, components of computing system 2000 may be integrated with one or more other system elements on a single integrated circuit. For example, in at least one embodiment, one or more parallel processor(s) 2012, memory hub 2005, processor(s) 2002, and I/O hub 2007 can be integrated into an SoC integrated circuit. In at least one embodiment, components of computing system 2000 can be integrated into a single package to form a system in package ("SIP") configuration. In at least one embodiment, at least a portion of the components of computing system 2000 can be integrated into a multi-chip module ("MCM"), which can be interconnected with other multi-chip modules into a modular computing system. In at least one embodiment, I/O subsystem 2011 and display devices 2010B are omitted from computing system 2000.

Processing Systems

The following figures set forth, without limitation, exemplary processing systems that can be used to implement at least one embodiment. In at least one embodiment, one or more processing systems of following figures can implement one or more aspects of an embodiment described with respect to one or more of FIGS. 1-14, and/or one or more techniques described with respect to FIGS. 8-11.

Figure 21:
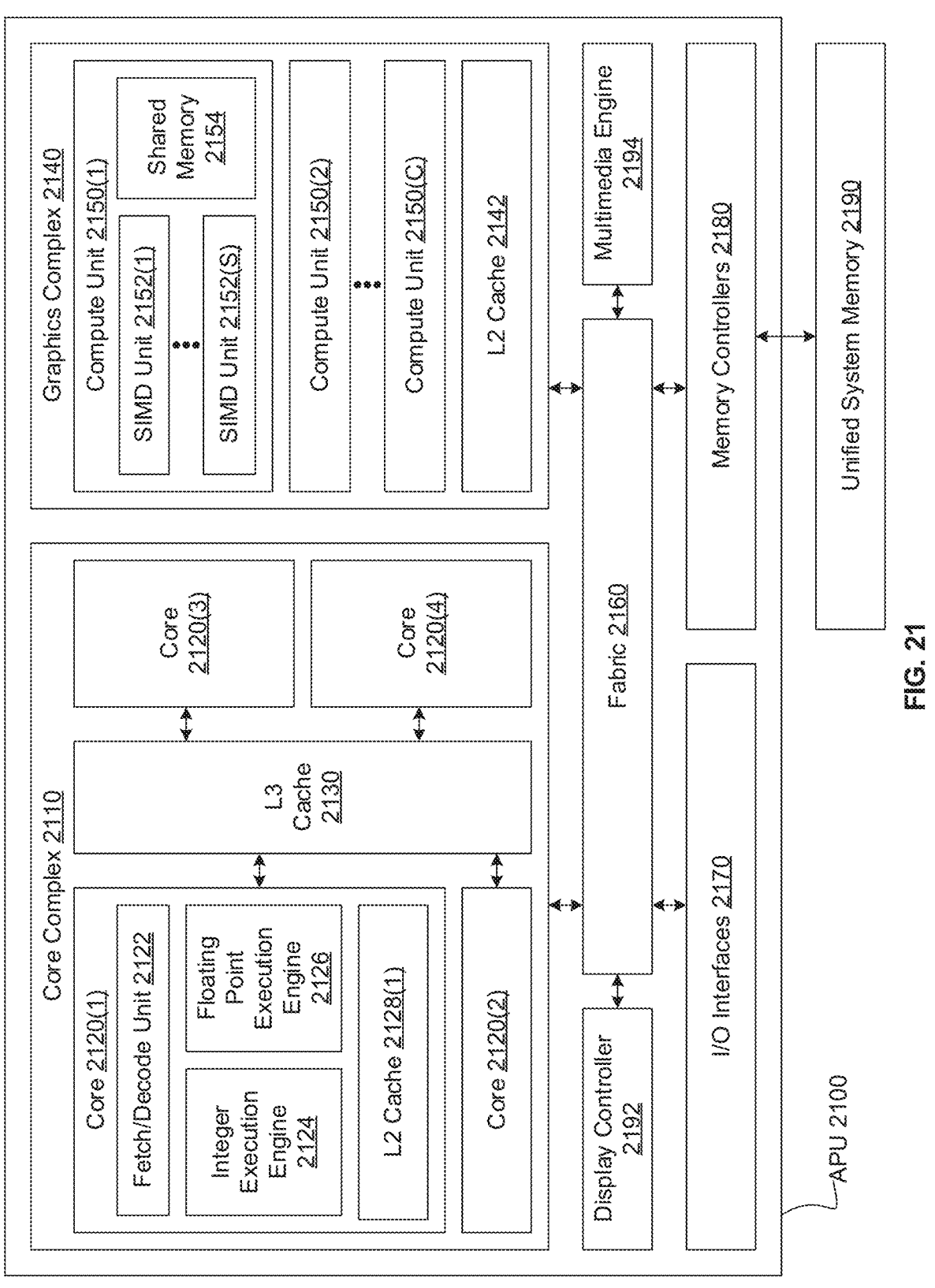
FIG. 21 illustrates an APU, in accordance with at least one embodiment.

FIG. 21 illustrates an accelerated processing unit ("APU") 2100, in accordance with at least one embodiment. In at least one embodiment, APU 2100 is developed by AMD Corporation of Santa Clara, CA. In at least one embodiment, APU 2100 can be configured to execute an application program, such as a CUDA program. In at least one embodiment, APU 2100 includes, without limitation, a core complex 2110, a graphics complex 2140, fabric 2160, I/O interfaces 2170, memory controllers 2180, a display controller 2192, and a multimedia engine 2194. In at least one embodiment, APU 2100 may include, without limitation, any number of core complexes 2110, any number of graphics complexes 2150, any number of display controllers 2192, and any number of multimedia engines 2194 in any combination. For explanatory purposes, multiple instances of like objects are denoted herein with reference numbers identifying the object and parenthetical numbers identifying the instance where needed.

In at least one embodiment, core complex 2110 is a CPU, graphics complex 2140 is a GPU, and APU 2100 is a processing unit that integrates, without limitation, 2110 and 2140 onto a single chip. In at least one embodiment, some tasks may be assigned to core complex 2110 and other tasks may be assigned to graphics complex 2140. In at least one embodiment, core complex 2110 is configured to execute main control software associated with APU 2100, such as an operating system. In at least one embodiment, core complex 2110 is the master processor of APU 2100, controlling and coordinating operations of other processors. In at least one embodiment, core complex 2110 issues commands that control the operation of graphics complex 2140. In at least one embodiment, core complex 2110 can be configured to execute host executable code derived from CUDA source code, and graphics complex 2140 can be configured to execute device executable code derived from CUDA source code.

In at least one embodiment, core complex 2110 includes, without limitation, cores 2120(1)-2120(4) and an L3 cache 2130. In at least one embodiment, core complex 2110 may include, without limitation, any number of cores 2120 and any number and type of caches in any combination. In at least one embodiment, cores 2120 are configured to execute instructions of a particular instruction set architecture ("ISA"). In at least one embodiment, each core 2120 is a CPU core.

In at least one embodiment, each core 2120 includes, without limitation, a fetch/decode unit 2122, an integer execution engine 2124, a floating point execution engine 2126, and an L2 cache 2128. In at least one embodiment, fetch/decode unit 2122 fetches instructions, decodes such instructions, generates micro-operations, and dispatches separate micro-instructions to integer execution engine 2124 and floating point execution engine 2126. In at least one embodiment, fetch/decode unit 2122 can concurrently dispatch one micro-instruction to integer execution engine 2124 and another micro-instruction to floating point execution engine 2126. In at least one embodiment, integer execution engine 2124 executes, without limitation, integer and memory operations. In at least one embodiment, floating point engine 2126 executes, without limitation, floating point and vector operations. In at least one embodiment, fetch-decode unit 2122 dispatches micro-instructions to a single execution engine that replaces both integer execution engine 2124 and floating point execution engine 2126.

In at least one embodiment, each core 2120(*i*), where i is an integer representing a particular instance of core 2120, may access L2 cache 2128(*i*) included in core 2120(*i*). In at least one embodiment, each core 2120 included in core complex 2110(*j*), where j is an integer representing a particular instance of core complex 2110, is connected to other cores 2120 included in core complex 2110(*j*) via L3 cache 2130(*j*) included in core complex 2110(*j*). In at least one embodiment, cores 2120 included in core complex 2110(*j*), where j is an integer representing a particular instance of core complex 2110, can access all of L3 cache 2130(*j*) included in core complex 2110(*j*). In at least one embodiment, L3 cache 2130 may include, without limitation, any number of slices.

In at least one embodiment, graphics complex 2140 can be configured to perform compute operations in a highly-parallel fashion. In at least one embodiment, graphics complex 2140 is configured to execute graphics pipeline operations such as draw commands, pixel operations, geometric computations, and other operations associated with rendering an image to a display. In at least one embodiment, graphics complex 2140 is configured to execute operations unrelated to graphics. In at least one embodiment, graphics complex 2140 is configured to execute both operations related to graphics and operations unrelated to graphics.

In at least one embodiment, graphics complex 2140 includes, without limitation, any number of compute units 2150 and an L2 cache 2142. In at least one embodiment, compute units 2150 share L2 cache 2142. In at least one embodiment, L2 cache 2142 is partitioned. In at least one embodiment, graphics complex 2140 includes, without limitation, any number of compute units 2150 and any number (including zero) and type of caches. In at least one embodiment, graphics complex 2140 includes, without limitation, any amount of dedicated graphics hardware.

In at least one embodiment, each compute unit 2150 includes, without limitation, any number of SIMD units 2152 and a shared memory 2154. In at least one embodiment, each SIMD unit 2152 implements a SIMD architecture and is configured to perform operations in parallel. In at least one embodiment, each compute unit 2150 may execute any number of thread blocks, but each thread block executes on a single compute unit 2150. In at least one embodiment, a thread block includes, without limitation, any number of threads of execution. In at least one embodiment, a work-group is a thread block. In at least one embodiment, each SIMD unit 2152 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 2154.

In at least one embodiment, fabric 2160 is a system interconnect that facilitates data and control transmissions across core complex 2110, graphics complex 2140, I/O interfaces 2170, memory controllers 2180, display controller 2192, and multimedia engine 2194. In at least one embodiment, APU 2100 may include, without limitation, any amount and type of system interconnect in addition to or instead of fabric 2160 that facilitates data and control transmissions across any number and type of directly or indirectly linked components that may be internal or external to APU 2100. In at least one embodiment, I/O interfaces 2170 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 2170 In at least one embodiment, peripheral devices that are coupled to I/O interfaces 2170 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 240 includes, without limitation, any amount and type of circuitry that is related to multimedia, such as a video decoder, a video encoder, an image signal processor, etc. In at least one embodiment, memory controllers 2180 facilitate data transfers between APU 2100 and a unified system memory 2190. In at least one embodiment, core complex 2110 and graphics complex 2140 share unified system memory 2190.

In at least one embodiment, APU 2100 implements a memory subsystem that includes, without limitation, any amount and type of memory controllers 2180 and memory devices (e.g., shared memory 2154) that may be dedicated to one component or shared among multiple components. In at least one embodiment, APU 2100 implements a cache subsystem that includes, without limitation, one or more cache memories (e, L2 caches 2228, L3 cache 2130, and L2 cache 2142) that may each be private to or shared between any number of components (e.g., cores 2120, core complex 2110, SIMD units 2152, compute units 2150, and graphics complex 2140).

Figure 22:
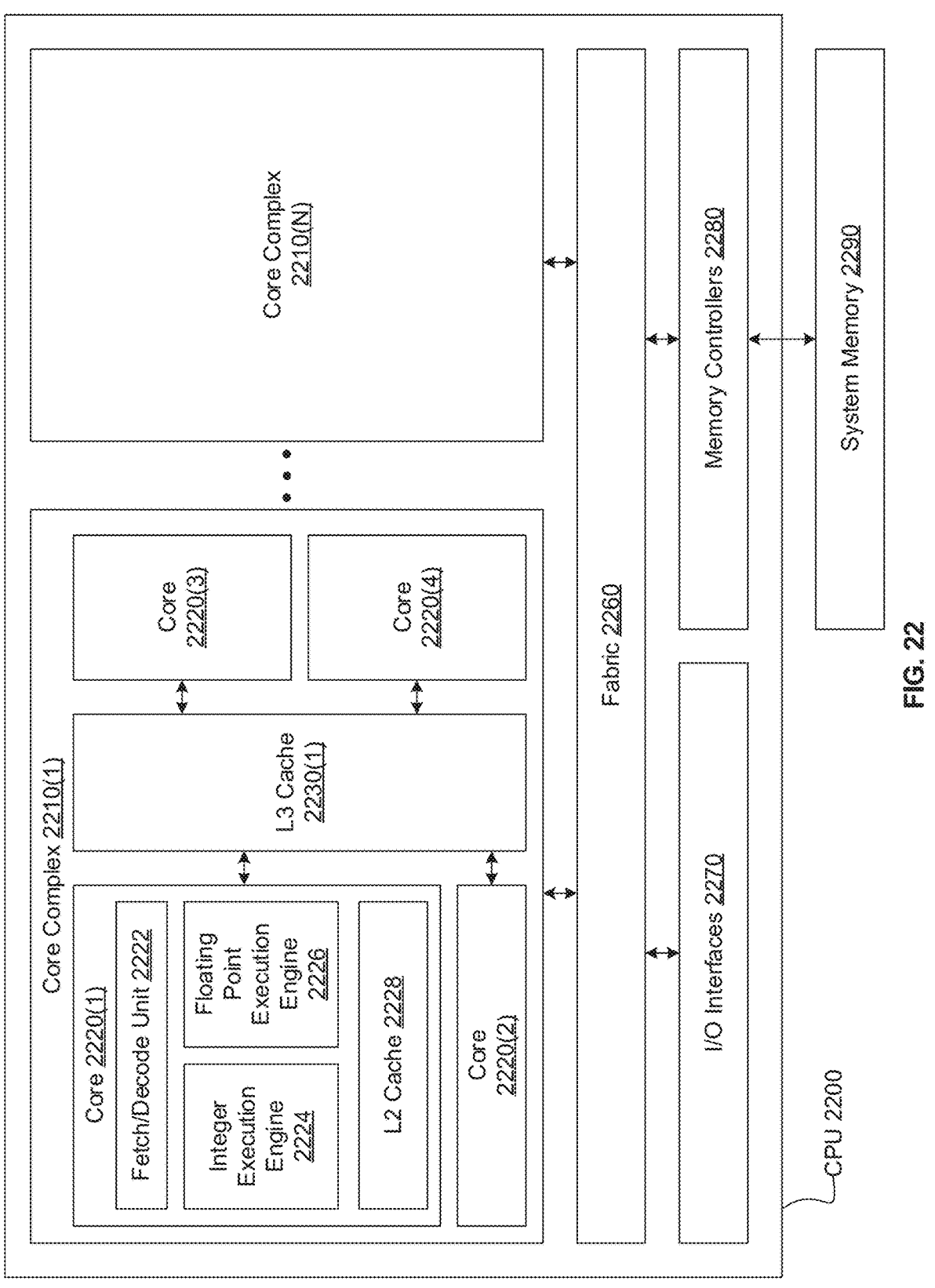
FIG. 22 illustrates a CPU, in accordance with at least one embodiment.

FIG. 22 illustrates a CPU 2200, in accordance with at least one embodiment. In at least one embodiment, CPU 2200 is developed by AMD Corporation of Santa Clara, CA. In at least one embodiment, CPU 2200 can be configured to execute an application program. In at least one embodiment, CPU 2200 is configured to execute main control software, such as an operating system. In at least one embodiment, CPU 2200 issues commands that control the operation of an external GPU (not shown). In at least one embodiment, CPU 2200 can be configured to execute host executable code derived from CUDA source code, and an external GPU can be configured to execute device executable code derived from such CUDA source code. In at least one embodiment, CPU 2200 includes, without limitation, any number of core complexes 2210, fabric 2260, I/O interfaces 2270, and memory controllers 2280.

In at least one embodiment, core complex 2210 includes, without limitation, cores 2220(1)-2220(4) and an L3 cache 2230. In at least one embodiment, core complex 2210 may include, without limitation, any number of cores 2220 and any number and type of caches in any combination. In at least one embodiment, cores 2220 are configured to execute instructions of a particular ISA. In at least one embodiment, each core 2220 is a CPU core.

In at least one embodiment, each core 2220 includes, without limitation, a fetch/decode unit 2222, an integer execution engine 2224, a floating point execution engine 2226, and an L2 cache 2228. In at least one embodiment, fetch/decode unit 2222 fetches instructions, decodes such instructions, generates micro-operations, and dispatches separate micro-instructions to integer execution engine 2224 and floating point execution engine 2226. In at least one embodiment, fetch/decode unit 2222 can concurrently dispatch one micro-instruction to integer execution engine 2224 and another micro-instruction to floating point execution engine 2226. In at least one embodiment, integer execution engine 2224 executes, without limitation, integer and memory operations. In at least one embodiment, floating point engine 2226 executes, without limitation, floating point and vector operations. In at least one embodiment, fetch-decode unit 2222 dispatches micro-instructions to a single execution engine that replaces both integer execution engine 2224 and floating point execution engine 2226.

In at least one embodiment, each core 2220($i$), where i is an integer representing a particular instance of core 2220, may access L2 cache 2228($i$) included in core 2220($i$). In at least one embodiment, each core 2220 included in core complex 2210($j$), where j is an integer representing a particular instance of core complex 2210, is connected to other cores 2220 in core complex 2210($j$) via L3 cache 2230($j$) included in core complex 2210($j$). In at least one embodiment, cores 2220 included in core complex 2210($j$), where j is an integer representing a particular instance of core complex 2210, can access all of L3 cache 2230($j$) included in core complex 2210($j$). In at least one embodiment, L3 cache 2230 may include, without limitation, any number of slices.

In at least one embodiment, fabric 2260 is a system interconnect that facilitates data and control transmissions across core complexes 2210(1)-2210(N) (where N is an integer greater than zero), I/O interfaces 2270, and memory controllers 2280. In at least one embodiment, CPU 2200 may include, without limitation, any amount and type of system interconnect in addition to or instead of fabric 2260 that facilitates data and control transmissions across any number and type of directly or indirectly linked components that may be internal or external to CPU 2200. In at least one embodiment, I/O interfaces 2270 are representative of any number and type of I/O interfaces (PCI, PCI-X, PCIe, GBE, USB, etc.). In at least one embodiment, various types of peripheral devices are coupled to I/O interfaces 2270 In at least one embodiment, peripheral devices that are coupled to I/O interfaces 2270 may include, without limitation, displays, keyboards, mice, printers, scanners, joysticks or other types of game controllers, media recording devices, external storage devices, network interface cards, and so forth.

In at least one embodiment, memory controllers 2280 facilitate data transfers between CPU 2200 and a system memory 2290. In at least one embodiment, core complex 2210 and graphics complex 2240 share system memory 2290. In at least one embodiment, CPU 2200 implements a memory subsystem that includes, without limitation, any amount and type of memory controllers 2280 and memory devices that may be dedicated to one component or shared among multiple components. In at least one embodiment, CPU 2200 implements a cache subsystem that includes, without limitation, one or more cache memories (e.g., L2 caches 2228 and L3 caches 2230) that may each be private to or shared between any number of components (e.g., cores 2220 and core complexes 2210).

Figure 23:
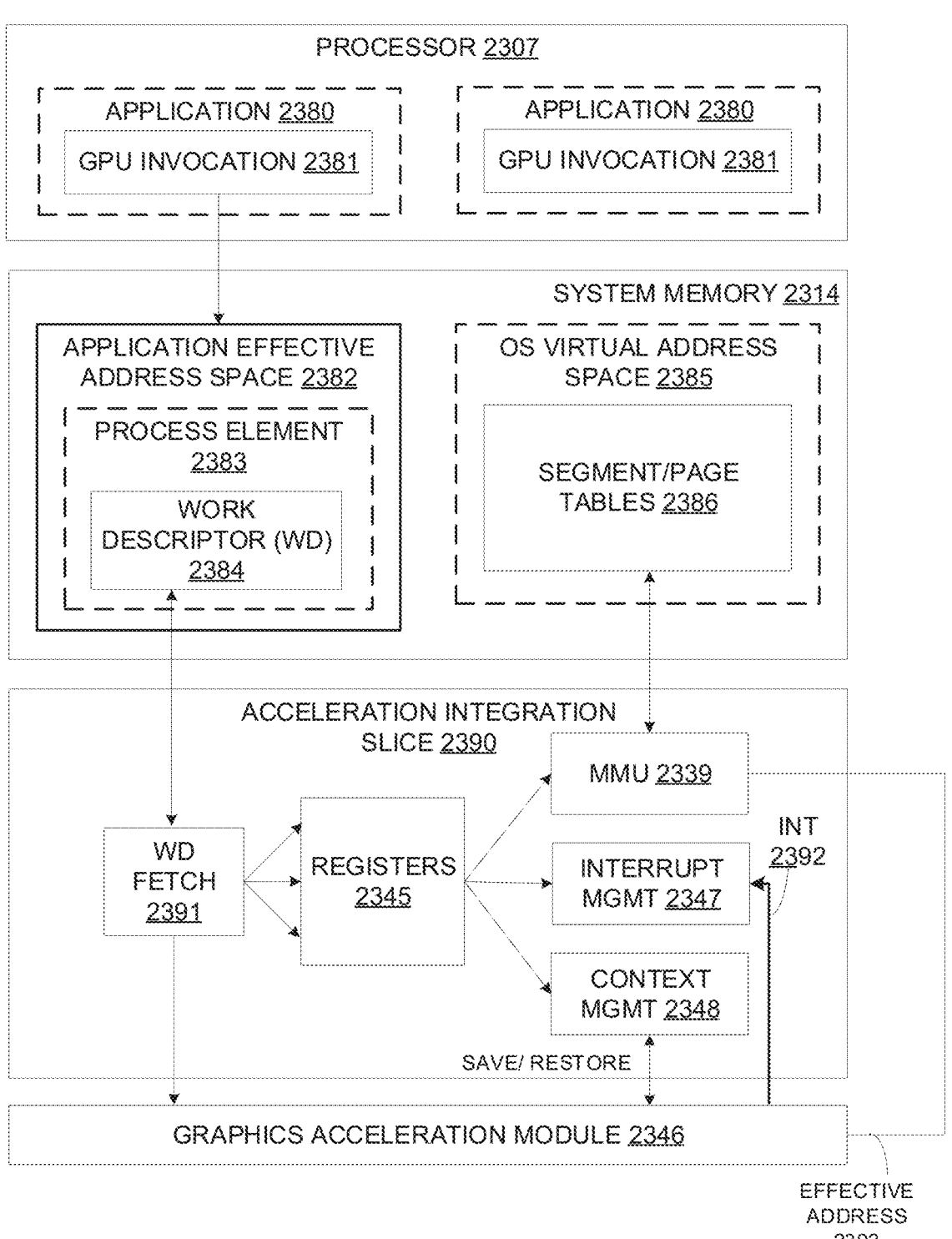
FIG. 23 illustrates an exemplary accelerator integration slice, in accordance with at least one embodiment.

FIG. 23 illustrates an exemplary accelerator integration slice 2390, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 2382 within system memory 2314 stores process elements 2383. In one embodiment, process elements 2383 are stored in response to GPU invocations 2381 from applications 2380 executed on processor 2307. A process element 2383 contains process state for corresponding application 2380. A work descriptor ("WD") 2384 contained in process element 2383 can be a single job requested by an application or may contain a pointer to a queue of jobs. In at least one embodiment, WD 2384 is a pointer to a job request queue in application effective address space 2382.

Graphics acceleration module 2346 and/or individual graphics processing engines can be shared by all or a subset of processes in a system. In at least one embodiment, an infrastructure for setting up process state and sending WD 2384 to graphics acceleration module 2346 to start a job in a virtualized environment may be included.

In at least one embodiment, a dedicated-process programming model is implementation-specific. In this model, a single process owns graphics acceleration module 2346 or an individual graphics processing engine. Because graphics acceleration module 2346 is owned by a single process, a hypervisor initializes an accelerator integration circuit for an owning partition and an operating system initializes accelerator integration circuit for an owning process when graphics acceleration module 2346 is assigned.

In operation, a WD fetch unit 2391 in accelerator integration slice 2390 fetches next WD 2384 which includes an indication of work to be done by one or more graphics processing engines of graphics acceleration module 2346. Data from WD 2384 may be stored in registers 2345 and used by a memory management unit ("MMU") 2339, interrupt management circuit 2347 and/or context management circuit 2348 as illustrated. For example, one embodiment of MMU 2339 includes segment/page walk circuitry for accessing segment/page tables 2386 within OS virtual address space 2385. Interrupt management circuit 2347 may process interrupt events ("INT") 2392 received from graphics acceleration module 2346. When performing graphics operations, an effective address 2393 generated by a graphics processing engine is translated to a real address by MMU 2339.

In one embodiment, a same set of registers 2345 are duplicated for each graphics processing engine and/or graphics acceleration module 2346 and may be initialized by a hypervisor or operating system. Each of these duplicated registers may be included in accelerator integration slice 2390. Exemplary registers that may be initialized by a hypervisor are shown in Table 1.

TABLE 1

| Hypervisor Initialized Registers |
| --- |
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers |
| --- |
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2384 is specific to a particular graphics acceleration module 2346 and/or a particular graphics processing engine. It contains all information required by a graphics processing engine to do work or it can be a pointer to a memory location where an application has set up a command queue of work to be completed.

Figure 24A:
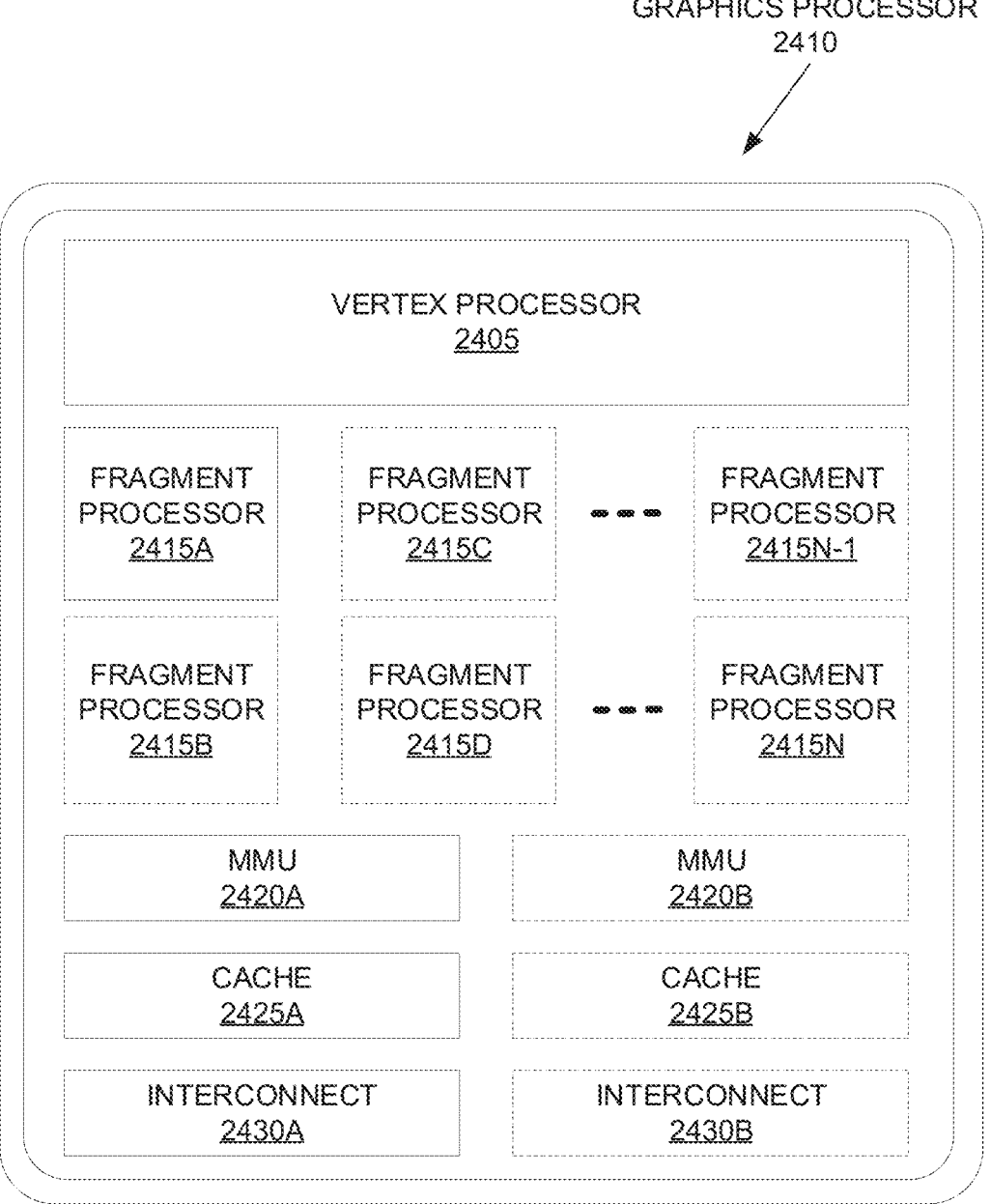
FIGS. 24A-24B illustrate exemplary graphics processors, in accordance with at least one embodiment.
Figure 24B:
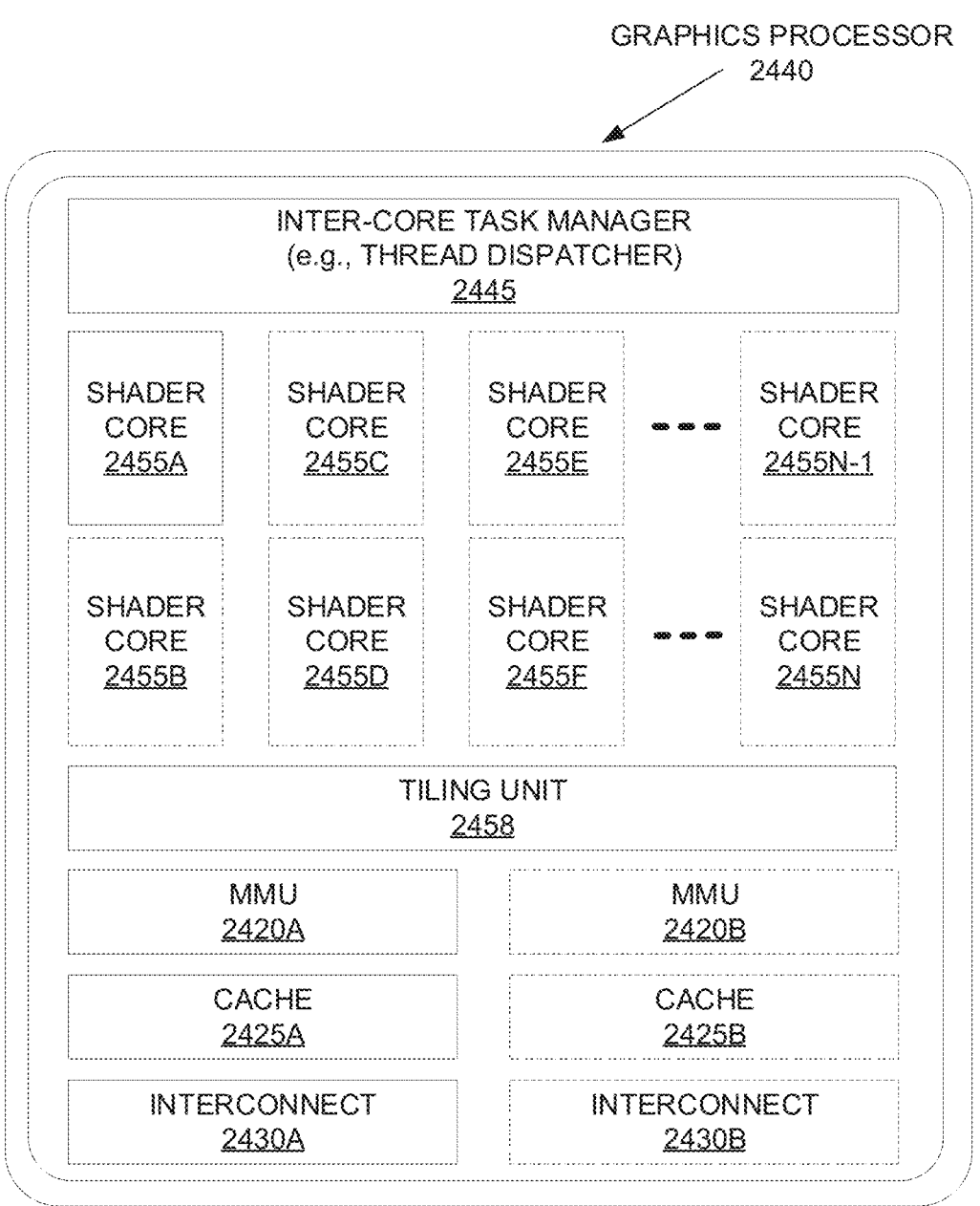

FIGS. 24A-24B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 24A illustrates an exemplary graphics processor 2410 of an SoC integrated circuit that may be fabricated using one or more IP cores, in accordance with at least one embodiment. FIG. 24B illustrates an additional exemplary graphics processor 2440 of an SoC integrated circuit that may be fabricated using one or more IP cores, in accordance with at least one embodiment. In at least one embodiment, graphics processor 2410 of FIG. 24A is a low power graphics processor core. In at least one embodiment, graphics processor 2440 of FIG. 24B is a higher performance graphics processor core. In at least one embodiment, each of graphics processors 2410, 2440 can be variants of graphics processor 1910 of FIG. 19.

In at least one embodiment, graphics processor 2410 includes a vertex processor 2405 and one or more fragment processor(s) 2415A-2415N (2415A, 2415B, 2415C, 2415D, through 2415N-1, and 2415N). In at least one embodiment, graphics processor 2410 can execute different shader programs via separate logic, such that vertex processor 2405 is optimized to execute operations for vertex shader programs, while one or more fragment processor(s) 2415A-2415N execute fragment (e.g., pixel) shading operations for fragment or pixel shader programs. In at least one embodiment, vertex processor 2405 performs a vertex processing stage of a 3D graphics pipeline and generates primitives and vertex data. In at least one embodiment, fragment processor(s) 2415A-2415N use primitive and vertex data generated by vertex processor 2405 to produce a framebuffer that is displayed on a display device. In at least one embodiment, fragment processor(s) 2415A-2415N are optimized to execute fragment shader programs as provided for in an OpenGL API, which may be used to perform similar operations as a pixel shader program as provided for in a Direct 3D API.

In at least one embodiment, graphics processor 2410 additionally includes one or more MMU(s) 2420A-2420B, cache(s) 2425A-2425B, and circuit interconnect(s) 2430A-2430B. In at least one embodiment, one or more MMU(s) 2420A-2420B provide for virtual to physical address mapping for graphics processor 2410, including for vertex processor 2405 and/or fragment processor(s) 2415A-2415N, which may reference vertex or image/texture data stored in memory, in addition to vertex or image/texture data stored in one or more cache(s) 2425A-2425B. In at least one embodiment, one or more MMU(s) 2420A-2420B may be synchronized with other MMUs within a system, including one or more MMUs associated with one or more application processor(s) 1905, image processors 1915, and/or video processors 1920 of FIG. 19, such that each processor 1905-1920 can participate in a shared or unified virtual memory system. In at least one embodiment, one or more circuit interconnect(s) 2430A-2430B enable graphics processor 2410 to interface with other IP cores within an SoC, either via an internal bus of the SoC or via a direct connection.

In at least one embodiment, graphics processor 2440 includes one or more MMU(s) 2420A-2420B, caches 2425A-2425B, and circuit interconnects 2430A-2430B of graphics processor 2410 of FIG. 24A. In at least one embodiment, graphics processor 2440 includes one or more shader core(s) 2455A-2455N (e.g., 2455A, 2455B, 2455C, 2455D, 2455E, 2455F, through 2455N-1, and 2455N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2440 includes an inter-core task manager 2445, which acts as a thread dispatcher to dispatch execution threads to one or more shader cores 2455A-2455N and a tiling unit 2458 to accelerate tiling operations for tile-based rendering, in which rendering operations for a scene are subdivided in image space, for example to exploit local spatial coherence within a scene or to optimize use of internal caches.

Figure 25A:
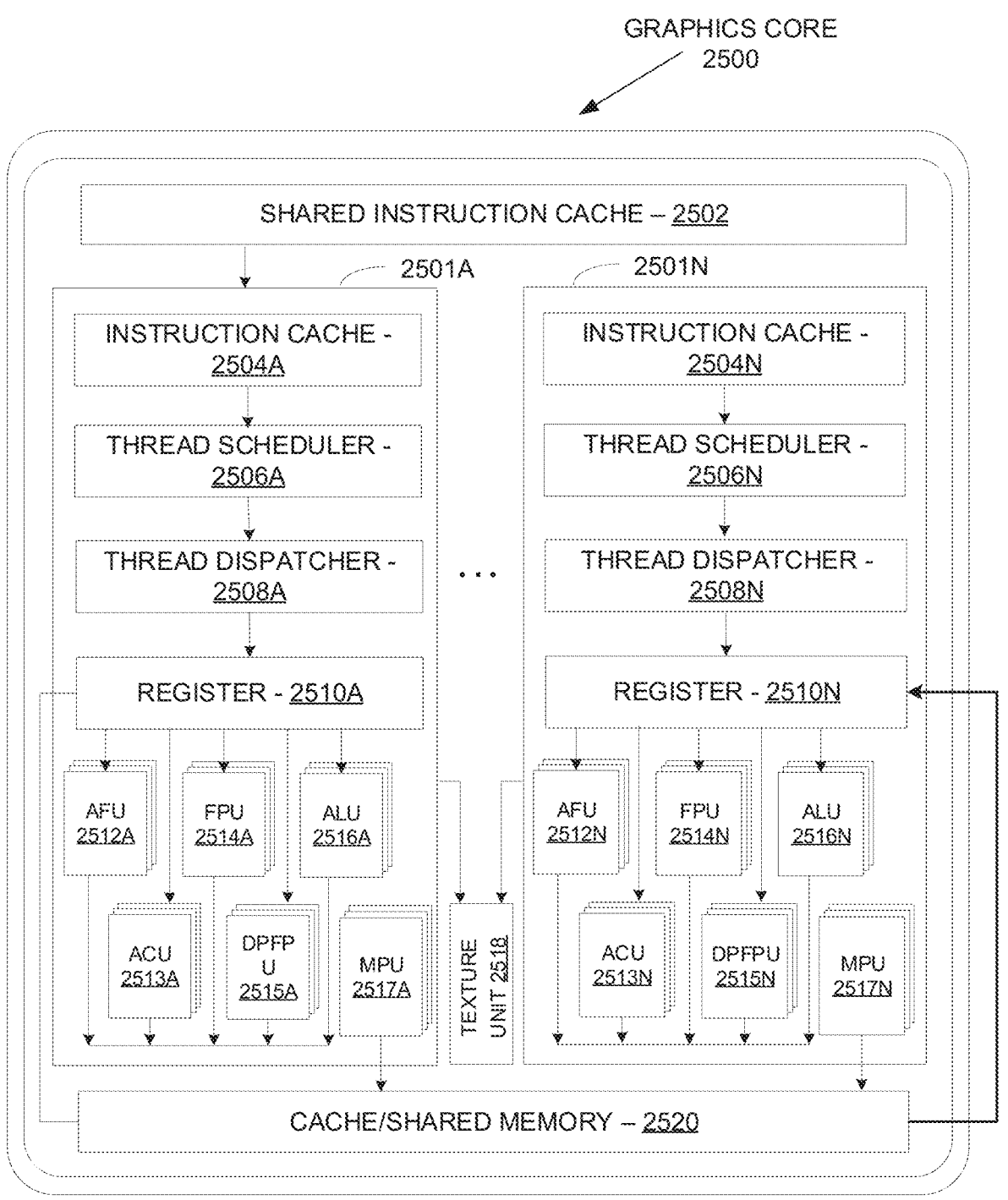
FIG. 25A illustrates a graphics core, in accordance with at least one embodiment.

FIG. 25A illustrates a graphics core 2500, in accordance with at least one embodiment. In at least one embodiment, graphics core 2500 may be included within graphics processor 1910 of FIG. 19. In at least one embodiment, graphics core 2500 may be a unified shader core 2455A-2455N as in FIG. 24B. In at least one embodiment, graphics core 2500 includes a shared instruction cache 2502, a texture unit 2518, and a cache/shared memory 2520 that are common to execution resources within graphics core 2500. In at least one embodiment, graphics core 2500 can include multiple slices 2501A-2501N or partition for each core, and a graphics processor can include multiple instances of graphics core 2500. Slices 2501A-2501N can include support logic including a local instruction cache 2504A-2504N, a thread scheduler 2506A-2506N, a thread dispatcher 2508A-2508N, and a set of registers 2510A-2510N. In at least one embodiment, slices 2501A-2501N can include a set of additional function units ("AFUs") 2512A-2512N, floating-point units ("FPUs") 2514A-2514N, integer arithmetic logic units ("ALUs") 2516-2516N, address computational units ("ACUs") 2513A-2513N, double-precision floating-point units ("DPFPUs") 2515A-2515N, and matrix processing units ("MPUs") 2517A-2517N.

In at least one embodiment, FPUs 2514A-2514N can perform single-precision (32-bit) and half-precision (16-bit) floating point operations, while DPFPUs 2515A-2515N perform double precision (64-bit) floating point operations. In at least one embodiment, ALUs 2516A-2516N can perform variable precision integer operations at 8-bit, 16-bit, and 32-bit precision, and can be configured for mixed precision operations. In at least one embodiment, MPUs 2517A-2517N can also be configured for mixed precision matrix operations, including half-precision floating point and 8-bit integer operations. In at least one embodiment, MPUs 2517-2517N can perform a variety of matrix operations to accelerate CUDA programs, including enabling support for accelerated general matrix to matrix multiplication ("GEMM"). In at least one embodiment, AFUs 2512A-2512N can perform additional logic operations not supported by floating-point or integer units, including trigonometric operations (e.g., Sine, Cosine, etc.).

Figure 25B:
FIG. 25B illustrates a GPGPU, in accordance with at least one embodiment.

FIG. 25B illustrates a general-purpose graphics processing unit ("GPGPU") 2530, in accordance with at least one embodiment. In at least one embodiment, GPGPU 2530 is highly-parallel and suitable for deployment on a multi-chip module. In at least one embodiment, GPGPU 2530 can be configured to enable highly-parallel compute operations to be performed by an array of GPUs. In at least one embodiment, GPGPU 2530 can be linked directly to other instances of GPGPU 2530 to create a multi-GPU cluster to improve execution time for CUDA programs. In at least one embodiment, GPGPU 2530 includes a host interface 2532 to enable a connection with a host processor. In at least one embodiment, host interface 2532 is a PCIe interface. In at least one embodiment, host interface 2532 can be a vendor specific communications interface or communications fabric. In at least one embodiment, GPGPU 2530 receives commands from a host processor and uses a global scheduler 2534 to distribute execution threads associated with those commands to a set of compute clusters 2536A-2536H. In at least one embodiment, compute clusters 2536A-2536H share a cache memory 2538. In at least one embodiment, cache memory 2538 can serve as a higher-level cache for cache memories within compute clusters 2536A-2536H.

In at least one embodiment, GPGPU 2530 includes memory 2544A-2544B coupled with compute clusters 2536A-2536H via a set of memory controllers 2542A-2542B. In at least one embodiment, memory 2544A-2544B can include various types of memory devices including DRAM or graphics random access memory, such as synchronous graphics random access memory ("SGRAM"), including graphics double data rate ("GDDR") memory.

In at least one embodiment, compute clusters 2536A-2536H each include a set of graphics cores, such as graphics core 2500 of FIG. 25A, which can include multiple types of integer and floating point logic units that can perform computational operations at a range of precisions including suited for computations associated with CUDA programs. For example, in at least one embodiment, at least a subset of floating point units in each of compute clusters 2536A-2536H can be configured to perform 16-bit or 32-bit floating point operations, while a different subset of floating point units can be configured to perform 64-bit floating point operations.

In at least one embodiment, multiple instances of GPGPU 2530 can be configured to operate as a compute cluster. Compute clusters 2536A-2536H may implement any technically feasible communication techniques for synchronization and data exchange. In at least one embodiment, multiple instances of GPGPU 2530 communicate over host interface 2532. In at least one embodiment, GPGPU 2530 includes an I/O hub 2539 that couples GPGPU 2530 with a GPU link 2540 that enables a direct connection to other instances of GPGPU 2530. In at least one embodiment, GPU link 2540 is coupled to a dedicated GPU-to-GPU bridge that enables communication and synchronization between multiple instances of GPGPU 2530. In at least one embodiment GPU link 2540 couples with a high speed interconnect to transmit and receive data to other GPGPUs 2530 or parallel processors. In at least one embodiment, multiple instances of GPGPU 2530 are located in separate data processing systems and communicate via a network device that is accessible via host interface 2532. In at least one embodiment GPU link 2540 can be configured to enable a connection to a host processor in addition to or as an alternative to host interface 2532. In at least one embodiment, GPGPU 2530 can be configured to execute a CUDA program.

Figure 26A:
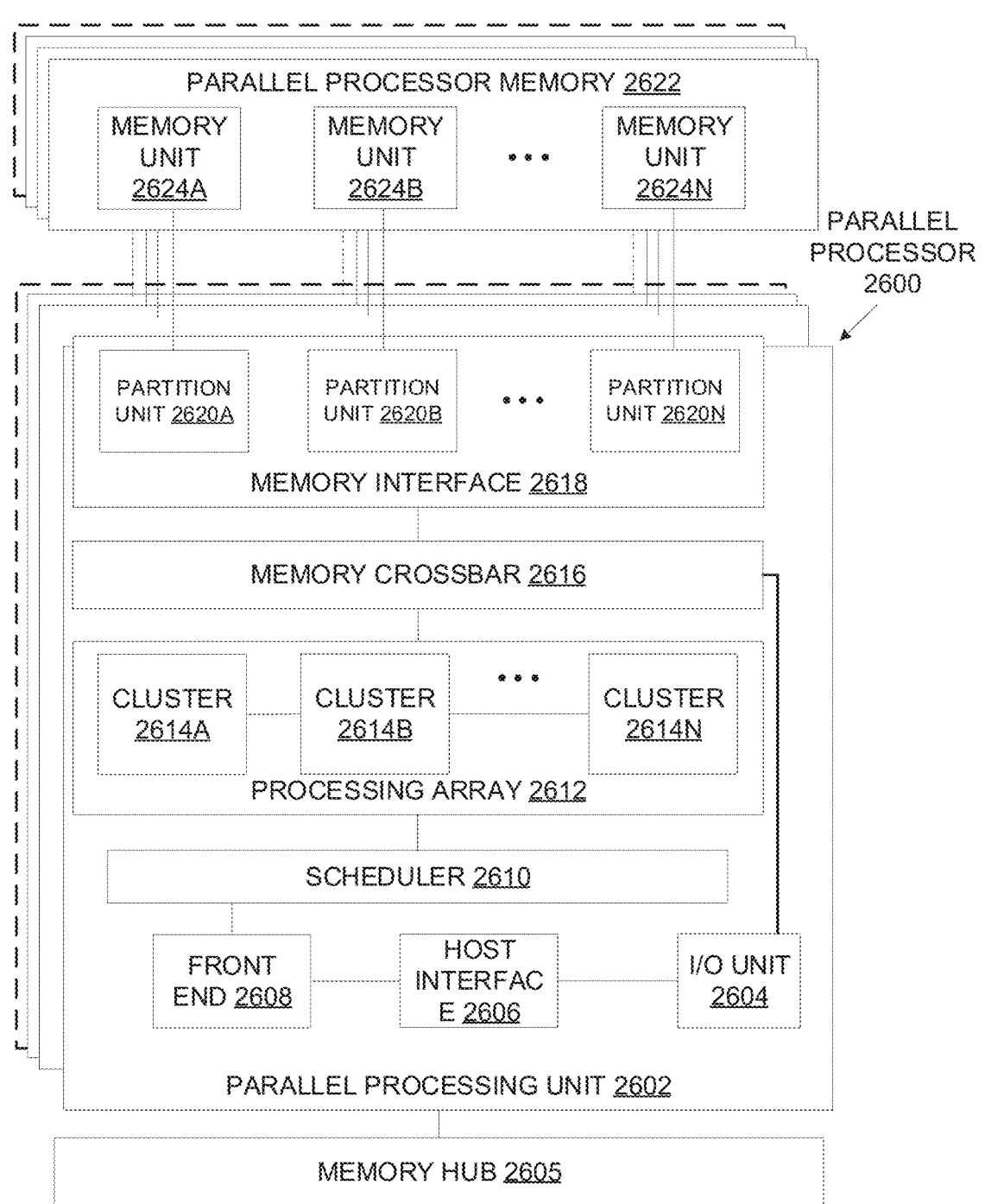
FIG. 26A illustrates a parallel processor, in accordance with at least one embodiment.

FIG. 26A illustrates a parallel processor 2600, in accordance with at least one embodiment. In at least one embodiment, various components of parallel processor 2600 may be implemented using one or more integrated circuit devices, such as programmable processors, application specific integrated circuits ("ASICs"), or FPGAs.

In at least one embodiment, parallel processor 2600 includes a parallel processing unit 2602. In at least one embodiment, parallel processing unit 2602 includes an I/O unit 2604 that enables communication with other devices, including other instances of parallel processing unit 2602. In at least one embodiment, I/O unit 2604 may be directly connected to other devices. In at least one embodiment, I/O unit 2604 connects with other devices via use of a hub or switch interface, such as memory hub 2605. In at least one embodiment, connections between memory hub 2605 and I/O unit 2604 form a communication link. In at least one embodiment, I/O unit 2604 connects with a host interface 2606 and a memory crossbar 2616, where host interface 2606 receives commands directed to performing processing operations and memory crossbar 2616 receives commands directed to performing memory operations.

In at least one embodiment, when host interface 2606 receives a command buffer via I/O unit 2604, host interface 2606 can direct work operations to perform those commands to a front end 2608. In at least one embodiment, front end 2608 couples with a scheduler 2610, which is configured to distribute commands or other work items to a processing array 2612. In at least one embodiment, scheduler 2610 ensures that processing array 2612 is properly configured and in a valid state before tasks are distributed to processing array 2612. In at least one embodiment, scheduler 2610 is implemented via firmware logic executing on a microcontroller. In at least one embodiment, microcontroller implemented scheduler 2610 is configurable to perform complex scheduling and work distribution operations at coarse and fine granularity, enabling rapid preemption and context switching of threads executing on processing array 2612. In at least one embodiment, host software can prove workloads for scheduling on processing array 2612 via one of multiple graphics processing doorbells. In at least one embodiment, workloads can then be automatically distributed across processing array 2612 by scheduler 2610 logic within a microcontroller including scheduler 2610.

In at least one embodiment, processing array 2612 can include up to "N" clusters (cluster 2614A, cluster 2614B, through cluster 2614N). In at least one embodiment, each cluster 2614A-2614N of processing array 2612 can execute a large number of concurrent threads. In at least one embodiment, scheduler 2610 can allocate work to clusters 2614A-2614N of processing array 2612 using various scheduling and/or work distribution algorithms, which may vary depending on the workload arising for each type of program or computation. In at least one embodiment, scheduling can be handled dynamically by scheduler 2610, or can be assisted in part by compiler logic during compilation of program logic configured for execution by processing array 2612. In at least one embodiment, different clusters 2614A-2614N of processing array 2612 can be allocated for processing different types of programs or for performing different types of computations.

In at least one embodiment, processing array 2612 can be configured to perform various types of parallel processing operations. In at least one embodiment, processing array 2612 is configured to perform general-purpose parallel compute operations. For example, in at least one embodiment, processing array 2612 can include logic to execute processing tasks including filtering of video and/or audio data, performing modeling operations, including physics operations, and performing data transformations.

In at least one embodiment, processing array 2612 is configured to perform parallel graphics processing operations. In at least one embodiment, processing array 2612 can include additional logic to support execution of such graphics processing operations, including, but not limited to texture sampling logic to perform texture operations, as well as tessellation logic and other vertex processing logic. In at least one embodiment, processing array 2612 can be configured to execute graphics processing related shader programs such as, but not limited to vertex shaders, tessellation shaders, geometry shaders, and pixel shaders. In at least one embodiment, parallel processing unit 2602 can transfer data from system memory via I/O unit 2604 for processing. In at least one embodiment, during processing, transferred data can be stored to on-chip memory (e.g., a parallel processor memory 2622) during processing, then written back to system memory.

In at least one embodiment, when parallel processing unit 2602 is used to perform graphics processing, scheduler 2610 can be configured to divide a processing workload into approximately equal sized tasks, to better enable distribution of graphics processing operations to multiple clusters 2614A-2614N of processing array 2612. In at least one embodiment, portions of processing array 2612 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2614A-2614N may be stored in buffers to allow intermediate data to be transmitted between clusters 2614A-2614N for further processing.

In at least one embodiment, processing array 2612 can receive processing tasks to be executed via scheduler 2610, which receives commands defining processing tasks from front end 2608. In at least one embodiment, processing tasks can include indices of data to be processed, g, surface (patch) data, primitive data, vertex data, and/or pixel data, as well as state parameters and commands defining how data is to be processed (e.g., what program is to be executed). In at least one embodiment, scheduler 2610 may be configured to fetch indices corresponding to tasks or may receive indices from front end 2608. In at least one embodiment, front end 2608 can be configured to ensure processing array 2612 is configured to a valid state before a workload specified by incoming command buffers (e.g., batch-buffers, push buffers, etc.) is initiated.

In at least one embodiment, each of one or more instances of parallel processing unit 2602 can couple with parallel processor memory 2622. In at least one embodiment, parallel processor memory 2622 can be accessed via memory crossbar 2616, which can receive memory requests from processing array 2612 as well as I/O unit 2604. In at least one embodiment, memory crossbar 2616 can access parallel processor memory 2622 via a memory interface 2618. In at least one embodiment, memory interface 2618 can include multiple partition units (e.g., a partition unit 2620A, partition unit 2620B, through partition unit 2620N) that can each couple to a portion (e.g., memory unit) of parallel processor memory 2622. In at least one embodiment, a number of partition units 2620A-2620N is configured to be equal to a number of memory units, such that a first partition unit 2620A has a corresponding first memory unit 2624A, a second partition unit 2620B has a corresponding memory unit 2624B, and an Nth partition unit 2620N has a corresponding Nth memory unit 2624N. In at least one embodiment, a number of partition units 2620A-2620N may not be equal to a number of memory devices.

In at least one embodiment, memory units 2624A-2624N can include various types of memory devices, including DRAM or graphics random access memory, such as SGRAM, including GDDR memory. In at least one embodiment, memory units 2624A-2624N may also include 3D stacked memory, including but not limited to high bandwidth memory ("HBM"). In at least one embodiment, render targets, such as frame buffers or texture maps may be stored across memory units 2624A-2624N, allowing partition units 2620A-2620N to write portions of each render target in parallel to efficiently use available bandwidth of parallel processor memory 2622. In at least one embodiment, a local instance of parallel processor memory 2622 may be excluded in favor of a unified memory design that utilizes system memory in conjunction with local cache memory.

In at least one embodiment, any one of clusters 2614A-2614N of processing array 2612 can process data that will be written to any of memory units 2624A-2624N within parallel processor memory 2622. In at least one embodiment, memory crossbar 2616 can be configured to transfer an output of each cluster 2614A-2614N to any partition unit 2620A-2620N or to another cluster 2614A-2614N, which can perform additional processing operations on an output. In at least one embodiment, each cluster 2614A-2614N can communicate with memory interface 2618 through memory crossbar 2616 to read from or write to various external memory devices. In at least one embodiment, memory crossbar 2616 has a connection to memory interface 2618 to communicate with I/O unit 2604, as well as a connection to a local instance of parallel processor memory 2622, enabling processing units within different clusters 2614A-2614N to communicate with system memory or other memory that is not local to parallel processing unit 2602. In at least one embodiment, memory crossbar 2616 can use virtual channels to separate traffic streams between clusters 2614A-2614N and partition units 2620A-2620N.

In at least one embodiment, multiple instances of parallel processing unit 2602 can be provided on a single add-in card, or multiple add-in cards can be interconnected. In at least one embodiment, different instances of parallel processing unit 2602 can be configured to inter-operate even if different instances have different numbers of processing cores, different amounts of local parallel processor memory, and/or other configuration differences. For example, in at least one embodiment, some instances of parallel processing unit 2602 can include higher precision floating point units relative to other instances. In at least one embodiment, systems incorporating one or more instances of parallel processing unit 2602 or parallel processor 2600 can be implemented in a variety of configurations and form factors, including but not limited to desktop, laptop, or handheld personal computers, servers, workstations, game consoles, and/or embedded systems.

Figure 26B:
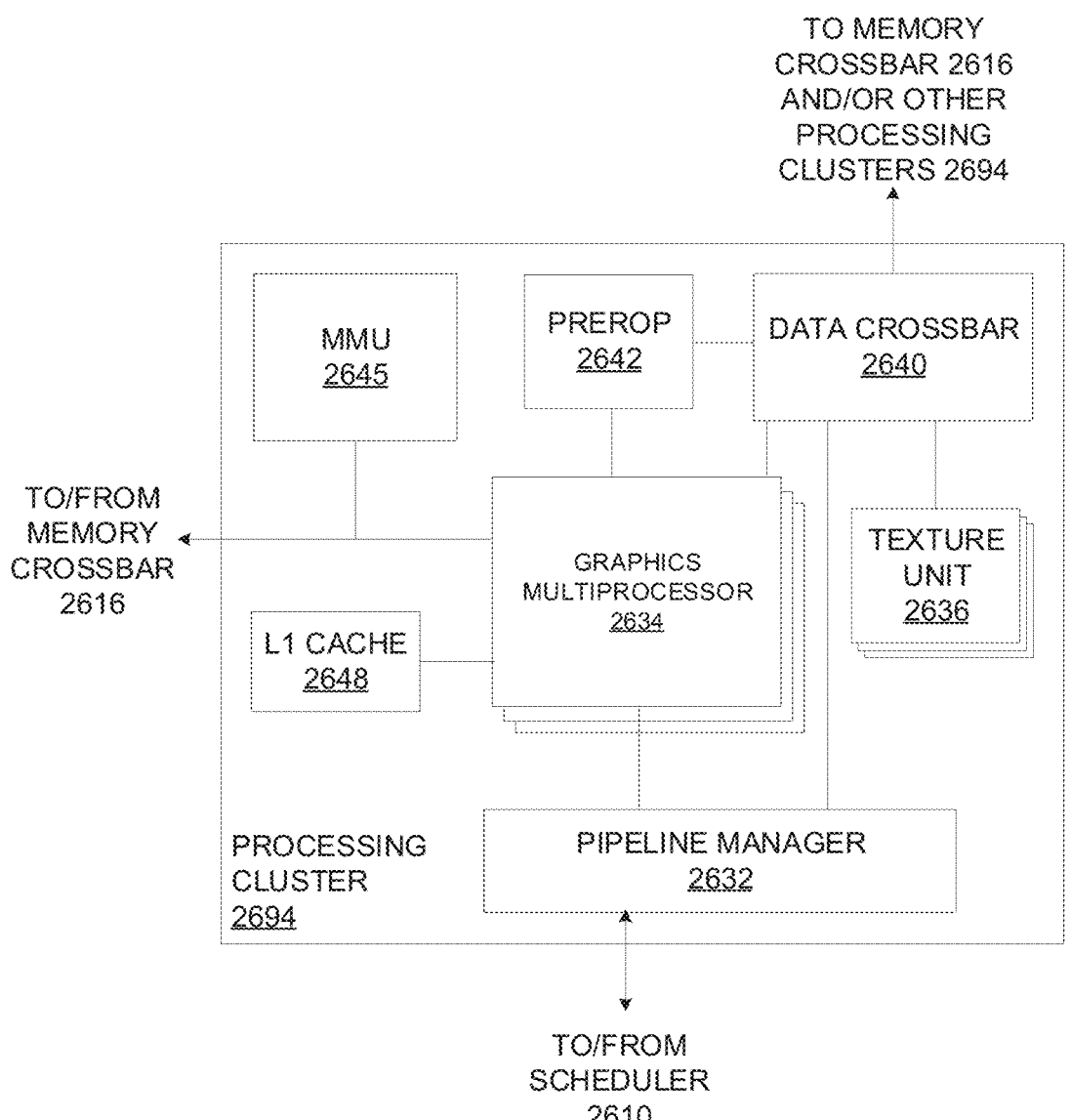
FIG. 26B illustrates a processing cluster, in accordance with at least one embodiment.

FIG. 26B illustrates a processing cluster 2694, in accordance with at least one embodiment. In at least one embodiment, processing cluster 2694 is included within a parallel processing unit. In at least one embodiment, processing cluster 2694 is one of processing clusters 2614A-2614N of FIG. 26. In at least one embodiment, processing cluster 2694 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2694.

In at least one embodiment, operation of processing cluster 2694 can be controlled via a pipeline manager 2632 that distributes processing tasks to SIMT parallel processors. In at least one embodiment, pipeline manager 2632 receives instructions from scheduler 2610 of FIG. 26 and manages execution of those instructions via a graphics multiprocessor 2634 and/or a texture unit 2636. In at least one embodiment, graphics multiprocessor 2634 is an exemplary instance of a SIMT parallel processor. However, in at least one embodiment, various types of SIMT parallel processors of differing architectures may be included within processing cluster 2694. In at least one embodiment, one or more instances of graphics multiprocessor 2634 can be included within processing cluster 2694. In at least one embodiment, graphics multiprocessor 2634 can process data and a data crossbar 2640 can be used to distribute processed data to one of multiple possible destinations, including other shader units. In at least one embodiment, pipeline manager 2632 can facilitate distribution of processed data by specifying destinations for processed data to be distributed via data crossbar 2640.

In at least one embodiment, each graphics multiprocessor 2634 within processing cluster 2694 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2694 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2634. In at least one embodiment, a thread group may include fewer threads than a number of processing engines within graphics multiprocessor 2634. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2634. In at least one embodiment, when a thread group includes more threads than the number of processing engines within graphics multiprocessor 2634, processing can be performed over consecutive clock cycles. In at least one embodiment, multiple thread groups can be executed concurrently on graphics multiprocessor 2634.

In at least one embodiment, graphics multiprocessor 2634 includes an internal cache memory to perform load and store operations. In at least one embodiment, graphics multiprocessor 2634 can forego an internal cache and use a cache memory (e.g., L1 cache 2648) within processing cluster 2694. In at least one embodiment, each graphics multiprocessor 2634 also has access to Level 2 ("L2") caches within partition units (e.g., partition units 2620A-2620N of FIG. 26A) that are shared among all processing clusters 2694 and may be used to transfer data between threads. In at least one embodiment, graphics multiprocessor 2634 may also access off-chip global memory, which can include one or more of local parallel processor memory and/or system memory. In at least one embodiment, any memory external to parallel processing unit 2602 may be used as global memory. In at least one embodiment, processing cluster 2694 includes multiple instances of graphics multiprocessor 2634 that can share common instructions and data, which may be stored in L1 cache 2648.

In at least one embodiment, each processing cluster 2694 may include an MMU 2645 that is configured to map virtual addresses into physical addresses. In at least one embodiment, one or more instances of MMU 2645 may reside within memory interface 2618 of FIG. 26. In at least one embodiment, MMU 2645 includes a set of page table entries ("PTEs") used to map a virtual address to a physical address of a tile and optionally a cache line index. In at least one embodiment, MMU 2645 may include address translation lookaside buffers ("TLBs") or caches that may reside within graphics multiprocessor 2634 or L1 cache 2648 or processing cluster 2694. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2694 may be configured such that each graphics multiprocessor 2634 is coupled to a texture unit 2636 for performing texture mapping operations, g, determining texture sample positions, reading texture data, and filtering texture data. In at least one embodiment, texture data is read from an internal texture L1 cache (not shown) or from an L1 cache within graphics multiprocessor 2634 and is fetched from an L2 cache, local parallel processor memory, or system memory, as needed. In at least one embodiment, each graphics multiprocessor 2634 outputs a processed task to data crossbar 2640 to provide the processed task to another processing cluster 2694 for further processing or to store the processed task in an L2 cache, a local parallel processor memory, or a system memory via memory crossbar 2616. In at least one embodiment, a pre-raster operations unit ("preROP") 2642 is configured to receive data from graphics multiprocessor 2634, direct data to ROP units, which may be located with partition units as described herein (e.g., partition units 2620A-2620N of FIG. 26). In at least one embodiment, PreROP 2642 can perform optimizations for color blending, organize pixel color data, and perform address translations.

Figure 26C:
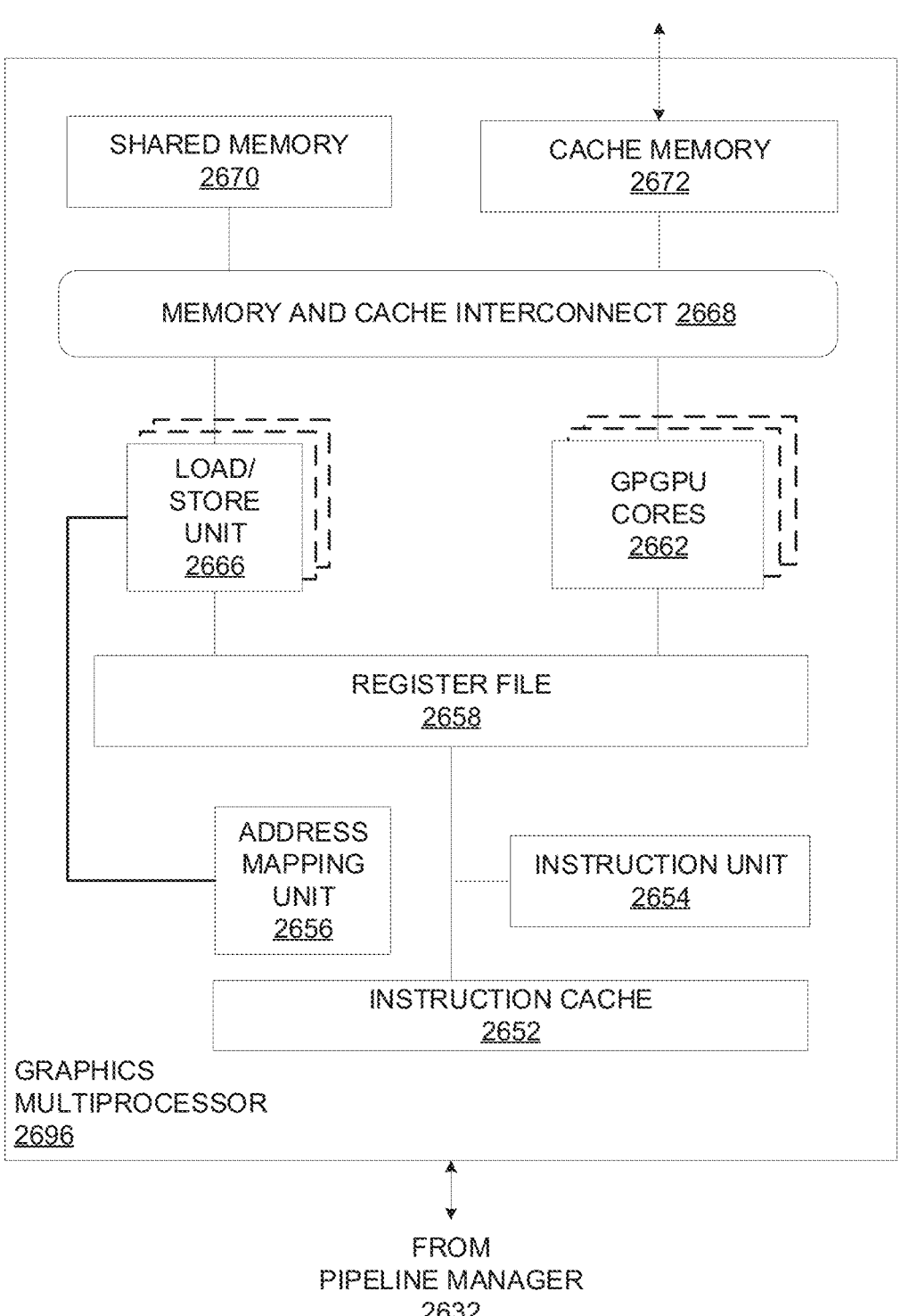
FIG. 26C illustrates a graphics multiprocessor, in accordance with at least one embodiment.

FIG. 26C illustrates a graphics multiprocessor 2696, in accordance with at least one embodiment. In at least one embodiment, graphics multiprocessor 2696 is graphics multiprocessor 2634 of FIG. 26B. In at least one embodiment, graphics multiprocessor 2696 couples with pipeline manager 2632 of processing cluster 2694. In at least one embodiment, graphics multiprocessor 2696 has an execution pipeline including but not limited to an instruction cache 2652, an instruction unit 2654, an address mapping unit 2656, a register file 2658, one or more GPGPU cores 2662, and one or more LSUs 2666. GPGPU cores 2662 and LSUs 2666 are coupled with cache memory 2672 and shared memory 2670 via a memory and cache interconnect 2668.

In at least one embodiment, instruction cache 2652 receives a stream of instructions to execute from pipeline manager 2632. In at least one embodiment, instructions are cached in instruction cache 2652 and dispatched for execution by instruction unit 2654. In at least one embodiment, instruction unit 2654 can dispatch instructions as thread groups (e, warps), with each thread of a thread group assigned to a different execution unit within GPGPU core 2662. In at least one embodiment, an instruction can access any of a local, shared, or global address space by specifying an address within a unified address space. In at least one embodiment, address mapping unit 2656 can be used to translate addresses in a unified address space into a distinct memory address that can be accessed by LSUs 2666.

In at least one embodiment, register file 2658 provides a set of registers for functional units of graphics multiprocessor 2696. In at least one embodiment, register file 2658 provides temporary storage for operands connected to data paths of functional units (e, GPGPU cores 2662, LSUs 2666) of graphics multiprocessor 2696. In at least one embodiment, register file 2658 is divided between each of functional units such that each functional unit is allocated a dedicated portion of register file 2658. In at least one embodiment, register file 2658 is divided between different thread groups being executed by graphics multiprocessor 2696.

In at least one embodiment, GPGPU cores 2662 can each include FPUs and/or integer ALUs that are used to execute instructions of graphics multiprocessor 2696. GPGPU cores 2662 can be similar in architecture or can differ in architecture. In at least one embodiment, a first portion of GPGPU cores 2662 include a single precision FPU and an integer ALU while a second portion of GPGPU cores 2662 include a double precision FPU. In at least one embodiment, FPUs can implement IEEE 754-2008 standard for floating point arithmetic or enable variable precision floating point arithmetic. In at least one embodiment, graphics multiprocessor 2696 can additionally include one or more fixed function or special function units to perform specific functions such as copy rectangle or pixel blending operations. In at least one embodiment one or more of GPGPU cores 2662 can also include fixed or special function logic.

In at least one embodiment, GPGPU cores 2662 include SIMD logic capable of performing a single instruction on multiple sets of data. In at least one embodiment GPGPU cores 2662 can physically execute SIMD4, SIMD8, and SIMD16 instructions and logically execute SIMD1, SIMD2, and SIMD32 instructions. In at least one embodiment, SIMD instructions for GPGPU cores 2662 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2668 is an interconnect network that connects each functional unit of graphics multiprocessor 2696 to register file 2658 and to shared memory 2670. In at least one embodiment, memory and cache interconnect 2668 is a crossbar interconnect that allows LSU 2666 to implement load and store operations between shared memory 2670 and register file 2658. In at least one embodiment, register file 2658 can operate at a same frequency as GPGPU cores 2662, thus data transfer between GPGPU cores 2662 and register file 2658 is very low latency. In at least one embodiment, shared memory 2670 can be used to enable communication between threads that execute on functional units within graphics multiprocessor 2696. In at least one embodiment, cache memory 2672 can be used as a data cache for example, to cache texture data communicated between functional units and texture unit 2636. In at least one embodiment, shared memory 2670 can also be used as a program managed cached. In at least one embodiment, threads executing on GPGPU cores 2662 can programmatically store data within shared memory in addition to automatically cached data that is stored within cache memory 2672.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 27:
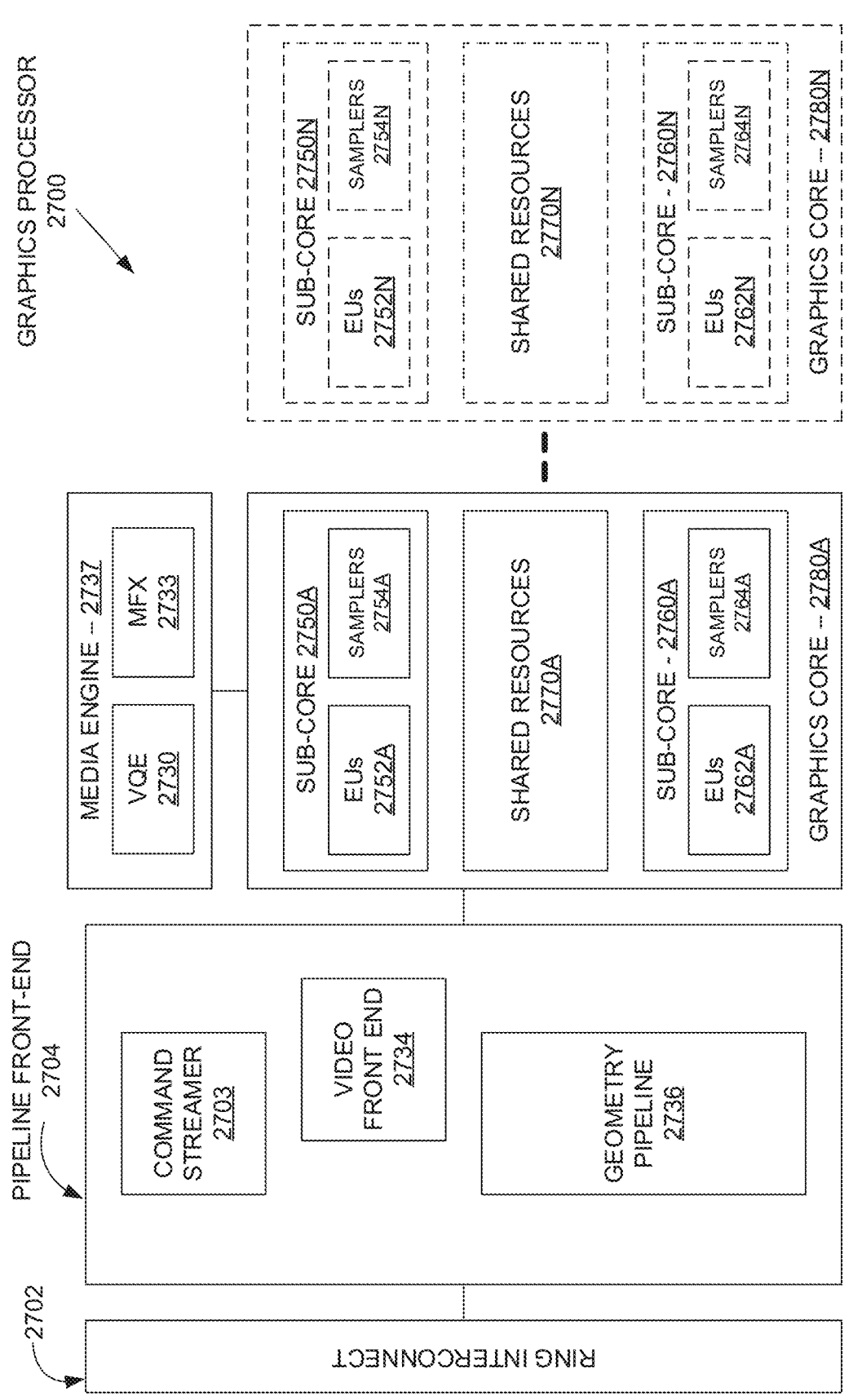
FIG. 27 illustrates a graphics processor, in accordance with at least one embodiment.

FIG. 27 illustrates a graphics processor 2700, in accordance with at least one embodiment. In at least one embodiment, graphics processor 2700 includes a ring interconnect 2702, a pipeline front-end 2704, a media engine 2737, and graphics cores 2780A-2780N. In at least one embodiment, ring interconnect 2702 couples graphics processor 2700 to other processing units, including other graphics processors or one or more general-purpose processor cores. In at least one embodiment, graphics processor 2700 is one of many processors integrated within a multi-core processing system.

In at least one embodiment, graphics processor 2700 receives batches of commands via ring interconnect 2702. In at least one embodiment, incoming commands are interpreted by a command streamer 2703 in pipeline front-end 2704. In at least one embodiment, graphics processor 2700 includes scalable execution logic to perform 3D geometry processing and media processing via graphics core(s) 2780A-2780N. In at least one embodiment, for 3D geometry processing commands, command streamer 2703 supplies commands to geometry pipeline 2736. In at least one embodiment, for at least some media processing commands, command streamer 2703 supplies commands to a video front end 2734, which couples with a media engine 2737. In at least one embodiment, media engine 2737 includes a Video Quality Engine ("VQE") 2730 for video and image post-processing and a multi-format encode/decode ("MFX") engine 2733 to provide hardware-accelerated media data encode and decode. In at least one embodiment, geometry pipeline 2736 and media engine 2737 each generate execution threads for thread execution resources provided by at least one graphics core 2780A.

In at least one embodiment, graphics processor 2700 includes scalable thread execution resources featuring modular graphics cores 2780A-2780N (sometimes referred to as core slices), each having multiple sub-cores 2750A-550N, 2760A-2760N (sometimes referred to as core sub-slices). In at least one embodiment, graphics processor 2700 can have any number of graphics cores 2780A through 2780N. In at least one embodiment, graphics processor 2700 includes a graphics core 2780A having at least a first sub-core 2750A and a second sub-core 2760A. In at least one embodiment, graphics processor 2700 is a low power processor with a single sub-core (sub-core 2750A). In at least one embodiment, graphics processor 2700 includes multiple graphics cores 2780A-2780N, each including a set of first sub-cores 2750A-2750N and a set of second sub-cores 2760A-2760N. In at least one embodiment, each sub-core in first sub-cores 2750A-2750N includes at least a first set of execution units ("EUs") 2752A-2752N and media/texture samplers 2754A-2754N. In at least one embodiment, each sub-core in second sub-cores 2760A-2760N includes at least a second set of execution units 2762A-2762N and samplers 2764A-2764N. In at least one embodiment, each sub-core 2750A-2750N, 2760A-2760N shares a set of shared resources 2770A-2770N. In at least one embodiment, shared resources 2770 include shared cache memory and pixel operation logic.

Figure 28:
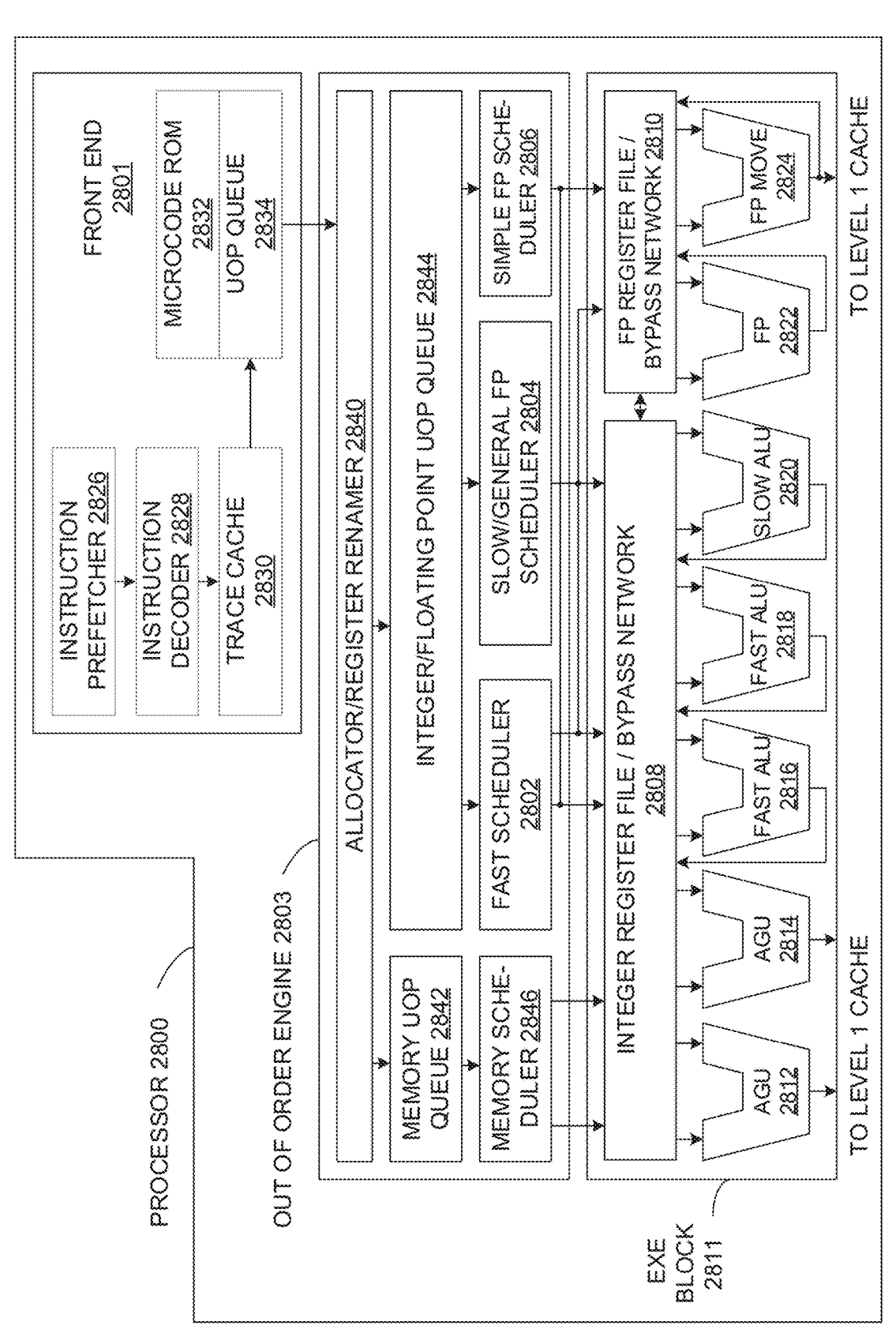
FIG. 28 illustrates a processor, in accordance with at least one embodiment.

FIG. 28 illustrates a processor 2800, in accordance with at least one embodiment. In at least one embodiment, processor 2800 may include, without limitation, logic circuits to perform instructions. In at least one embodiment, processor 2800 may perform instructions, including x86 instructions, ARM instructions, specialized instructions for ASICs, etc. In at least one embodiment, processor 2810 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2810 may perform instructions to accelerate CUDA programs.

In at least one embodiment, processor 2800 includes an in-order front end ("front end") 2801 to fetch instructions to be executed and prepare instructions to be used later in processor pipeline. In at least one embodiment, front end 2801 may include several units. In at least one embodiment, an instruction prefetcher 2826 fetches instructions from memory and feeds instructions to an instruction decoder 2828 which in turn decodes or interprets instructions. For example, in at least one embodiment, instruction decoder 2828 decodes a received instruction into one or more operations called "micro-instructions" or "micro-operations" (also called "micro ops" or "uops") for execution. In at least one embodiment, instruction decoder 2828 parses instruction into an opcode and corresponding data and control fields that may be used by micro-architecture to perform operations. In at least one embodiment, a trace cache 2830 may assemble decoded uops into program ordered sequences or traces in a uop queue 2834 for execution. In at least one embodiment, when trace cache 2830 encounters a complex instruction, a microcode ROM 2832 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2828 may access microcode ROM 2832 to perform instruction. In at least one embodiment, an instruction may be decoded into a small number of micro-ops for processing at instruction decoder 2828. In at least one embodiment, an instruction may be stored within microcode ROM 2832 should a number of micro-ops be needed to accomplish operation. In at least one embodiment, trace cache 2830 refers to an entry point programmable logic array ("PLA") to determine a correct micro-instruction pointer for reading microcode sequences to complete one or more instructions from microcode ROM 2832. In at least one embodiment, after microcode ROM 2832 finishes sequencing micro-ops for an instruction, front end 2801 of machine may resume fetching micro-ops from trace cache 2830.

In at least one embodiment, out-of-order execution engine ("out of order engine") 2803 may prepare instructions for execution. In at least one embodiment, out-of-order execution logic has a number of buffers to smooth out and re-order the flow of instructions to optimize performance as they go down a pipeline and get scheduled for execution. Out-of-order execution engine 2803 includes, without limitation, an allocator/register renamer 2840, a memory uop queue 2842, an integer/floating point uop queue 2844, a memory scheduler 2846, a fast scheduler 2802, a slow/general floating point scheduler ("slow/general FP scheduler") 2804, and a simple floating point scheduler ("simple FP scheduler") 2806. In at least one embodiment, fast schedule 2802, slow/general floating point scheduler 2804, and simple floating point scheduler 2806 are also collectively referred to herein as "uop schedulers 2802, 2804, 2806." Allocator/register renamer 2840 allocates machine buffers and resources that each uop needs in order to execute. In at least one embodiment, allocator/register renamer 2840 renames logic registers onto entries in a register file. In at least one embodiment, allocator/register renamer 2840 also allocates an entry for each uop in one of two uop queues, memory uop queue 2842 for memory operations and integer/floating point uop queue 2844 for non-memory operations, in front of memory scheduler 2846 and uop schedulers 2802, 2804, 2806. In at least one embodiment, uop schedulers 2802, 2804, 2806, determine when a uop is ready to execute based on readiness of their dependent input register operand sources and availability of execution resources uops need to complete their operation. In at least one embodiment, fast scheduler 2802 of at least one embodiment may schedule on each half of main clock cycle while slow/general floating point scheduler 2804 and simple floating point scheduler 2806 may schedule once per main processor clock cycle. In at least one embodiment, uop schedulers 2802, 2804, 2806 arbitrate for dispatch ports to schedule uops for execution.

In at least one embodiment, execution block 2811 includes, without limitation, an integer register file/bypass network 2808, a floating point register file/bypass network ("FP register file/bypass network") 2810, address generation units ("AGUs") 2812 and 2814, fast ALUs 2816 and 2818, a slow ALU 2820, a floating point ALU ("FP") 2822, and a floating point move unit ("FP move") 2824. In at least one embodiment, integer register file/bypass network 2808 and floating point register file/bypass network 2810 are also referred to herein as "register files 2808, 2810." In at least one embodiment, AGUSs 2812 and 2814, fast ALUs 2816 and 2818, slow ALU 2820, floating point ALU 2822, and floating point move unit 2824 are also referred to herein as "execution units 2812, 2814, 2816, 2818, 2820, 2822, and 2824." In at least one embodiment, an execution block may include, without limitation, any number (including zero) and type of register files, bypass networks, address generation units, and execution units, in any combination.

In at least one embodiment, register files 2808, 2810 may be arranged between uop schedulers 2802, 2804, 2806, and execution units 2812, 2814, 2816, 2818, 2820, 2822, and 2824. In at least one embodiment, integer register file/bypass network 2808 performs integer operations. In at least one embodiment, floating point register file/bypass network 2810 performs floating point operations. In at least one embodiment, each of register files 2808, 2810 may include, without limitation, a bypass network that may bypass or forward just completed results that have not yet been written into register file to new dependent uops. In at least one embodiment, register files 2808, 2810 may communicate data with each other. In at least one embodiment, integer register file/bypass network 2808 may include, without limitation, two separate register files, one register file for low-order thirty-two bits of data and a second register file for high order thirty-two bits of data. In at least one embodiment, floating point register file/bypass network 2810 may include, without limitation, 128-bit wide entries because floating point instructions typically have operands from 64 to 128 bits in width.

In at least one embodiment, execution units 2812, 2814, 2816, 2818, 2820, 2822, 2824 may execute instructions. In at least one embodiment, register files 2808, 2810 store integer and floating point data operand values that micro-instructions need to execute. In at least one embodiment, processor 2800 may include, without limitation, any number and combination of execution units 2812, 2814, 2816, 2818, 2820, 2822, 2824. In at least one embodiment, floating point ALU 2822 and floating point move unit 2824 may execute floating point, MMX, SIMD, AVX and SSE, or other operations. In at least one embodiment, floating point ALU 2822 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2816, 2818. In at least one embodiment, fast ALUS 2816, 2818 may execute fast operations with an effective latency of half a clock cycle. In at least one embodiment, most complex integer operations go to slow ALU 2820 as slow ALU 2820 may include, without limitation, integer execution hardware for long-latency type of operations, such as a multiplier, shifts, flag logic, and branch processing. In at least one embodiment, memory load/store operations may be executed by AGUs 2812, 2814. In at least one embodiment, fast ALU 2816, fast ALU 2818, and slow ALU 2820 may perform integer operations on 64-bit data operands. In at least one embodiment, fast ALU 2816, fast ALU 2818, and slow ALU 2820 may be implemented to support a variety of data bit sizes including sixteen, thirty-two, 128, 256, etc. In at least one embodiment, floating point ALU 2822 and floating point move unit 2824 may be implemented to support a range of operands having bits of various widths. In at least one embodiment, floating point ALU 2822 and floating point move unit 2824 may operate on 128-bit wide packed data operands in conjunction with SIMD and multimedia instructions.

In at least one embodiment, uop schedulers 2802, 2804, 2806 dispatch dependent operations before parent load has finished executing. In at least one embodiment, as uops may be speculatively scheduled and executed in processor 2800, processor 2800 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 29:
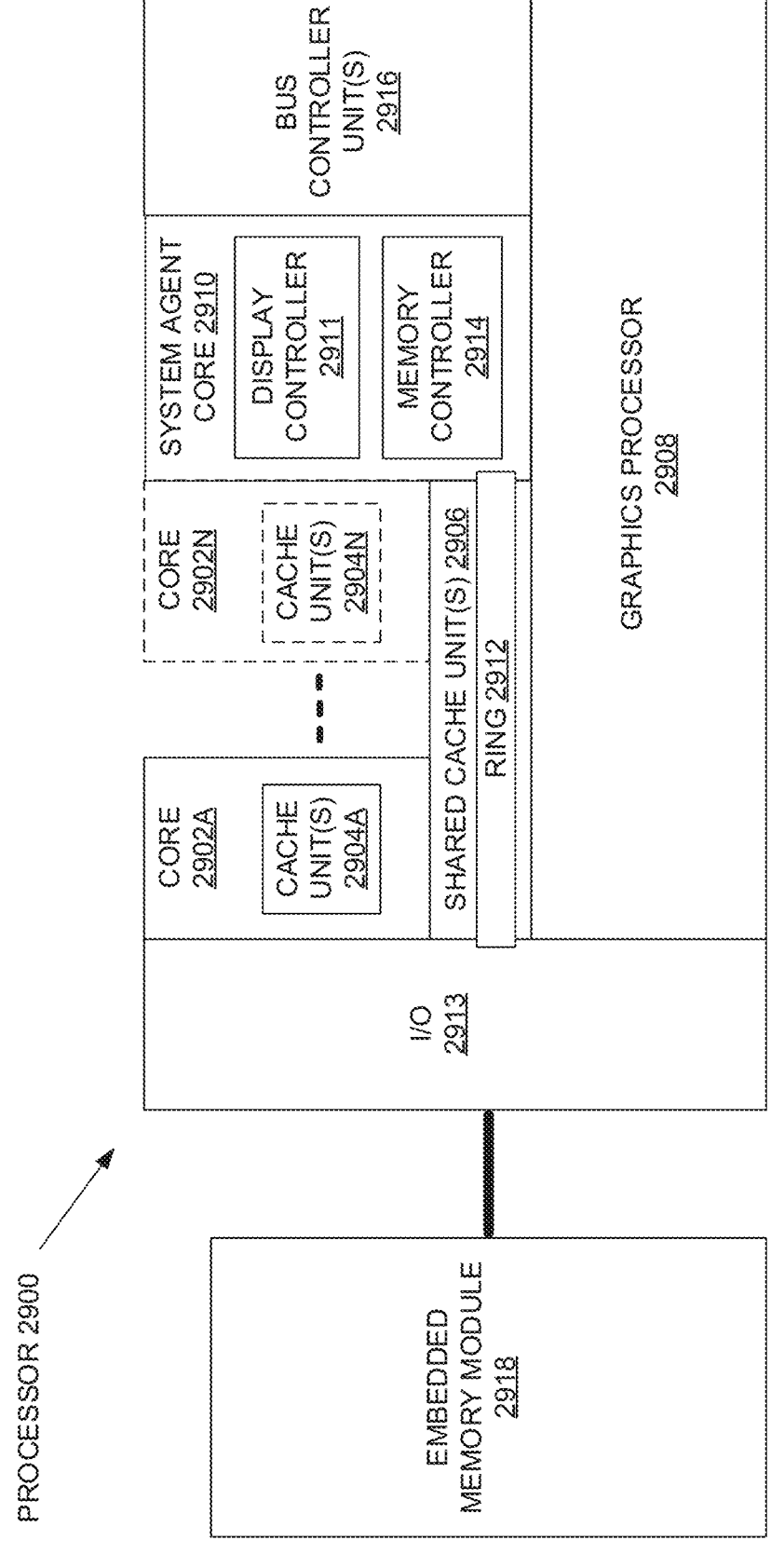
FIG. 29 illustrates a processor, in accordance with at least one embodiment.

FIG. 29 illustrates a processor 2900, in accordance with at least one embodiment. In at least one embodiment, processor 2900 includes, without limitation, one or more processor cores ("cores") 2902A-2902N, an integrated memory controller 2914, and an integrated graphics processor 2908. In at least one embodiment, processor 2900 can include additional cores up to and including additional processor core 2902N represented by dashed lined boxes. In at least one embodiment, each of processor cores 2902A-2902N includes one or more internal cache units 2904A-2904N. In at least one embodiment, each processor core also has access to one or more shared cached units 2906.

In at least one embodiment, internal cache units 2904A-2904N and shared cache units 2906 represent a cache memory hierarchy within processor 2900. In at least one embodiment, cache memory units 2904A-2904N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 2906 and 2904A-2904N.

In at least one embodiment, processor 2900 may also include a set of one or more bus controller units 2916 and a system agent core 2910. In at least one embodiment, one or more bus controller units 2916 manage a set of peripheral buses, such as one or more PCI or PCI express buses. In at least one embodiment, system agent core 2910 provides management functionality for various processor components. In at least one embodiment, system agent core 2910 includes one or more integrated memory controllers 2914 to manage access to various external memory devices (not shown).

In at least one embodiment, one or more of processor cores 2902A-2902N include support for simultaneous multi-threading. In at least one embodiment, system agent core 2910 includes components for coordinating and operating processor cores 2902A-2902N during multi-threaded processing. In at least one embodiment, system agent core 2910 may additionally include a power control unit ("PCU"), which includes logic and components to regulate one or more power states of processor cores 2902A-2902N and graphics processor 2908.

In at least one embodiment, processor 2900 additionally includes graphics processor 2908 to execute graphics processing operations. In at least one embodiment, graphics processor 2908 couples with shared cache units 2906, and system agent core 2910, including one or more integrated memory controllers 2914. In at least one embodiment, system agent core 2910 also includes a display controller 2911 to drive graphics processor output to one or more coupled displays. In at least one embodiment, display controller 2911 may also be a separate module coupled with graphics processor 2908 via at least one interconnect, or may be integrated within graphics processor 2908.

In at least one embodiment, a ring based interconnect unit 2912 is used to couple internal components of processor 2900. In at least one embodiment, an alternative interconnect unit may be used, such as a point-to-point interconnect, a switched interconnect, or other techniques. In at least one embodiment, graphics processor 2908 couples with ring interconnect 2912 via an I/O link 2913.

In at least one embodiment, I/O link 2913 represents at least one of multiple varieties of I/O interconnects, including an on package I/O interconnect which facilitates communication between various processor components and a high-performance embedded memory module 2918, such as an eDRAM module. In at least one embodiment, each of processor cores 2902A-2902N and graphics processor 2908 use embedded memory modules 2918 as a shared LLC.

In at least one embodiment, processor cores 2902A-2902N are homogeneous cores executing a common instruction set architecture. In at least one embodiment, processor cores 2902A-2902N are heterogeneous in terms of ISA, where one or more of processor cores 2902A-2902N execute a common instruction set, while one or more other cores of processor cores 2902A-29-02N executes a subset of a common instruction set or a different instruction set. In at least one embodiment, processor cores 2902A-2902N are heterogeneous in terms of microarchitecture, where one or more cores having a relatively higher power consumption couple with one or more cores having a lower power consumption. In at least one embodiment, processor 2900 can be implemented on one or more chips or as an SoC integrated circuit.

Figure 30:
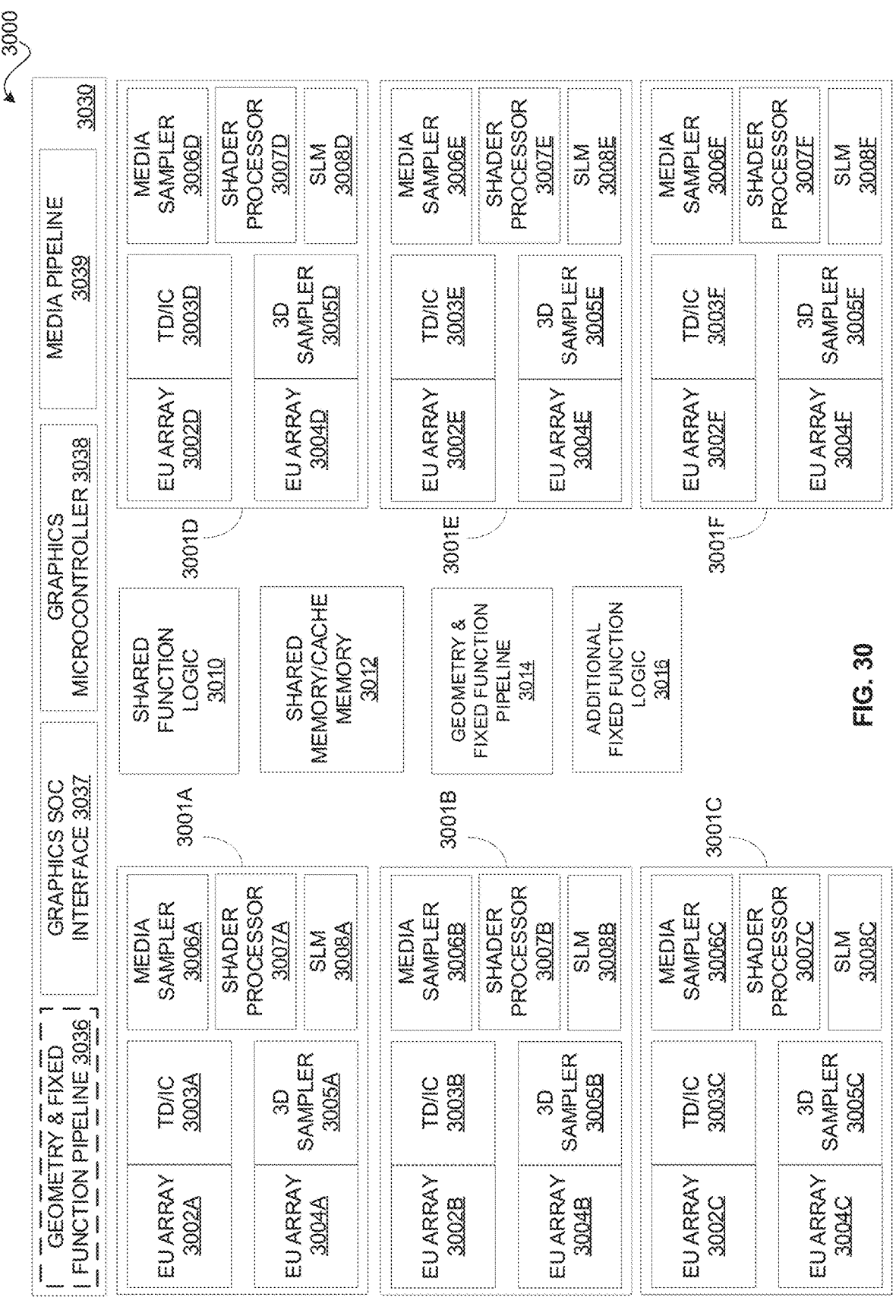
FIG. 30 illustrates a graphics processor core, in accordance with at least one embodiment.

FIG. 30 illustrates a graphics processor core 3000, in accordance with at least one embodiment described. In at least one embodiment, graphics processor core 3000 is included within a graphics core array. In at least one embodiment, graphics processor core 3000, sometimes referred to as a core slice, can be one or multiple graphics cores within a modular graphics processor. In at least one embodiment, graphics processor core 3000 is exemplary of one graphics core slice, and a graphics processor as described herein may include multiple graphics core slices based on target power and performance envelopes. In at least one embodiment, each graphics core 3000 can include a fixed function block 3030 coupled with multiple sub-cores 3001A-3001F, also referred to as sub-slices, that include modular blocks of general-purpose and fixed function logic.

In at least one embodiment, fixed function block 3030 includes a geometry/fixed function pipeline 3036 that can be shared by all sub-cores in graphics processor 3000, for example, in lower performance and/or lower power graphics processor implementations. In at least one embodiment, geometry/fixed function pipeline 3036 includes a 3D fixed function pipeline, a video front-end unit, a thread spawner and thread dispatcher, and a unified return buffer manager, which manages unified return buffers.

In at least one embodiment, fixed function block 3030 also includes a graphics SoC interface 3037, a graphics microcontroller 3038, and a media pipeline 3039. Graphics SoC interface 3037 provides an interface between graphics core 3000 and other processor cores within an SoC integrated circuit. In at least one embodiment, graphics microcontroller 3038 is a programmable sub-processor that is configurable to manage various functions of graphics processor 3000, including thread dispatch, scheduling, and pre-emption. In at least one embodiment, media pipeline 3039 includes logic to facilitate decoding, encoding, pre-processing, and/or post-processing of multimedia data, including image and video data. In at least one embodiment, media pipeline 3039 implements media operations via requests to compute or sampling logic within sub-cores 3001-3001F.

In at least one embodiment, SoC interface 3037 enables graphics core 3000 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 3037 can also enable communication with fixed function devices within an SoC, such as camera imaging pipelines, and enables use of and/or implements global memory atomics that may be shared between graphics core 3000 and CPUs within an SoC. In at least one embodiment, SoC interface 3037 can also implement power management controls for graphics core 3000 and enable an interface between a clock domain of graphic core 3000 and other clock domains within an SoC. In at least one embodiment, SoC interface 3037 enables receipt of command buffers from a command streamer and global thread dispatcher that are configured to provide commands and instructions to each of one or more graphics cores within a graphics processor. In at least one embodiment, commands and instructions can be dispatched to media pipeline 3039, when media operations are to be performed, or a geometry and fixed function pipeline (e.g., geometry and fixed function pipeline 3036, geometry and fixed function pipeline 3014) when graphics processing operations are to be performed.

In at least one embodiment, graphics microcontroller 3038 can be configured to perform various scheduling and management tasks for graphics core 3000. In at least one embodiment, graphics microcontroller 3038 can perform graphics and/or compute workload scheduling on various graphics parallel engines within execution unit (EU) arrays 3002A-3002F, 3004A-3004F within sub-cores 3001A-3001F. In at least one embodiment, host software executing on a CPU core of an SoC including graphics core 3000 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3038 can also facilitate low-power or idle states for graphics core 3000, providing graphics core 3000 with an ability to save and restore registers within graphics core 3000 across low-power state transitions independently from an operating system and/or graphics driver software on a system.

In at least one embodiment, graphics core 3000 may have greater than or fewer than illustrated sub-cores 3001A-3001F, up to N modular sub-cores. For each set of N sub-cores, in at least one embodiment, graphics core 3000 can also include shared function logic 3010, shared and/or cache memory 3012, a geometry/fixed function pipeline 3014, as well as additional fixed function logic 3016 to accelerate various graphics and compute processing operations. In at least one embodiment, shared function logic 3010 can include logic units (e.g., sampler, math, and/or inter-thread communication logic) that can be shared by each N sub-cores within graphics core 3000. Shared and/or cache memory 3012 can be an LLC for N sub-cores 3001A-3001F within graphics core 3000 and can also serve as shared memory that is accessible by multiple sub-cores. In at least one embodiment, geometry/fixed function pipeline 3014 can be included instead of geometry/fixed function pipeline 3036 within fixed function block 3030 and can include same or similar logic units.

In at least one embodiment, graphics core 3000 includes additional fixed function logic 3016 that can include various fixed function acceleration logic for use by graphics core 3000. In at least one embodiment, additional fixed function logic 3016 includes an additional geometry pipeline for use in position only shading. In position-only shading, at least two geometry pipelines exist, whereas in a full geometry pipeline within geometry/fixed function pipeline 3016, 3036, and a cull pipeline, which is an additional geometry pipeline which may be included within additional fixed function logic 3016. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3016 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3016 can also include general purpose processing acceleration logic, such as fixed function matrix multiplication logic, for accelerating CUDA programs.

In at least one embodiment, each graphics sub-core 3001A-3001F includes a set of execution resources that may be used to perform graphics, media, and compute operations in response to requests by graphics pipeline, media pipeline, or shader programs. In at least one embodiment, graphics sub-cores 3001A-3001F include multiple EU arrays 3002A-3002F, 3004A-3004F, thread dispatch and inter-thread communication ("TD/IC") logic 3003A-3003F, a 3D (e.g., texture) sampler 3005A-3005F, a media sampler 3006A-3006F, a shader processor 3007A-3007F, and shared local memory ("SLM") 3008A-3008F. EU arrays 3002A-3002F, 3004A-3004F each include multiple execution units, which are GPGPUs capable of performing floating-point and integer/fixed-point logic operations in service of a graphics, media, or compute operation, including graphics, media, or compute shader programs. In at least one embodiment, TD/IC logic 3003A-3003F performs local thread dispatch and thread control operations for execution units within a sub-core and facilitate communication between threads executing on execution units of a sub-core. In at least one embodiment, 3D sampler 3005A-3005F can read texture or other 3D graphics related data into memory. In at least one embodiment, 3D sampler can read texture data differently based on a configured sample state and texture format associated with a given texture. In at least one embodiment, media sampler 3006A-3006F can perform similar read operations based on a type and format associated with media data. In at least one embodiment, each graphics sub-core 3001A-3001F can alternately include a unified 3D and media sampler. In at least one embodiment, threads executing on execution units within each of sub-cores 3001A-3001F can make use of shared local memory 3008A-3008F within each sub-core, to enable threads executing within a thread group to execute using a common pool of on-chip memory.

Figure 31:
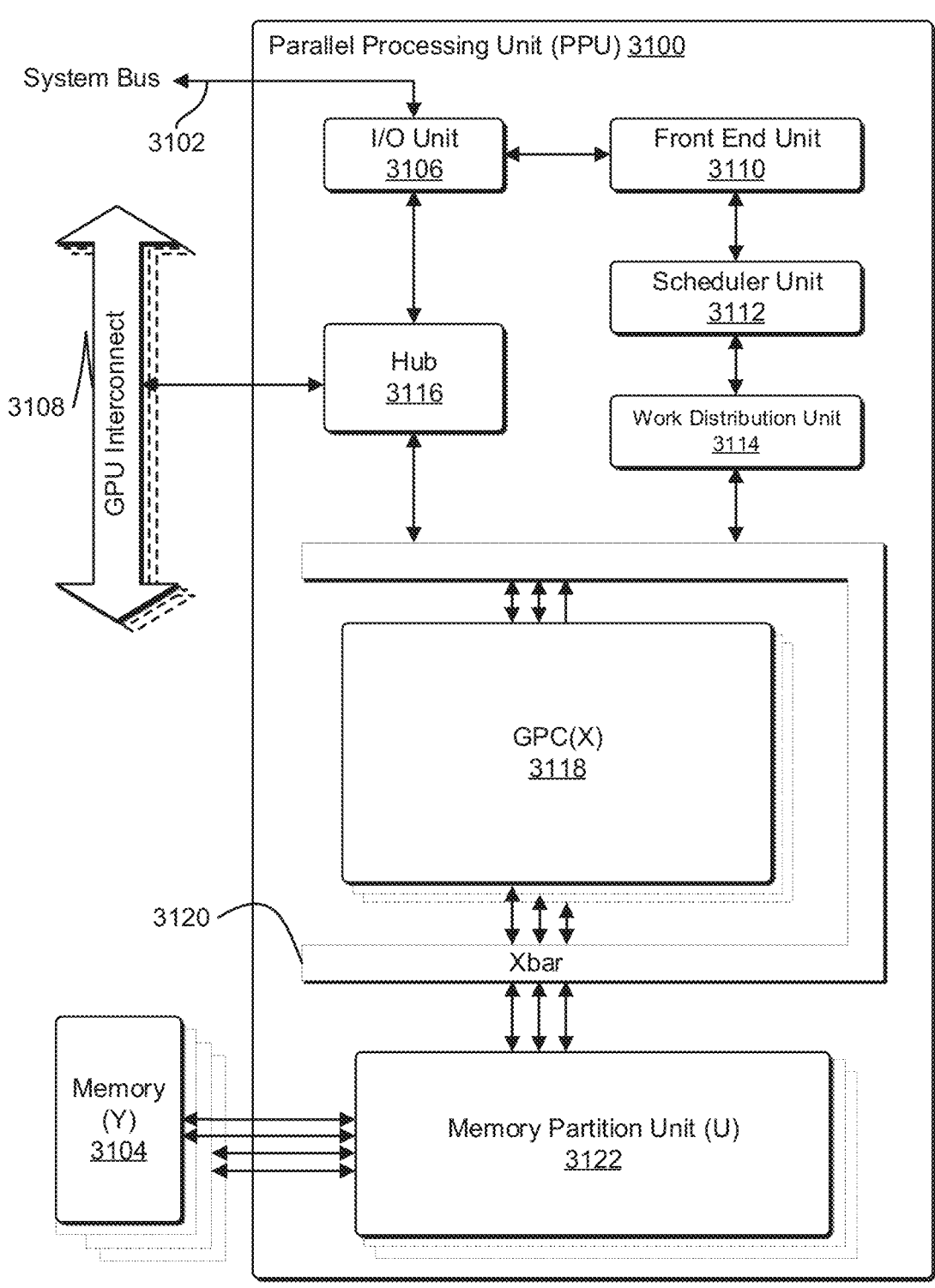
FIG. 31 illustrates a PPU, in accordance with at least one embodiment.

FIG. 31 illustrates a parallel processing unit ("PPU") 3100, in accordance with at least one embodiment. In at least one embodiment, PPU 3100 is configured with machine-readable code that, if executed by PPU 3100, causes PPU 3100 to perform some or all of processes and techniques described herein. In at least one embodiment, PPU 3100 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3100. In at least one embodiment, PPU 3100 is a GPU configured to implement a graphics rendering pipeline for processing three-dimensional ("3D") graphics data in order to generate two-dimensional ("2D") image data for display on a display device such as an LCD device. In at least one embodiment, PPU 3100 is utilized to perform computations such as linear algebra operations and machine-learning operations. FIG. 31 illustrates an example parallel processor for illustrative purposes only and should be construed as a non-limiting example of a processor architecture that may be implemented in at least one embodiment.

In at least one embodiment, one or more PPUs 3100 are configured to accelerate High Performance Computing ("HPC"), data center, and machine learning applications. In at least one embodiment, one or more PPUs 3100 are configured to accelerate CUDA programs. In at least one embodiment, PPU 3100 includes, without limitation, an I/O unit 3106, a front-end unit 3110, a scheduler unit 3112, a work distribution unit 3114, a hub 3116, a crossbar ("Xbar") 3120, one or more general processing clusters ("GPCs")

3118, and one or more partition units ("memory partition units") 3122. In at least one embodiment, PPU 3100 is connected to a host processor or other PPUs 3100 via one or more high-speed GPU interconnects ("GPU interconnects") 3108. In at least one embodiment, PPU 3100 is connected to a host processor or other peripheral devices via a system bus or interconnect 3102. In at least one embodiment, PPU 3100 is connected to a local memory comprising one or more memory devices ("memory") 3104. In at least one embodiment, memory devices 3104 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3108 may refer to a wire-based multi-lane communications link that is used by systems to scale and include one or more PPUs 3100 combined with one or more CPUs, supports cache coherence between PPUs 3100 and CPUs, and CPU mastering. In at least one embodiment, data and/or commands are transmitted by high-speed GPU interconnect 3108 through hub 3116 to/from other units of PPU 3100 such as one or more copy engines, video encoders, video decoders, power management units, and other components which may not be explicitly illustrated in FIG. 31.

In at least one embodiment, I/O unit 3106 is configured to transmit and receive communications (e.g., commands, data) from a host processor (not illustrated in FIG. 31) over system bus 3102. In at least one embodiment, I/O unit 3106 communicates with host processor directly via system bus 3102 or through one or more intermediate devices such as a memory bridge. In at least one embodiment, I/O unit 3106 may communicate with one or more other processors, such as one or more of PPUs 3100 via system bus 3102. In at least one embodiment, I/O unit 3106 implements a PCIe interface for communications over a PCIe bus. In at least one embodiment, I/O unit 3106 implements interfaces for communicating with external devices.

In at least one embodiment, I/O unit 3106 decodes packets received via system bus 3102. In at least one embodiment, at least some packets represent commands configured to cause PPU 3100 to perform various operations. In at least one embodiment, I/O unit 3106 transmits decoded commands to various other units of PPU 3100 as specified by commands. In at least one embodiment, commands are transmitted to front-end unit 3110 and/or transmitted to hub 3116 or other units of PPU 3100 such as one or more copy engines, a video encoder, a video decoder, a power management unit, etc. (not explicitly illustrated in FIG. 31). In at least one embodiment, I/O unit 3106 is configured to route communications between and among various logical units of PPU 3100.

In at least one embodiment, a program executed by host processor encodes a command stream in a buffer that provides workloads to PPU 3100 for processing. In at least one embodiment, a workload comprises instructions and data to be processed by those instructions. In at least one embodiment, buffer is a region in a memory that is accessible (e.g., read/write) by both a host processor and PPU 3100 a host interface unit may be configured to access buffer in a system memory connected to system bus 3102 via memory requests transmitted over system bus 3102 by I/O unit 3106. In at least one embodiment, a host processor writes a command stream to a buffer and then transmits a pointer to the start of the command stream to PPU 3100 such that front-end unit 3110 receives pointers to one or more command streams and manages one or more command streams, reading commands from command streams and forwarding commands to various units of PPU 3100.

In at least one embodiment, front-end unit 3110 is coupled to scheduler unit 3112 that configures various GPCs 3118 to process tasks defined by one or more command streams. In at least one embodiment, scheduler unit 3112 is configured to track state information related to various tasks managed by scheduler unit 3112 where state information may indicate which of GPCs 3118 a task is assigned to, whether task is active or inactive, a priority level associated with task, and so forth. In at least one embodiment, scheduler unit 3112 manages execution of a plurality of tasks on one or more of GPCs 3118.

In at least one embodiment, scheduler unit 3112 is coupled to work distribution unit 3114 that is configured to dispatch tasks for execution on GPCs 3118. In at least one embodiment, work distribution unit 3114 tracks a number of scheduled tasks received from scheduler unit 3112 and work distribution unit 3114 manages a pending task pool and an active task pool for each of GPCs 3118. In at least one embodiment, pending task pool comprises a number of slots (e.g., 32 slots) that contain tasks assigned to be processed by a particular GPC 3118; active task pool may comprise a number of slots (e.g., 4 slots) for tasks that are actively being processed by GPCs 3118 such that as one of GPCs 3118 completes execution of a task, that task is evicted from active task pool for GPC 3118 and one of other tasks from pending task pool is selected and scheduled for execution on GPC 3118. In at least one embodiment, if an active task is idle on GPC 3118, such as while waiting for a data dependency to be resolved, then the active task is evicted from GPC 3118 and returned to a pending task pool while another task in the pending task pool is selected and scheduled for execution on GPC 3118.

In at least one embodiment, work distribution unit 3114 communicates with one or more GPCs 3118 via XBar 3120. In at least one embodiment, XBar 3120 is an interconnect network that couples many units of PPU 3100 to other units of PPU 3100 and can be configured to couple work distribution unit 3114 to a particular GPC 3118. In at least one embodiment, one or more other units of PPU 3100 may also be connected to XBar 3120 via hub 3116.

In at least one embodiment, tasks are managed by scheduler unit 3112 and dispatched to one of GPCs 3118 by work distribution unit 3114. GPC 3118 is configured to process task and generate results. In at least one embodiment, results may be consumed by other tasks within GPC 3118, routed to a different GPC 3118 via XBar 3120, or stored in memory 3104. In at least one embodiment, results can be written to memory 3104 via partition units 3122, which implement a memory interface for reading and writing data to/from memory 3104. In at least one embodiment, results can be transmitted to another PPU 3104 or CPU via high-speed GPU interconnect 3108. In at least one embodiment, PPU 3100 includes, without limitation, a number U of partition units 3122 that is equal to number of separate and distinct memory devices 3104 coupled to PPU 3100.

In at least one embodiment, a host processor executes a driver kernel that implements an application programming interface ("API") that enables one or more applications executing on host processor to schedule operations for execution on PPU 3100. In at least one embodiment, multiple compute applications are simultaneously executed by PPU 3100 and PPU 3100 provides isolation, quality of service ("QoS"), and independent address spaces for multiple compute applications. In at least one embodiment, an application generates instructions (e.g., in the form of API calls) that cause a driver kernel to generate one or more tasks for execution by PPU 3100 and the driver kernel outputs tasks to one or more streams being processed by PPU 3100. In at least one embodiment, each task comprises one or more groups of related threads, which may be referred to as a warp. In at least one embodiment, a warp comprises a plurality of related threads (32 threads) that can be executed in parallel. In at least one embodiment, cooperating threads can refer to a plurality of threads including instructions to perform a task and that exchange data through shared memory.

Figure 32:
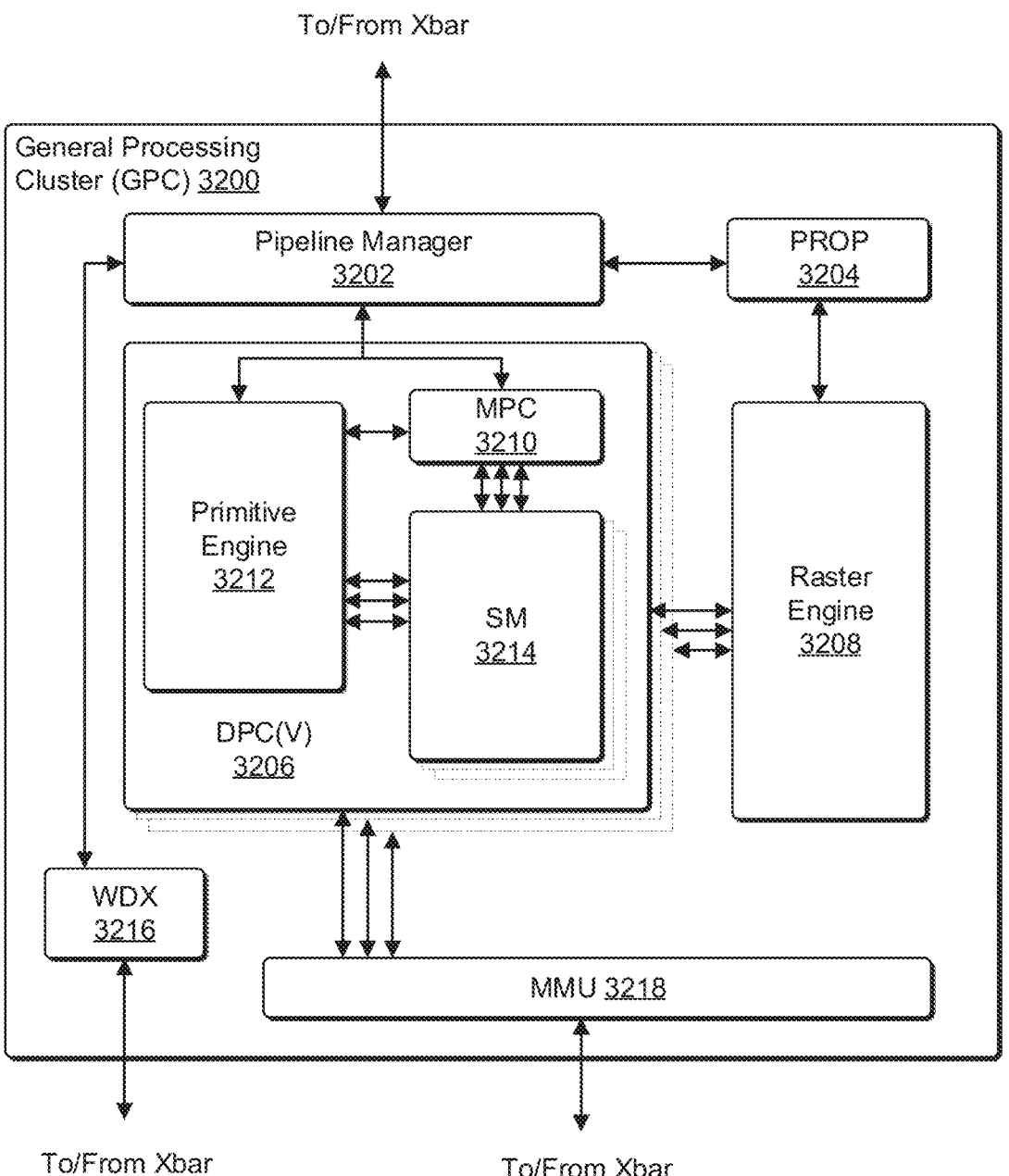
FIG. 32 illustrates a GPC, in accordance with at least one embodiment.

FIG. 32 illustrates a GPC 3200, in accordance with at least one embodiment. In at least one embodiment, GPC 3200 is GPC 3118 of FIG. 31. In at least one embodiment, each GPC 3200 includes, without limitation, a number of hardware units for processing tasks and each GPC 3200 includes, without limitation, a pipeline manager 3202, a pre-raster operations unit ("PROP") 3204, a raster engine 3208, a work distribution crossbar ("WDX") 3216, an MMU 3218, one or more Data Processing Clusters ("DPCs") 3206, and any suitable combination of parts.

In at least one embodiment, operation of GPC 3200 is controlled by pipeline manager 3202. In at least one embodiment, pipeline manager 3202 manages configuration of one or more DPCs 3206 for processing tasks allocated to GPC 3200. In at least one embodiment, pipeline manager 3202 configures at least one of one or more DPCs 3206 to implement at least a portion of a graphics rendering pipeline. In at least one embodiment, DPC 3206 is configured to execute a vertex shader program on a programmable streaming multiprocessor ("SM") 3214. In at least one embodiment, pipeline manager 3202 is configured to route packets received from a work distribution unit to appropriate logical units within GPC 3200 and, in at least one embodiment, some packets may be routed to fixed function hardware units in PROP 3204 and/or raster engine 3208 while other packets may be routed to DPCs 3206 for processing by a primitive engine 3212 or SM 3214. In at least one embodiment, pipeline manager 3202 configures at least one of DPCs 3206 to implement a computing pipeline. In at least one embodiment, pipeline manager 3202 configures at least one of DPCs 3206 to execute at least a portion of a CUDA program.

In at least one embodiment, PROP unit 3204 is configured to route data generated by raster engine 3208 and DPCs 3206 to a Raster Operations ("ROP") unit in a partition unit, such as memory partition unit 3122 described in more detail above in conjunction with FIG. 31. In at least one embodiment, PROP unit 3204 is configured to perform optimizations for color blending, organize pixel data, perform address translations, and more. In at least one embodiment, raster engine 3208 includes, without limitation, a number of fixed function hardware units configured to perform various raster operations and, in at least one embodiment, raster engine 3208 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 3208 comprises fragments to be processed by any suitable entity such as by a fragment shader implemented within DPC 3206.

In at least one embodiment, each DPC 3206 included in GPC 3200 comprise, without limitation, an M-Pipe Controller ("MPC") 3210; primitive engine 3212; one or more SMs 3214; and any suitable combination thereof. In at least one embodiment, MPC 3210 controls operation of DPC 3206, routing packets received from pipeline manager 3202 to appropriate units in DPC 3206. In at least one embodiment, packets associated with a vertex are routed to primitive engine 3212, which is configured to fetch vertex attributes associated with vertex from memory; in contrast, packets associated with a shader program may be transmitted to SM 3214.

In at least one embodiment, SM 3214 comprises, without limitation, a programmable streaming processor that is configured to process tasks represented by a number of threads. In at least one embodiment, SM 3214 is multi-threaded and configured to execute a plurality of threads (32 threads) from a particular group of threads concurrently and implements a SIMD architecture where each thread in a group of threads (e, a warp) is configured to process a different set of data based on same set of instructions. In at least one embodiment, all threads in group of threads execute same instructions. In at least one embodiment, SM 3214 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 3214 is described in more detail in conjunction with FIG. 33.

In at least one embodiment, MMU 3218 provides an interface between GPC 3200 and a memory partition unit (e.g., partition unit 3122 of FIG. 31) and MMU 3218 provides translation of virtual addresses into physical addresses, memory protection, and arbitration of memory requests. In at least one embodiment, MMU 3218 provides one or more translation lookaside buffers (TLBs) for performing translation of virtual addresses into physical addresses in memory.

Figure 33:
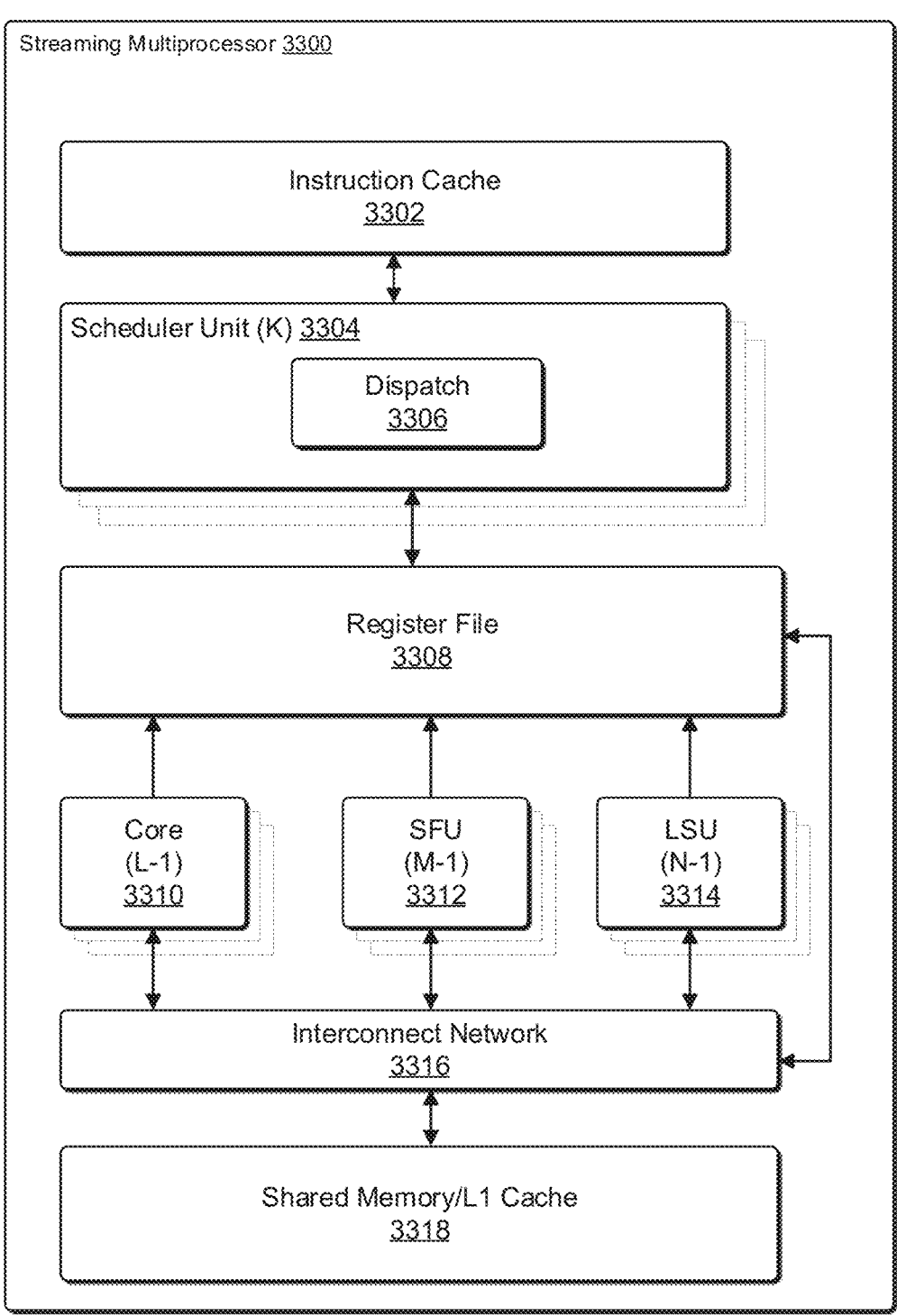
FIG. 33 illustrates a streaming multiprocessor, in accordance with at least one embodiment.

FIG. 33 illustrates a streaming multiprocessor ("SM") 3300, in accordance with at least one embodiment. In at least one embodiment, SM 3300 is SM 3214 of FIG. 32. In at least one embodiment, SM 3300 includes, without limitation, an instruction cache 3302; one or more scheduler units 3304; a register file 3308; one or more processing cores ("cores") 3310; one or more special function units ("SFUs") 3312; one or more LSUs 3314; an interconnect network 3316; a shared memory/L1 cache 3318; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 3300. In at least one embodiment, scheduler unit 3304 receives tasks from a work distribution unit and manages instruction scheduling for one or more thread blocks assigned to SM 3300. In at least one embodiment, scheduler unit 3304 schedules thread blocks for execution as warps of parallel threads, wherein each thread block is allocated at least one warp. In at least one embodiment, each warp executes threads. In at least one embodiment, scheduler unit 3304 manages a plurality of different thread blocks, allocating warps to different thread blocks and then dispatching instructions from a plurality of different cooperative groups to various functional units (processing cores 3310, SFUs 3312, and LSUs 3314) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 3306 is configured to transmit instructions to one or more of functional units and scheduler unit 3304 includes, without limitation, two dispatch units 3306 that enable two different instructions from same warp to be dispatched during each clock cycle. In at least one embodiment, each scheduler unit 3304 includes a single dispatch unit 3306 or additional dispatch units 3306.

In at least one embodiment, each SM 3300, in at least one embodiment, includes, without limitation, register file 3308 that provides a set of registers for functional units of SM 3300. In at least one embodiment, register file 3308 is divided between each of the functional units such that each functional unit is allocated a dedicated portion of register file 3308. In at least one embodiment, register file 3308 is divided between different warps being executed by SM 3300 and register file 3308 provides temporary storage for operands connected to data paths of functional units. In at least one embodiment, each SM 3300 comprises, without limitation, a plurality of L processing cores 3310. In at least one embodiment, SM 3300 includes, without limitation, a large number (e.g., 128 or more) of distinct processing cores 3310. In at least one embodiment, each processing core 3310 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3310 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 3310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 3300 comprises, without limitation, M SFUs 3312 that perform special functions (e.g., attribute evaluation, reciprocal square root, and like). In at least one embodiment, SFUs 3312 include, without limitation, a tree traversal unit configured to traverse a hierarchical tree data structure. In at least one embodiment, SFUs 3312 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3300. In at least one embodiment, texture maps are stored in shared memory/L1 cache 3318. In at least one embodiment, texture units implement texture operations such as filtering operations using mip-maps (e.g., texture maps of varying levels of detail). In at least one embodiment, each SM 3300 includes, without limitation, two texture units.

In at least one embodiment, each SM 3300 comprises, without limitation, N LSUs 3314 that implement load and store operations between shared memory/L1 cache 3318 and register file 3308. In at least one embodiment, each SM 3300 includes, without limitation, interconnect network 3316 that connects each of the functional units to register file 3308 and LSU 3314 to register file 3308 and shared memory/L1 cache

3318. In at least one embodiment, interconnect network 3316 is a crossbar that can be configured to connect any of the functional units to any of the registers in register file 3308 and connect LSUs 3314 to register file 3308 and memory locations in shared memory/L1 cache 3318.

In at least one embodiment, shared memory/L1 cache 3318 is an array of on-chip memory that allows for data storage and communication between SM 3300 and a primitive engine and between threads in SM 3300. In at least one embodiment, shared memory/L1 cache 3318 comprises, without limitation, 128 KB of storage capacity and is in a path from SM 3300 to a partition unit. In at least one embodiment, shared memory/L1 cache 3318 is used to cache reads and writes. In at least one embodiment, one or more of shared memory/L1 cache 3318, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 3318 enables shared memory/L1 cache 3318 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 3300 to execute a program and perform calculations, shared memory/L1 cache 3318 to communicate between threads, and LSU 3314 to read and write global memory through shared memory/L1 cache 3318 and a memory partition unit. In at least one embodiment, when configured for general purpose parallel computation, SM 3300 writes commands that scheduler unit 3304 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following figures set forth, without limitation, exemplary software constructs for implementing at least one embodiment. In at least one embodiment, one or more software constructs of following figures can implement one or more aspects of an embodiment described with respect to one or more of FIGS. 1-14, and/or one or more techniques described with respect to FIGS. 8-11.

Figure 34:
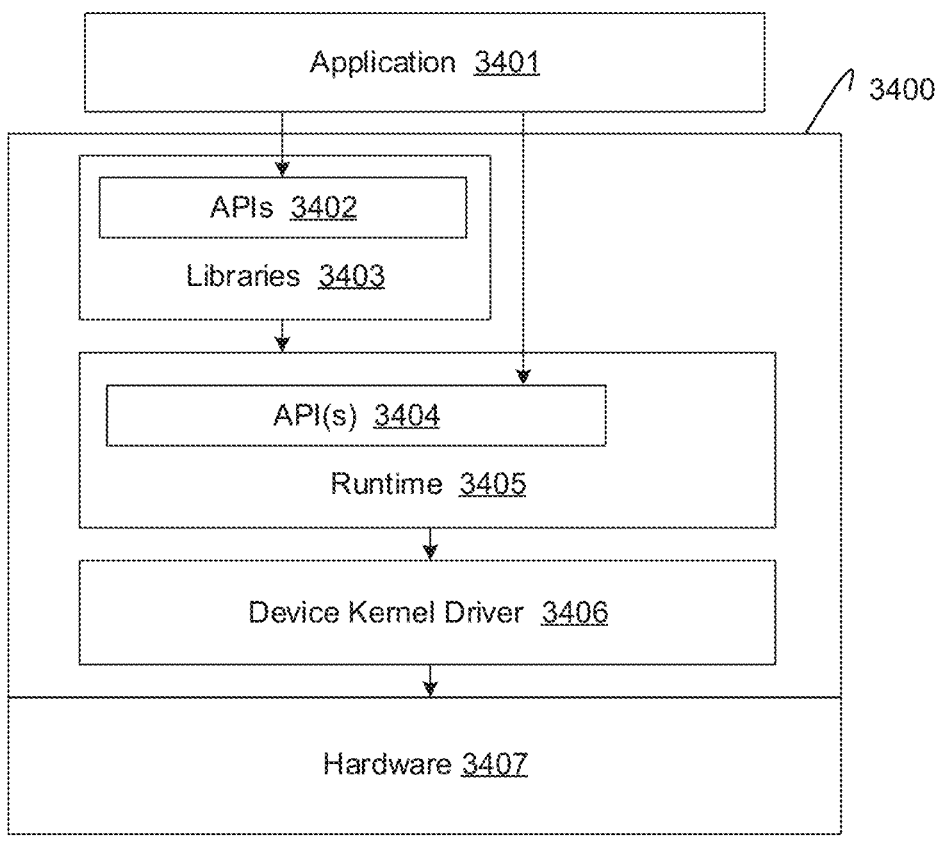
FIG. 34 illustrates a software stack of a programming platform, in accordance with at least one embodiment.

FIG. 34 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3400 of a programming platform provides an execution environment for an application 3401. In at least one embodiment, application 3401 may include any computer software capable of being launched on software stack 3400. In at least one embodiment, application 3401 may include, but is not limited to, an artificial intelligence ("AI")/machine learning ("ML") application, a high performance computing ("HPC") application, a virtual desktop infrastructure ("VDI"), or a data center workload.

In at least one embodiment, application 3401 and software stack 3400 run on hardware 3407. Hardware 3407 may include one or more GPUs, CPUs, FPGAs, AI engines, and/or other types of compute devices that support a programming platform, in at least one embodiment. In at least one embodiment, such as with CUDA, software stack 3400 may be vendor specific and compatible with only devices from particular vendor(s). In at least one embodiment, such as in with OpenCL, software stack 3400 may be used with devices from different vendors. In at least one embodiment, hardware 3407 includes a host connected to one more devices that can be accessed to perform computational tasks via application programming interface ("API") calls. A device within hardware 3407 may include, but is not limited to, a GPU, FPGA, AI engine, or other compute device (but may also include a CPU) and its memory, as opposed to a host within hardware 3407 that may include, but is not limited to, a CPU (but may also include a compute device) and its memory, in at least one embodiment.

In at least one embodiment, software stack 3400 of a programming platform includes, without limitation, a number of libraries 3403, a runtime 3405, and a device kernel driver 3406. Each of libraries 3403 may include data and programming code that can be used by computer programs and leveraged during software development, in at least one embodiment. In at least one embodiment, libraries 3403 may include, but are not limited to, pre-written code and subroutines, classes, values, type specifications, configuration data, documentation, help data, and/or message templates. In at least one embodiment, libraries 3403 include functions that are optimized for execution on one or more types of devices. In at least one embodiment, libraries 3403 may include, but are not limited to, functions for performing mathematical, deep learning, and/or other types of operations on devices. In at least one embodiment, libraries 3403 are associated with corresponding APIs 3402, which may include one or more APIs, that expose functions implemented in libraries 3403.

In at least one embodiment, application 3401 is written as source code that is compiled into executable code, as discussed in greater detail below in conjunction with FIGS. 39-41. Executable code of application 3401 may run, at least in part, on an execution environment provided by software stack 3400, in at least one embodiment. In at least one embodiment, during execution of application 3401, code may be reached that needs to run on a device, as opposed to a host. In such a case, runtime 3405 may be called to load and launch requisite code on the device, in at least one embodiment. In at least one embodiment, runtime 3405 may include any technically feasible runtime system that is able to support execution of application S01.

In at least one embodiment, runtime 3405 is implemented as one or more runtime libraries associated with corresponding APIs, which are shown as API(s) 3404. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3404 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3406 is configured to facilitate communication with an underlying device. In at least one embodiment, device kernel driver 3406 may provide low-level functionalities upon which APIs, such as API(s) 3404, and/or other software relies. In at least one embodiment, device kernel driver 3406 may be configured to compile intermediate representation ("IR") code into binary code at runtime. For CUDA, device kernel driver 3406 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3406 to compile IR code at runtime.

Figure 35:
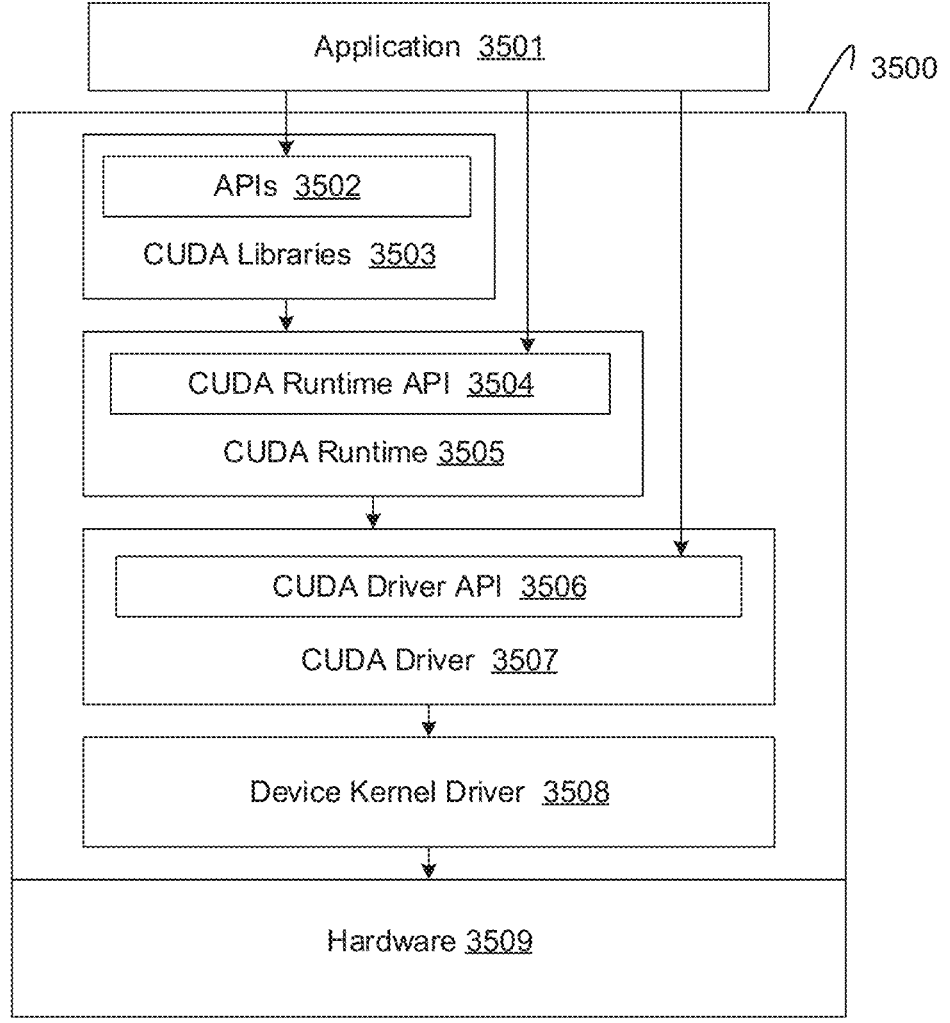
FIG. 35 illustrates a CUDA implementation of a software stack of FIG. 34, in accordance with at least one embodiment.

FIG. 35 illustrates a CUDA implementation of software stack 3400 of FIG. 34, in accordance with at least one embodiment. In at least one embodiment, a CUDA software stack 3500, on which an application 3501 may be launched, includes CUDA libraries 3503, a CUDA runtime 3505, a CUDA driver 3507, and a device kernel driver 3508. In at least one embodiment, CUDA software stack 3500 executes on hardware 3509, which may include a GPU that supports CUDA and is developed by NVIDIA Corporation of Santa Clara, CA.

In at least one embodiment, application 3501, CUDA runtime 3505, and device kernel driver 3508 may perform similar functionalities as application 3401, runtime 3405, and device kernel driver 3406, respectively, which are described above in conjunction with FIG. 34. In at least one embodiment, CUDA driver 3507 includes a library (libcuda.so) that implements a CUDA driver API 3506. Similar to a CUDA runtime API 3504 implemented by a CUDA runtime library (cudart), CUDA driver API 3506 may, without limitation, expose functions for memory management, execution control, device management, error handling, synchronization, and/or graphics interoperability, among other things, in at least one embodiment. In at least one embodiment, CUDA driver API 3506 differs from CUDA runtime API 3504 in that CUDA runtime API 3504 simplifies device code management by providing implicit initialization, context (analogous to a process) management, and module (analogous to dynamically loaded libraries) management. In contrast to high-level CUDA runtime API 3504, CUDA driver API 3506 is a low-level API providing more fine-grained control of the device, particularly with respect to contexts and module loading, in at least one embodiment. In at least one embodiment, CUDA driver API 3506 may expose functions for context management that are not exposed by CUDA runtime API 3504. In at least one embodiment, CUDA driver API 3506 is also language-independent and supports, e.g., OpenCL in addition to CUDA runtime API 3504. Further, in at least one embodiment, development libraries, including CUDA runtime 3505, may be considered as separate from driver components, including user-mode CUDA driver 3507 and kernel-mode device driver 3508 (also sometimes referred to as a "display" driver).

In at least one embodiment, CUDA libraries 3503 may include, but are not limited to, mathematical libraries, deep learning libraries, parallel algorithm libraries, and/or signal/image/video processing libraries, which parallel computing applications such as application 3501 may utilize. In at least one embodiment, CUDA libraries 3503 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3503 may include deep learning libraries such as a cuDNN library of primitives for deep neural networks and a TensorRT platform for high-performance deep learning inference, among others.

Figure 36:
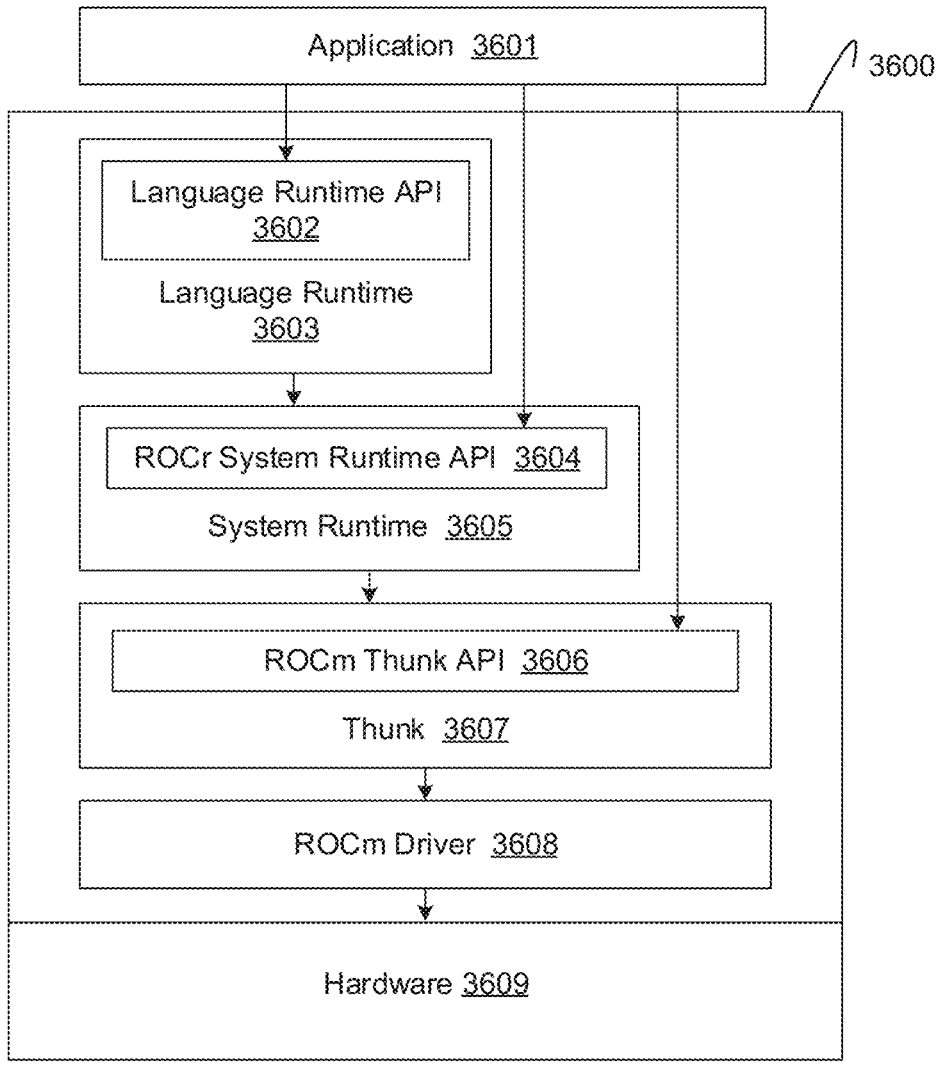
FIG. 36 illustrates a ROCm implementation of a software stack of FIG. 34, in accordance with at least one embodiment.

FIG. 36 illustrates a ROCm implementation of software stack 3400 of FIG. 34, in accordance with at least one embodiment. In at least one embodiment, a ROCm software stack 3600, on which an application 3601 may be launched, includes a language runtime 3603, a system runtime 3605, a thunk 3607, and a ROCm kernel driver 3608. In at least one embodiment, ROCm software stack 3600 executes on hardware 3609, which may include a GPU that supports ROCm and is developed by AMD Corporation of Santa Clara, CA.

In at least one embodiment, application 3601 may perform similar functionalities as application 3401 discussed above in conjunction with FIG. 34. In addition, language runtime 3603 and system runtime 3605 may perform similar functionalities as runtime 3405 discussed above in conjunction with FIG. 34, in at least one embodiment. In at least one embodiment, language runtime 3603 and system runtime 3605 differ in that system runtime 3605 is a language-independent runtime that implements a ROCr system runtime API 3604 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3605, language runtime 3603 is an implementation of a language-specific runtime API 3602 layered on top of ROCr system runtime API 3604, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3504 discussed above in conjunction with FIG. 35, such as functions for memory management, execution control, device management, error handling, and synchronization, among other things.

In at least one embodiment, thunk (ROCt) 3607 is an interface 3606 that can be used to interact with underlying ROCm driver 3608. In at least one embodiment, ROCm driver 3608 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 3406 discussed above in conjunction with FIG. 34. In at least one embodiment, HSA kernel driver is a driver permitting different types of processors to share system resources more effectively via hardware features.

In at least one embodiment, various libraries (not shown) may be included in ROCm software stack 3600 above language runtime 3603 and provide functionality similarity to CUDA libraries 3503, discussed above in conjunction with FIG. 35. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 37:
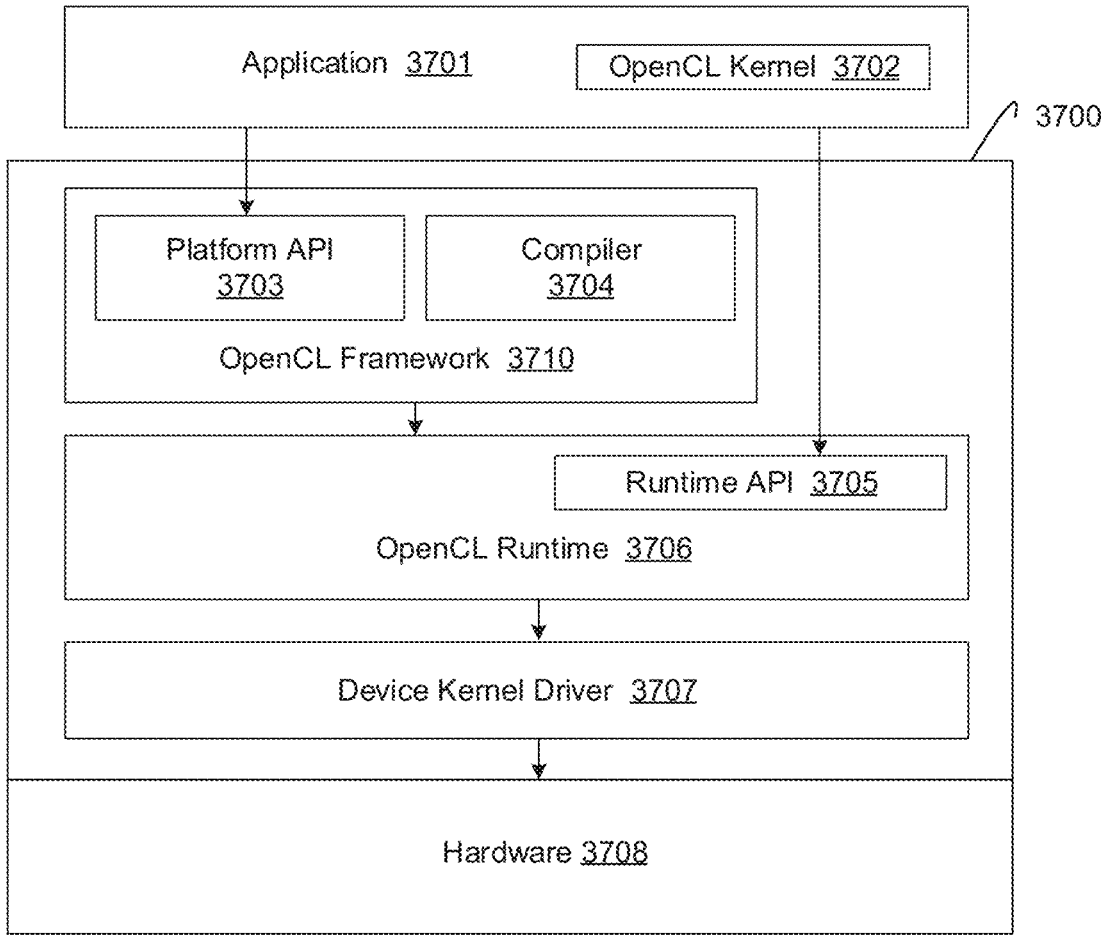
FIG. 37 illustrates an OpenCL implementation of a software stack of FIG. 34, in accordance with at least one embodiment.

FIG. 37 illustrates an OpenCL implementation of software stack 3400 of FIG. 34, in accordance with at least one embodiment. In at least one embodiment, an OpenCL software stack 3700, on which an application 3701 may be launched, includes an OpenCL framework 3710, an OpenCL runtime 3706, and a driver 3707. In at least one embodiment, OpenCL software stack 3700 executes on hardware 3509 that is not vendor-specific. As OpenCL is supported by devices developed by different vendors, specific OpenCL drivers may be required to interoperate with hardware from such vendors, in at least one embodiment.

In at least one embodiment, application 3701, OpenCL runtime 3706, device kernel driver 3707, and hardware 3708 may perform similar functionalities as application 3401, runtime 3405, device kernel driver 3406, and hardware 3407, respectively, that are discussed above in conjunction with FIG. 34. In at least one embodiment, application 3701 further includes an OpenCL kernel 3702 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3703 and runtime API 3705. In at least one embodiment, runtime API 3705 uses contexts to manage execution of kernels on devices. In at least one embodiment, each identified device may be associated with a respective context, which runtime API 3705 may use to manage command queues, program objects, and kernel objects, share memory objects, among other things, for that device. In at least one embodiment, platform API 3703 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3704 is also included in OpenCL frame-work 3710. Source code may be compiled offline prior to executing an application or online during execution of an application, in at least one embodiment. In contrast to CUDA and ROCm, OpenCL applications in at least one embodiment may be compiled online by compiler 3704, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

Figure 38:
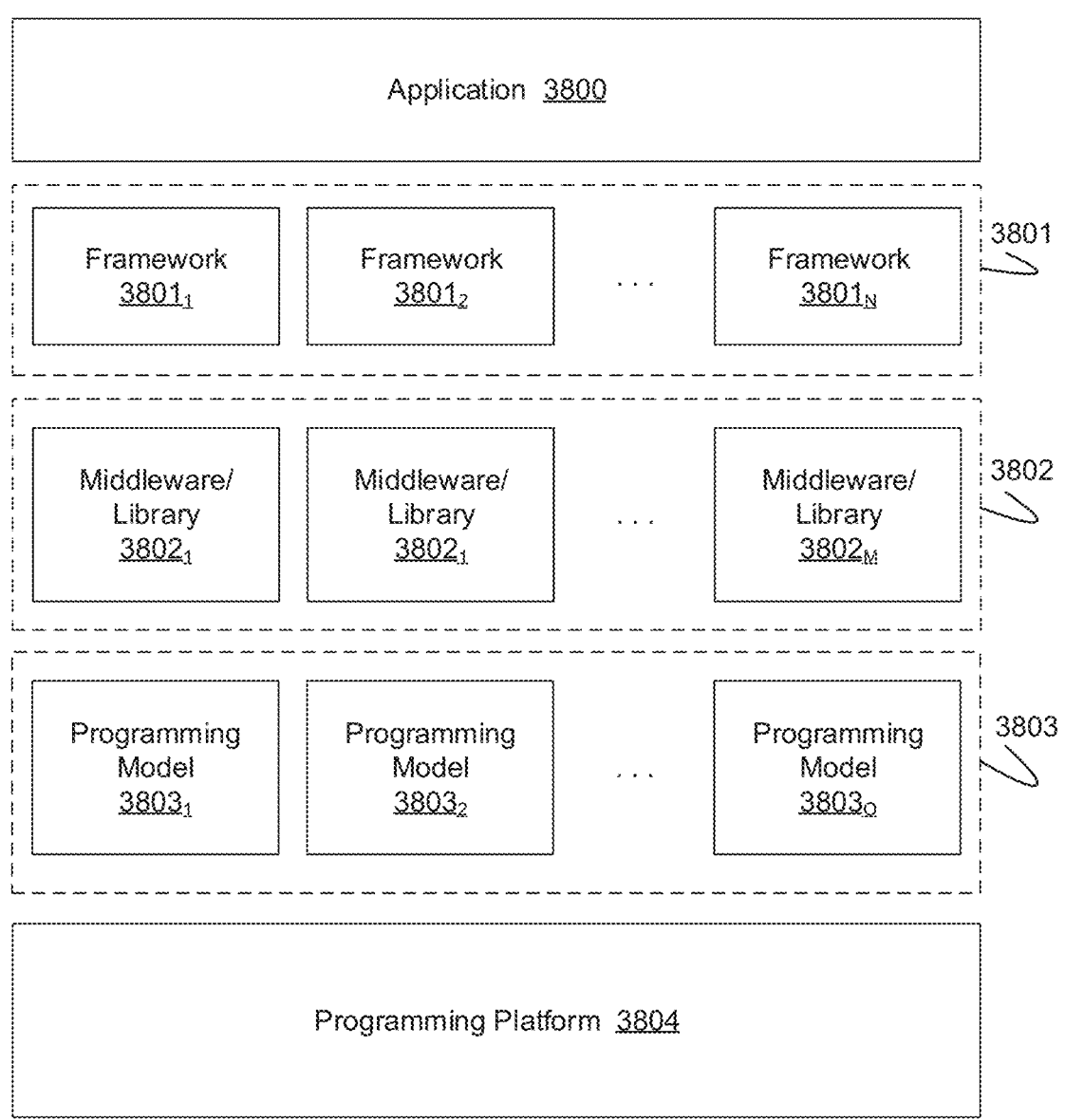
FIG. 38 illustrates software that is supported by a programming platform, in accordance with at least one embodiment.

FIG. 38 illustrates software that is supported by a pro-gramming platform, in accordance with at least one embodi-ment. In at least one embodiment, a programming platform 3804 is configured to support various programming models 3803, middlewares and/or libraries 3802, and frameworks 3801 that an application 3800 may rely upon. In at least one embodiment, application 3800 may be an AI/ML application implemented using, for example, a deep learning framework such as MXNet, PyTorch, or TensorFlow, which may rely on libraries such as cuDNN, NVIDIA Collective Communica-tions Library ("NCCL"), and/or NVIDA Developer Data Loading Library ("DALI") CUDA libraries to provide accel-erated computing on underlying hardware.

In at least one embodiment, programming platform 3804 may be one of a CUDA, ROCm, or OpenCL platform described above in conjunction with FIG. 35, FIG. 36, and FIG. 37, respectively. In at least one embodiment, program-ming platform 3804 supports multiple programming models 3803, which are abstractions of an underlying computing system permitting expressions of algorithms and data struc-tures. Programming models 3803 may expose features of underlying hardware in order to improve performance, in at least one embodiment. In at least one embodiment, program-ming models 3803 may include, but are not limited to, CUDA, HIP, OpenCL, C++ Accelerated Massive Parallel-ism ("C++ AMP"), Open Multi-Processing ("OpenMP"), Open Accelerators ("OpenACC"), and/or Vulcan Compute.

In at least one embodiment, libraries and/or middlewares 3802 provide implementations of abstractions of program-ming models 3804. In at least one embodiment, such librar-ies include data and programming code that may be used by computer programs and leveraged during software develop-ment. In at least one embodiment, such middlewares include software that provides services to applications beyond those available from programming platform 3804. In at least one embodiment, libraries and/or middlewares 3802 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3802 may include NCCL and ROCm Communication Collectives Library ("RCCL") libraries providing communication rou-tines for GPUs, a MIOpen library for deep learning accel-eration, and/or an Eigen library for linear algebra, matrix and vector operations, geometrical transformations, numeri-cal solvers, and related algorithms.

In at least one embodiment, application frameworks 3801 depend on libraries and/or middlewares 3802. In at least one embodiment, each of application frameworks 3801 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 39:
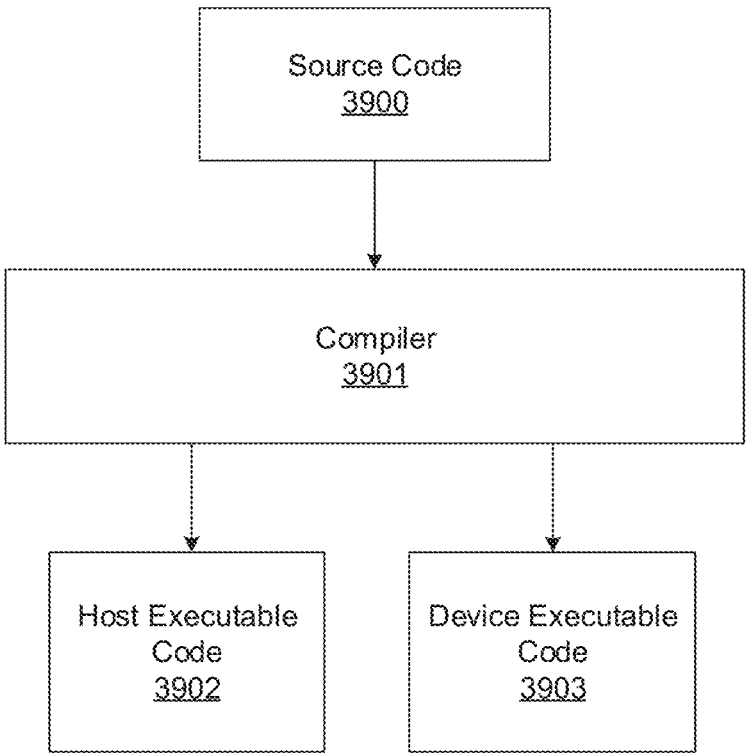
FIG. 39 illustrates compiling code to execute on programming platforms of FIGS. 34-37, in accordance with at least one embodiment.

FIG. 39 illustrates compiling code to execute on one of programming platforms of FIGS. 34-37, in accordance with at least one embodiment. In at least one embodiment, a compiler 3901 receives source code 3900 that includes both host code as well as device code. In at least one embodiment, complier 3901 is configured to convert source code 3900 into host executable code 3902 for execution on a host and device executable code 3903 for execution on a device. In at least one embodiment, source code 3900 may either be compiled offline prior to execution of an application, or online during execution of an application.

In at least one embodiment, source code 3900 may include code in any programming language supported by compiler 3901, such as C++, C, Fortran, etc. In at least one embodiment, source code 3900 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 3900 may include multiple source code files, rather than a single-source file, into which host code and device code are separated.

In at least one embodiment, compiler 3901 is configured to compile source code 3900 into host executable code 3902 for execution on a host and device executable code 3903 for execution on a device. In at least one embodiment, compiler 3901 performs operations including parsing source code 3900 into an abstract system tree (AST), performing opti-mizations, and generating executable code. In at least one embodiment in which source code 3900 includes a single-source file, compiler 3901 may separate device code from host code in such a single-source file, compile device code and host code into device executable code 3903 and host executable code 3902, respectively, and link device execut-able code 3903 and host executable code 3902 together in a single file, as discussed in greater detail below with respect to FIG. 40.

In at least one embodiment, host executable code 3902 and device executable code 3903 may be in any suitable format, such as binary code and/or IR code. In the case of CUDA, host executable code 3902 may include native object code and device executable code 3903 may include code in PTX intermediate representation, in at least one embodiment. In the case of ROCm, both host executable code 3902 and device executable code 3903 may include target binary code, in at least one embodiment.

Figure 40:
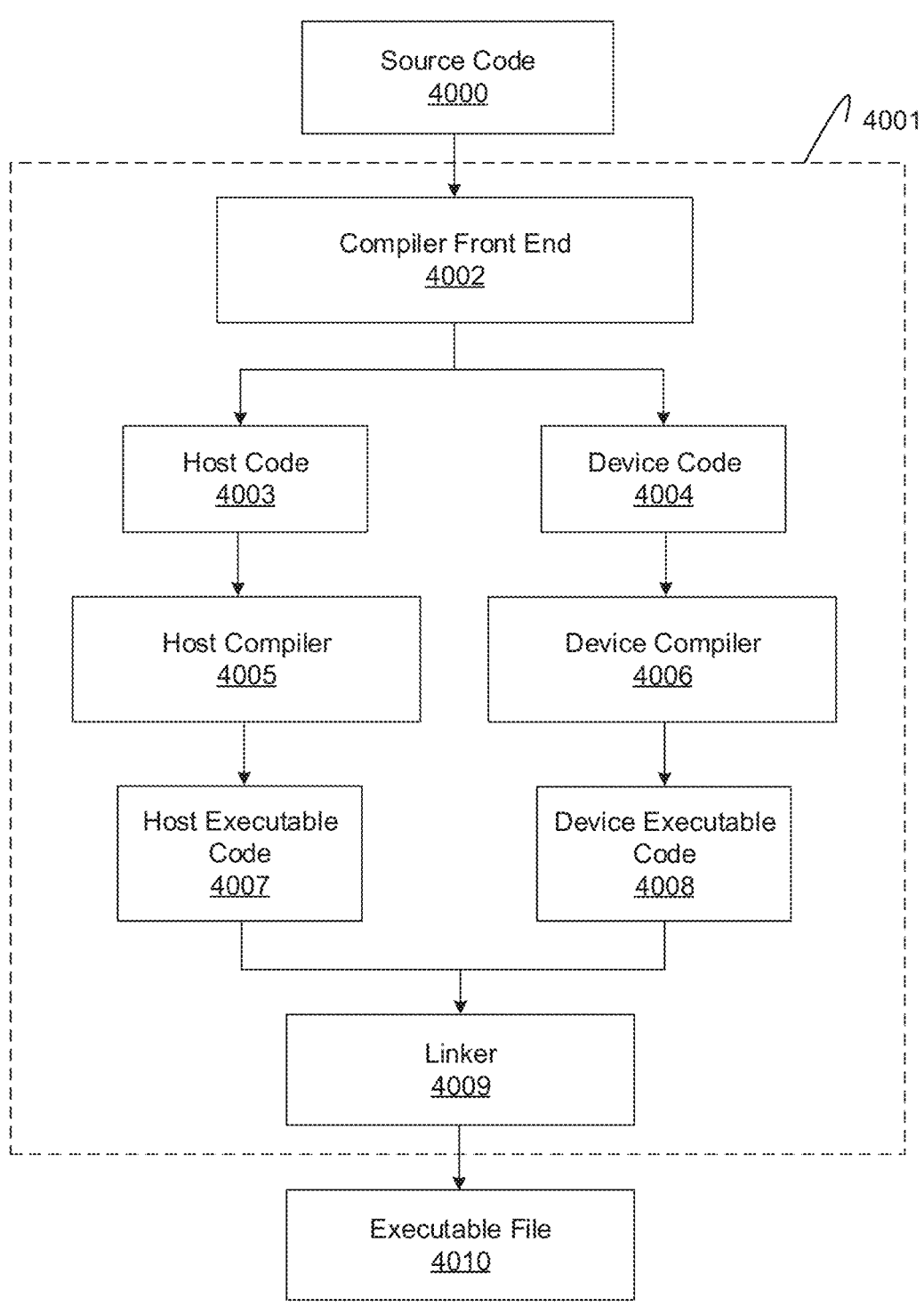
FIG. 40 illustrates in greater detail compiling code to execute on programming platforms of FIGS. 34-37, in accordance with at least one embodiment.

FIG. 40 is a more detailed illustration of compiling code to execute on one of programming platforms of FIGS. 34-37, in accordance with at least one embodiment. In at least one embodiment, a compiler 4001 is configured to receive source code 4000, compile source code 4000, and output an executable file 4010. In at least one embodiment, source code 4000 is a single-source file, such as a .cu file, a .hip.cpp file, or a file in another format, that includes both host and device code. In at least one embodiment, compiler 4001 may be, but is not limited to, an NVIDIA CUDA compiler ("NVCC") for compiling CUDA code in .cu files, or a HCC compiler for compiling HIP code in .hip.cpp files.

In at least one embodiment, compiler 4001 includes a compiler front end 4002, a host compiler 4005, a device compiler 4006, and a linker 4009. In at least one embodiment, compiler front end 4002 is configured to separate device code 4004 from host code 4003 in source code 4000. Device code 4004 is compiled by device compiler 4006 into device executable code 4008, which as described may include binary code or IR code, in at least one embodiment. Separately, host code 4003 is compiled by host compiler 4005 into host executable code 4007, in at least one embodiment. For NVCC, host compiler 4005 may be, but is not limited to, a general purpose C/C++ compiler that outputs native object code, while device compiler 4006 may be, but is not limited to, a Low Level Virtual Machine ("LLVM")-based compiler that forks a LLVM compiler infrastructure and outputs PTX code or binary code, in at least one embodiment. For HCC, both host compiler 4005 and device compiler 4006 may be, but are not limited to, LLVM-based compilers that output target binary code, in at least one embodiment.

Subsequent to compiling source code 4000 into host executable code 4007 and device executable code 4008, linker 4009 links host and device executable code 4007 and 4008 together in executable file 4010, in at least one embodiment. In at least one embodiment, native object code for a host and PTX or binary code for a device may be linked together in an Executable and Linkable Format ("ELF") file, which is a container format used to store object code.

Figure 41:
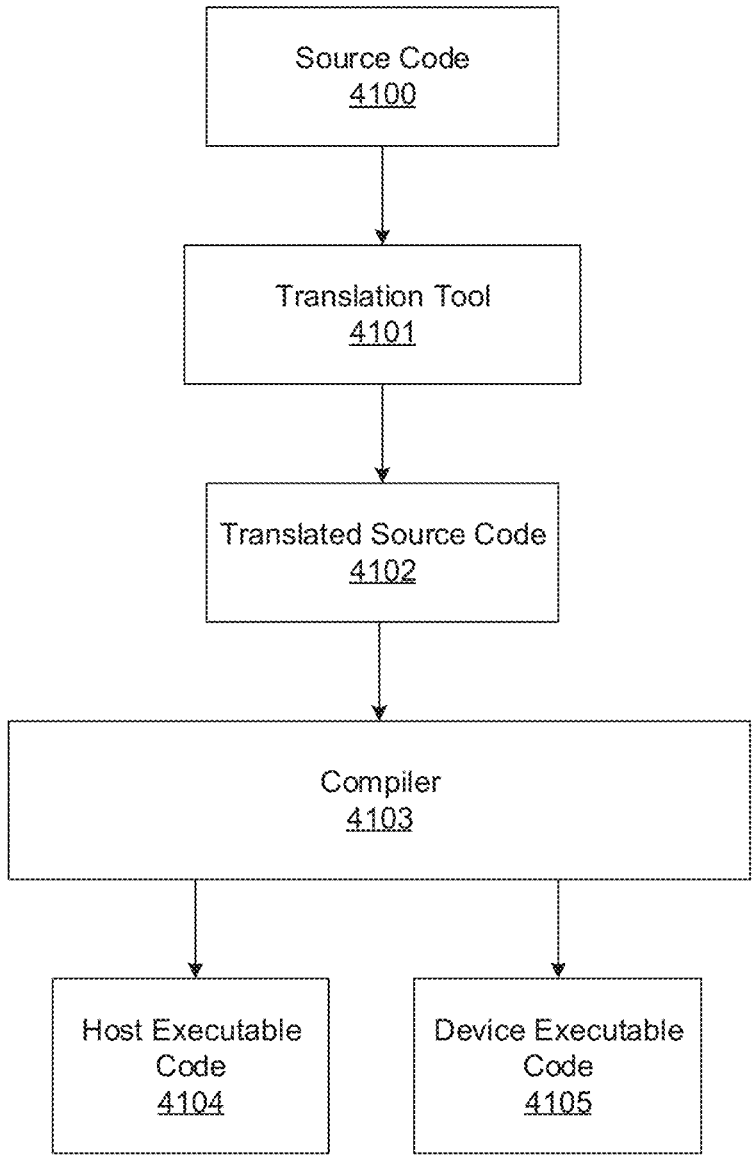
FIG. 41 illustrates translating source code prior to compiling source code, in accordance with at least one embodiment.

FIG. 41 illustrates translating source code prior to compiling source code, in accordance with at least one embodiment. In at least one embodiment, source code 4100 is passed through a translation tool 4101, which translates source code 4100 into translated source code 4102. In at least one embodiment, a compiler 4103 is used to compile translated source code 4102 into host executable code 4104 and device executable code 4105 in a process that is similar to compilation of source code 3900 by compiler 3901 into host executable code 3902 and device executable 3903, as discussed above in conjunction with FIG. 39.

In at least one embodiment, a translation performed by translation tool 4101 is used to port source 4100 for execution in a different environment than that in which it was originally intended to run. In at least one embodiment, translation tool 4101 may include, but is not limited to, a HIP translator that is used to "hipify" CUDA code intended for a CUDA platform into HIP code that can be compiled and executed on a ROCm platform. In at least one embodiment, translation of source code 4100 may include parsing source code 4100 and converting calls to API(s) provided by one programming model (e, CUDA) into corresponding calls to API(s) provided by another programming model (e.g., HIP), as discussed in greater detail below in conjunc-tion with FIGS. 42A-43. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 4101 may sometimes be incomplete, requiring additional, manual effort to fully port source code 4100.

Configuring GPUs for General-Purpose Computing

The following figures set forth, without limitation, exemplary architectures for compiling and executing compute source code, in accordance with at least one embodiment. In at least one embodiment, one or more architectures of following figures can implement one or more aspects of an embodiment described with respect to one or more of FIGS. 1-14, and/or one or more techniques described with respect to FIGS. 8-11.

Figure 42A:
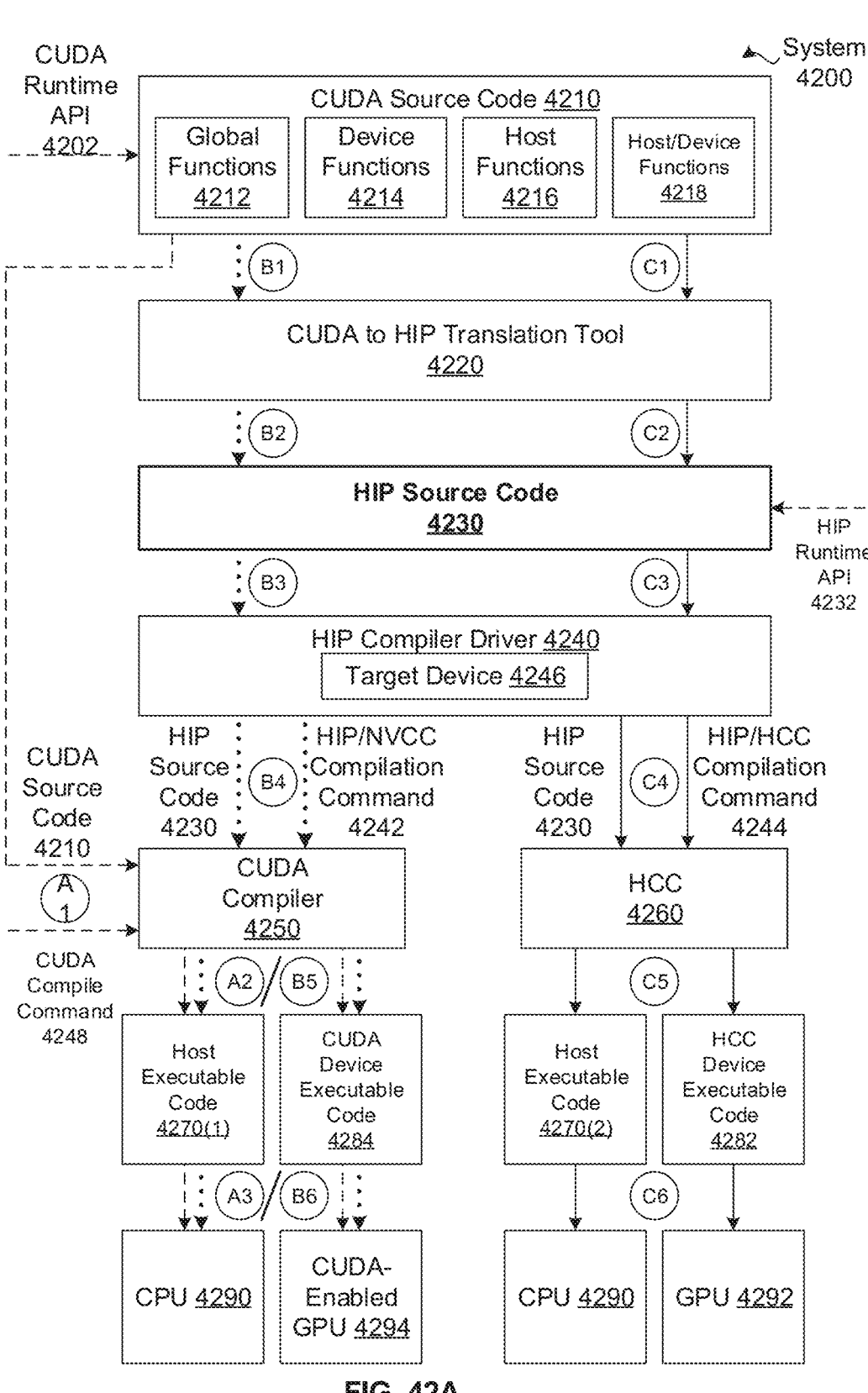
FIG. 42A illustrates a system configured to compile and execute CUDA source code using different types of processing units, in accordance with at least one embodiment.

FIG. 42A illustrates a system 4200 configured to compile and execute CUDA source code 4210 using different types of processing units, in accordance with at least one embodiment. In at least one embodiment, system 4200 includes, without limitation, CUDA source code 4210, a CUDA compiler 4250, host executable code 4270(1), host executable code 4270(2), CUDA device executable code 4284, a CPU 4290, a CUDA-enabled GPU 4294, a GPU 4292, a CUDA to HIP translation tool 4220, HIP source code 4230, a HIP compiler driver 4240, an HCC 4260, and HCC device executable code 4282.

In at least one embodiment, CUDA source code 4210 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 4290, GPU 42192, or another GPGPU, etc. In at least one embodiment, host code is source code that, after compilation, is executable on a host. In at least one embodiment, a host is a processor that is optimized for sequential instruction processing, such as CPU 4290.

In at least one embodiment, CUDA source code 4210 includes, without limitation, any number (including zero) of global functions 4212, any number (including zero) of device functions 4214, any number (including zero) of host functions 4216, and any number (including zero) of host/device functions 4218. In at least one embodiment, global functions 4212, device functions 4214, host functions 4216, and host/device functions 4218 may be mixed in CUDA source code 4210. In at least one embodiment, each of global functions 4212 is executable on a device and callable from a host. In at least one embodiment, one or more of global functions 4212 may therefore act as entry points to a device. In at least one embodiment, each of global functions 4212 is a kernel. In at least one embodiment and in a technique known as dynamic parallelism, one or more of global functions 4212 defines a kernel that is executable on a device and callable from such a device. In at least one embodiment, a kernel is executed N (where N is any positive integer) times in parallel by N different threads on a device during execution.

In at least one embodiment, each of device functions 4214 is executed on a device and callable from such a device only. In at least one embodiment, each of host functions 4216 is executed on a host and callable from such a host only. In at least one embodiment, each of host/device functions 4216 defines both a host version of a function that is executable on a host and callable from such a host only and a device version of the function that is executable on a device and callable from such a device only.

In at least one embodiment, CUDA source code 4210 may also include, without limitation, any number of calls to any number of functions that are defined via a CUDA runtime API 4202. In at least one embodiment, CUDA runtime API 4202 may include, without limitation, any number of functions that execute on a host to allocate and deallocate device memory, transfer data between host memory and device memory, manage systems with multiple devices, etc. In at least one embodiment, CUDA source code 4210 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 4202, a CUDA driver API, APIs for any number of CUDA libraries, etc. In at least one embodiment and relative to CUDA runtime API 4202, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 4250 compiles input CUDA code (e.g., CUDA source code 4210) to generate host executable code 4270(1) and CUDA device executable code 4284. In at least one embodiment, CUDA compiler 4250 is NVCC. In at least one embodiment, host executable code 4270(1) is a compiled version of host code included in input source code that is executable on CPU 4290. In at least one embodiment, CPU 4290 may be any processor that is optimized for sequential instruction processing.

In at least one embodiment, CUDA device executable code 4284 is a compiled version of device code included in input source code that is executable on CUDA-enabled GPU 4294. In at least one embodiment, CUDA device executable code 4284 includes, without limitation, binary code. In at least one embodiment, CUDA device executable code 4284 includes, without limitation, IR code, such as PTX code, that is further compiled at runtime into binary code for a specific target device (e.g., CUDA-enabled GPU 4294) by a device driver. In at least one embodiment, CUDA-enabled GPU 4294 may be any processor that is optimized for parallel instruction processing and that supports CUDA. In at least one embodiment, CUDA-enabled GPU 4294 is developed by NVIDIA Corporation of Santa Clara, CA.

In at least one embodiment, CUDA to HIP translation tool 4220 is configured to translate CUDA source code 4210 to functionally similar HIP source code 4230. In a least one embodiment, HIP source code 4230 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 4212, but such a HIP programming language may lack support for dynamic parallelism and therefore global functions 4212 defined in HIP code may be callable from a host only.

In at least one embodiment, HIP source code 4230 includes, without limitation, any number (including zero) of global functions 4212, any number (including zero) of device functions 4214, any number (including zero) of host functions 4216, and any number (including zero) of host/device functions 4218. In at least one embodiment, HIP source code 4230 may also include any number of calls to any number of functions that are specified in a HIP runtime API 4232. In at least one embodiment, HIP runtime API 4232 includes, without limitation, functionally similar versions of a subset of functions included in CUDA runtime API 4202. In at least one embodiment, HIP source code 4230 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 4232, a HIP driver API, APIs for any number of HIP libraries, APIs for any number of ROCm libraries, etc.

In at least one embodiment, CUDA to HIP translation tool 4220 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 4220 converts any number of calls to functions specified in CUDA runtime API 4202 to any number of calls to functions specified in HIP runtime API 4232.

In at least one embodiment, CUDA to HIP translation tool 4220 is a tool known as hipify-perl that executes a text-based translation process. In at least one embodiment, CUDA to HIP translation tool 4220 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 4220.

In at least one embodiment, HIP compiler driver 4240 is a front end that determines a target device 4246 and then configures a compiler that is compatible with target device 4246 to compile HIP source code 4230. In at least one embodiment, target device 4246 is a processor that is optimized for parallel instruction processing. In at least one embodiment, HIP compiler driver 4240 may determine target device 4246 in any technically feasible fashion.

In at least one embodiment, if target device 4246 is compatible with CUDA (e.g., CUDA-enabled GPU 4294), then HIP compiler driver 4240 generates a HIP/NVCC compilation command 4242. In at least one embodiment and as described in greater detail in conjunction with FIG. 42B, HIP/NVCC compilation command 4242 configures CUDA compiler 4250 to compile HIP source code 4230 using, without limitation, a HIP to CUDA translation header and a CUDA runtime library. In at least one embodiment and in response to HIP/NVCC compilation command 4242, CUDA compiler 4250 generates host executable code 4270(1) and CUDA device executable code 4284.

In at least one embodiment, if target device 4246 is not compatible with CUDA, then HIP compiler driver 4240 generates a HIP/HCC compilation command 4244. In at least one embodiment and as described in greater detail in conjunction with FIG. 42C, HIP/HCC compilation command 4244 configures HCC 4260 to compile HIP source code 4230 using, without limitation, an HCC header and a HIP/HCC runtime library. In at least one embodiment and in response to HIP/HCC compilation command 4244, HCC 4260 generates host executable code 4270(2) and HCC device executable code 4282. In at least one embodiment, HCC device executable code 4282 is a compiled version of device code included in HIP source code 4230 that is executable on GPU 4292. In at least one embodiment, GPU 4292 may be any processor that is optimized for parallel instruction processing, is not compatible with CUDA, and is compatible with HCC. In at least one embodiment, GPU 4292 is developed by AMD Corporation of Santa Clara, CA. In at least one embodiment GPU, 4292 is a non-CUDA-enabled GPU 4292.

For explanatory purposes only, three different flows that may be implemented in at least one embodiment to compile CUDA source code 4210 for execution on CPU 4290 and different devices are depicted in FIG. 42A. In at least one embodiment, a direct CUDA flow compiles CUDA source code 4210 for execution on CPU 4290 and CUDA-enabled GPU 4294 without translating CUDA source code 4210 to HIP source code 4230. In at least one embodiment, an indirect CUDA flow translates CUDA source code 4210 to HIP source code 4230 and then compiles HIP source code 4230 for execution on CPU 4290 and CUDA-enabled GPU 4294. In at least one embodiment, a CUDA/HCC flow translates CUDA source code 4210 to HIP source code 4230 and then compiles HIP source code 4230 for execution on CPU 4290 and GPU 4292.

A direct CUDA flow that may be implemented in at least one embodiment is depicted via dashed lines and a series of bubbles annotated A1-A3. In at least one embodiment and as depicted with bubble annotated A1, CUDA compiler 4250 receives CUDA source code 4210 and a CUDA compile command 4248 that configures CUDA compiler 4250 to compile CUDA source code 4210. In at least one embodiment, CUDA source code 4210 used in a direct CUDA flow is written in a CUDA programming language that is based on a programming language other than C++ (e.g., C, Fortran, Python, Java, etc.). In at least one embodiment and in response to CUDA compile command 4248, CUDA compiler 4250 generates host executable code 4270(1) and CUDA device executable code 4284 (depicted with bubble annotated A2). In at least one embodiment and as depicted with bubble annotated A3, host executable code 4270(1) and CUDA device executable code 4284 may be executed on, respectively, CPU 4290 and CUDA-enabled GPU 4294. In at least one embodiment, CUDA device executable code 4284 includes, without limitation, binary code. In at least one embodiment, CUDA device executable code 4284 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 4220 receives CUDA source code 4210. In at least one embodiment and as depicted with bubble annotated B2, CUDA to HIP translation tool 4220 translates CUDA source code 4210 to HIP source code 4230. In at least one embodiment and as depicted with bubble annotated B3, HIP compiler driver 4240 receives HIP source code 4230 and determines that target device 4246 is CUDA-enabled.

In at least one embodiment and as depicted with bubble annotated B4, HIP compiler driver 4240 generates HIP/NVCC compilation command 4242 and transmits both HIP/NVCC compilation command 4242 and HIP source code 4230 to CUDA compiler 4250. In at least one embodiment and as described in greater detail in conjunction with FIG. 42B, HIP/NVCC compilation command 4242 configures CUDA compiler 4250 to compile HIP source code 4230 using, without limitation, a HIP to CUDA translation header and a CUDA runtime library. In at least one embodiment and in response to HIP/NVCC compilation command 4242, CUDA compiler 4250 generates host executable code 4270(1) and CUDA device executable code 4284 (depicted with bubble annotated B5). In at least one embodiment and as depicted with bubble annotated B6, host executable code 4270(1) and CUDA device executable code 4284 may be executed on, respectively, CPU 4290 and CUDA-enabled GPU 4294. In at least one embodiment, CUDA device executable code 4284 includes, without limitation, binary code. In at least one embodiment, CUDA device executable code 4284 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 4220 receives CUDA source code 4210. In at least one embodiment and as depicted with bubble annotated C2, CUDA to HIP translation tool 4220 translates CUDA source code 4210 to HIP source code 4230. In at least one embodiment and as depicted with bubble annotated C3, HIP compiler driver 4240 receives HIP source code 4230 and determines that target device 4246 is not CUDA-enabled.

In at least one embodiment, HIP compiler driver 4240 generates HIP/HCC compilation command 4244 and transmits both HIP/HCC compilation command 4244 and HIP source code 4230 to HCC 4260 (depicted with bubble annotated C4). In at least one embodiment and as described in greater detail in conjunction with FIG. 42C, HIP/HCC compilation command 4244 configures HCC 4260 to compile HIP source code 4230 using, without limitation, an HCC header and a HIP/HCC runtime library. In at least one embodiment and in response to HIP/HCC compilation command 4244, HCC 4260 generates host executable code 4270(2) and HCC device executable code 4282 (depicted with bubble annotated C5). In at least one embodiment and as depicted with bubble annotated C6, host executable code 4270(2) and HCC device executable code 4282 may be executed on, respectively, CPU 4290 and GPU 4292.

In at least one embodiment, after CUDA source code 4210 is translated to HIP source code 4230, HIP compiler driver 4240 may subsequently be used to generate executable code for either CUDA-enabled GPU 4294 or GPU 4292 without re-executing CUDA to HIP translation tool 4220. In at least one embodiment, CUDA to HIP translation tool 4220 translates CUDA source code 4210 to HIP source code 4230 that is then stored in memory. In at least one embodiment, HIP compiler driver 4240 then configures HCC 4260 to generate host executable code 4270(2) and HCC device executable code 4282 based on HIP source code 4230. In at least one embodiment, HIP compiler driver 4240 subsequently configures CUDA compiler 4250 to generate host executable code 4270(1) and CUDA device executable code 4284 based on stored HIP source code 4230.

Figure 42B:
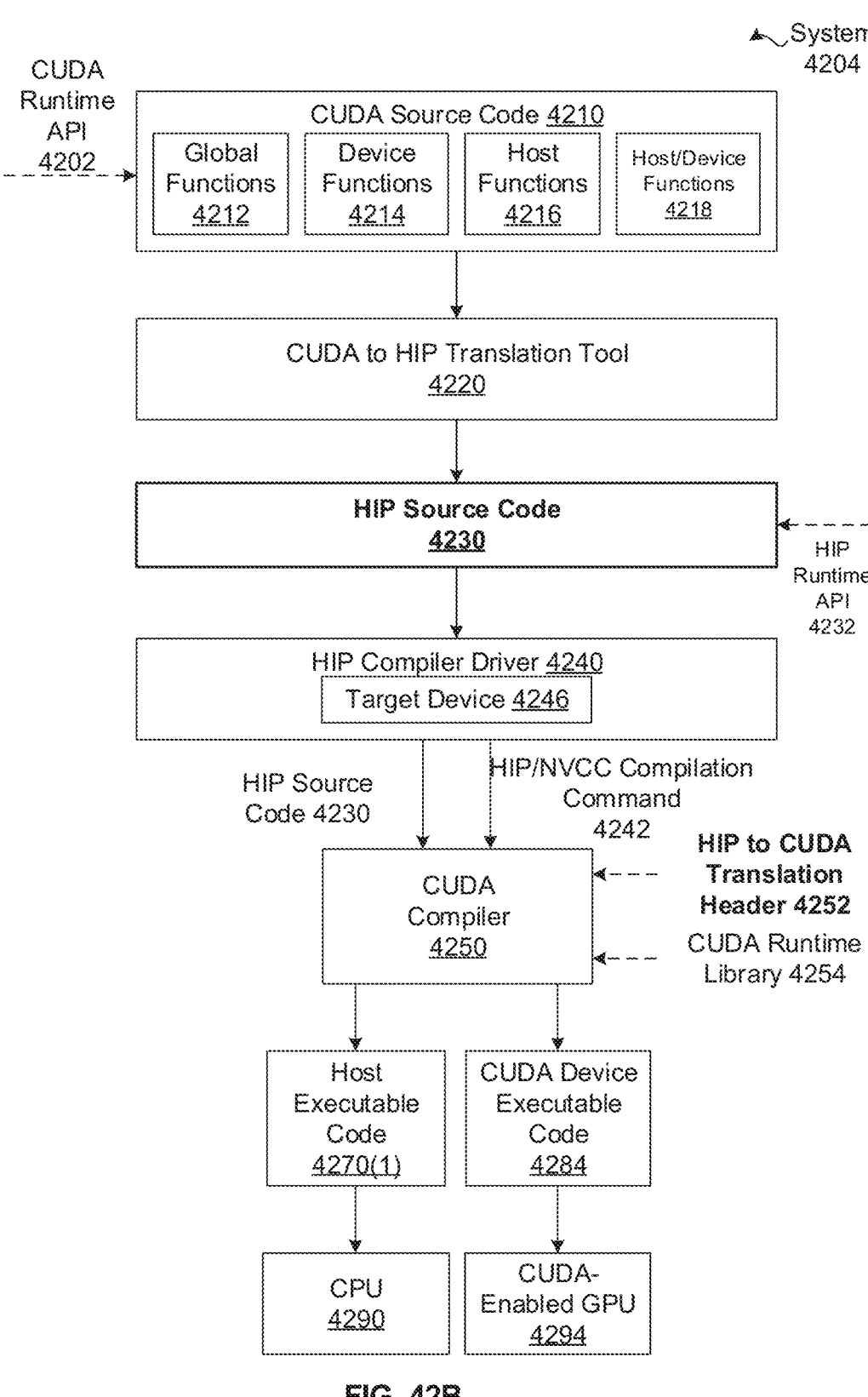
FIG. 42B illustrates a system configured to compile and execute CUDA source code of FIG. 42A using a CPU and a CUDA-enabled GPU, in accordance with at least one embodiment.

FIG. 42B illustrates a system 4204 configured to compile and execute CUDA source code 4210 of FIG. 42A using CPU 4290 and CUDA-enabled GPU 4294, in accordance with at least one embodiment. In at least one embodiment, system 4204 includes, without limitation, CUDA source code 4210, CUDA to HIP translation tool 4220, HIP source code 4230, HIP compiler driver 4240, CUDA compiler 4250, host executable code 4270(1), CUDA device execut-able code 4284, CPU 4290, and CUDA-enabled GPU 4294.

In at least one embodiment and as described previously herein in conjunction with FIG. 42A, CUDA source code 4210 includes, without limitation, any number (including zero) of global functions 4212, any number (including zero) of device functions 4214, any number (including zero) of host functions 4216, and any number (including zero) of host/device functions 4218. In at least one embodiment, CUDA source code 4210 also includes, without limitation, any number of calls to any number of functions that are specified in any number of CUDA APIs.

In at least one embodiment, CUDA to HIP translation tool 4220 translates CUDA source code 4210 to HIP source code 4230. In at least one embodiment, CUDA to HIP translation tool 4220 converts each kernel call in CUDA source code 4210 from a CUDA syntax to a HIP syntax and converts any number of other CUDA calls in CUDA source code 4210 to any number of other functionally similar HIP calls.

In at least one embodiment, HIP compiler driver 4240 determines that target device 4246 is CUDA-enabled and generates HIP/NVCC compilation command 4242. In at least one embodiment, HIP compiler driver 4240 then con-figures CUDA compiler 4250 via HIP/NVCC compilation command 4242 to compile HIP source code 4230. In at least one embodiment, HIP compiler driver 4240 provides access to a HIP to CUDA translation header 4252 as part of configuring CUDA compiler 4250. In at least one embodi-ment, HIP to CUDA translation header 4252 translates any number of mechanisms (e.g., functions) specified in any number of HIP APIs to any number of mechanisms specified in any number of CUDA APIs. In at least one embodiment, CUDA compiler 4250 uses HIP to CUDA translation header 4252 in conjunction with a CUDA runtime library 4254 corresponding to CUDA runtime API 4202 to generate host executable code 4270(1) and CUDA device executable code 4284. In at least one embodiment, host executable code 4270(1) and CUDA device executable code 4284 may then be executed on, respectively, CPU 4290 and CUDA-enabled GPU 4294. In at least one embodiment, CUDA device executable code 4284 includes, without limitation, binary code. In at least one embodiment, CUDA device executable code 4284 includes, without limitation, PTX code and is further compiled into binary code for a specific target device at runtime.

Figure 42C:
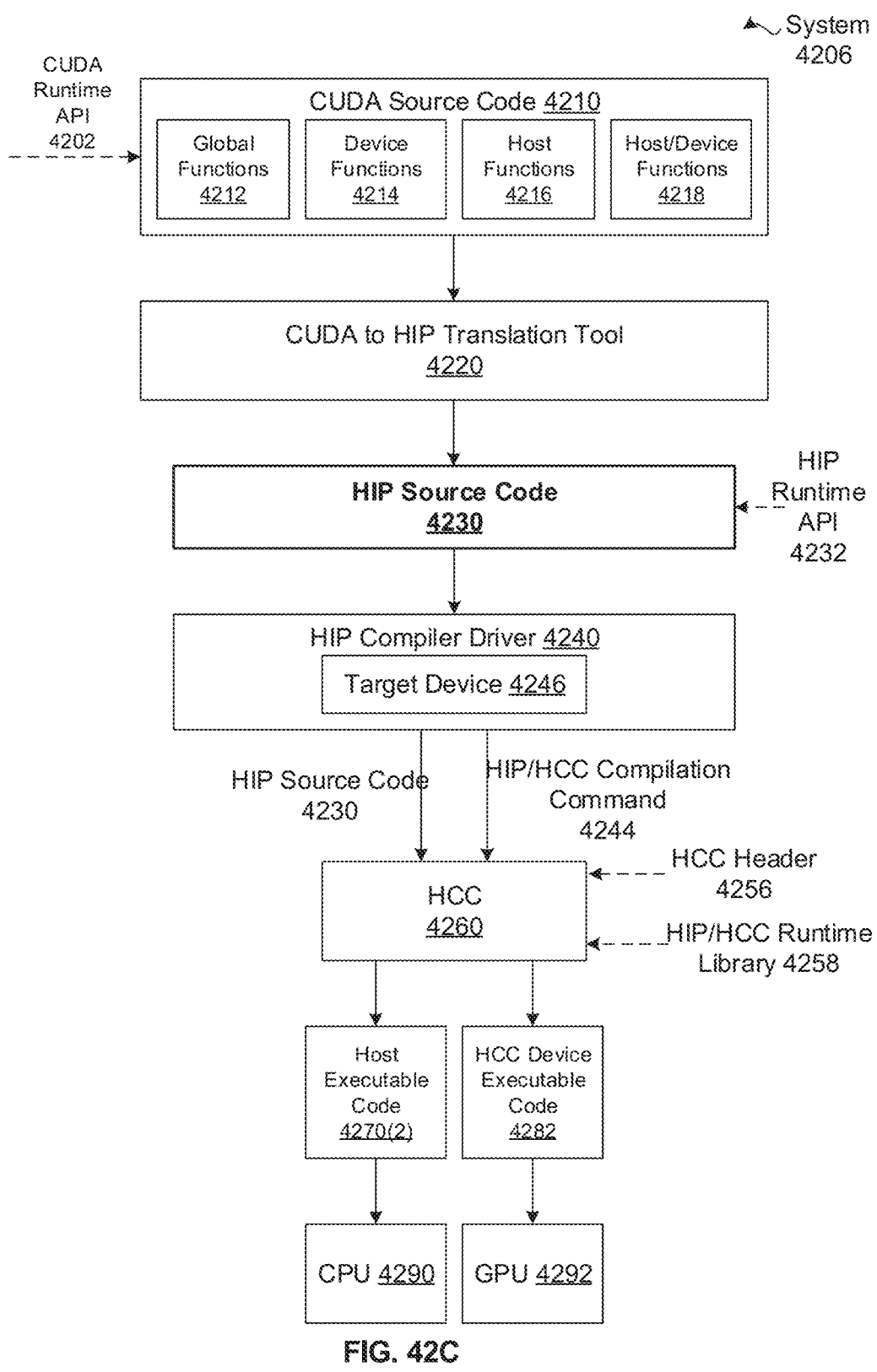
FIG. 42C illustrates a system configured to compile and execute CUDA source code of FIG. 42A using a CPU and a non-CUDA-enabled GPU, in accordance with at least one embodiment.

FIG. 42C illustrates a system 4206 configured to compile and execute CUDA source code 4210 of FIG. 42A using CPU 4290 and non-CUDA-enabled GPU 4292, in accor-dance with at least one embodiment. In at least one embodi-ment, system 4206 includes, without limitation, CUDA source code 4210, CUDA to HIP translation tool 4220, HIP source code 4230, HIP compiler driver 4240, HCC 4260, host executable code 4270(2), HCC device executable code 4282, CPU 4290, and GPU 4292.

In at least one embodiment and as described previously herein in conjunction with FIG. 42A, CUDA source code 4210 includes, without limitation, any number (including zero) of global functions 4212, any number (including zero)

of device functions 4214, any number (including zero) of host functions 4216, and any number (including zero) of host/device functions 4218. In at least one embodiment, CUDA source code 4210 also includes, without limitation, any number of calls to any number of functions that are specified in any number of CUDA APIs.

In at least one embodiment, CUDA to HIP translation tool 4220 translates CUDA source code 4210 to HIP source code 4230. In at least one embodiment, CUDA to HIP translation tool 4220 converts each kernel call in CUDA source code 4210 from a CUDA syntax to a HIP syntax and converts any number of other CUDA calls in source code 4210 to any number of other functionally similar HIP calls.

In at least one embodiment, HIP compiler driver 4240 subsequently determines that target device 4246 is not CUDA-enabled and generates HIP/HCC compilation com-mand 4244. In at least one embodiment, HIP compiler driver 4240 then configures HCC 4260 to execute HIP/HCC com-pilation command 4244 to compile HIP source code 4230. In at least one embodiment, HIP/HCC compilation command 4244 configures HCC 4260 to use, without limitation, a HIP/HCC runtime library 4258 and an HCC header 4256 to generate host executable code 4270(2) and HCC device executable code 4282. In at least one embodiment, HIP/HCC runtime library 4258 corresponds to HIP runtime API 4232. In at least one embodiment, HCC header 4256 includes, without limitation, any number and type of interoperability mechanisms for HIP and HCC. In at least one embodiment, host executable code 4270(2) and HCC device executable code 4282 may be executed on, respec-tively, CPU 4290 and GPU 4292.

FIG. 43 illustrates an exemplary kernel translated by CUDA-to-HIP translation tool 4220 of FIG. 42C, in accor-dance with at least one embodiment. In at least one embodi-ment, CUDA source code 4210 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 4210 organizes thread blocks associated with a given kernel into a one-dimensional, a two-dimensional, or a three-dimen-sional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 4310. In at least one embodiment, CUDA kernel launch syntax 4310 is specified as "KernelName<<<GridSize, BlockSize, SharedMemorySize, Stream>>>(KernelArgu-ments);". In at least one embodiment, an execution configu-ration syntax is a "<<< . . . >>>" construct that is inserted between a kernel name ("KernelName") and a parenthesized list of kernel arguments ("KernelArguments"). In at least one embodiment, CUDA kernel launch syntax 4310 includes, without limitation, a CUDA launch function syn-tax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e, "threadIdx").

In at least one embodiment and with respect to CUDA kernel launch syntax 4310, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 4310, SharedMemorySize defaults to zero. In at least one embodiment and with respect to CUDA kernel launch syntax 4310, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 4210 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 4310, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 4210 to HIP source code 4230, CUDA to HIP translation tool 4220 translates each kernel call in CUDA source code 4210 from CUDA kernel launch syntax 4310 to a HIP kernel launch syntax 4320 and converts any number of other CUDA calls in source code 4210 to any number of other functionally similar HIP calls. In at least one embodiment, HIP kernel launch syntax 4320 is specified as "hip-LaunchKernelGGL(KernelName,GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 4320 as in CUDA kernel launch syntax 4310 (described previously herein). In at least one embodiment, arguments SharedMemorySize and Stream are required in HIP kernel launch syntax 4320 and are optional in CUDA kernel launch syntax 4310.

In at least one embodiment, a portion of HIP source code 4230 depicted in FIG. 43 is identical to a portion of CUDA source code 4210 depicted in FIG. 43 except for a kernel call that causes kernel MatAdd to execute on a device. In at least one embodiment, kernel MatAdd is defined in HIP source code 4230 with the same "__global_" declaration specifier with which kernel MatAdd is defined in CUDA source code 4210. In at least one embodiment, a kernel call in HIP source code 4230 is "hipLaunchKernelGGL(MatAdd, numBlocks, threadsPerBlock, 0, 0, A, B, C);", while a corresponding kernel call in CUDA source code 4210 is "MatAdd<<<numBlocks, threadsPerBlock>>>(A, B, C);".

Figure 44:
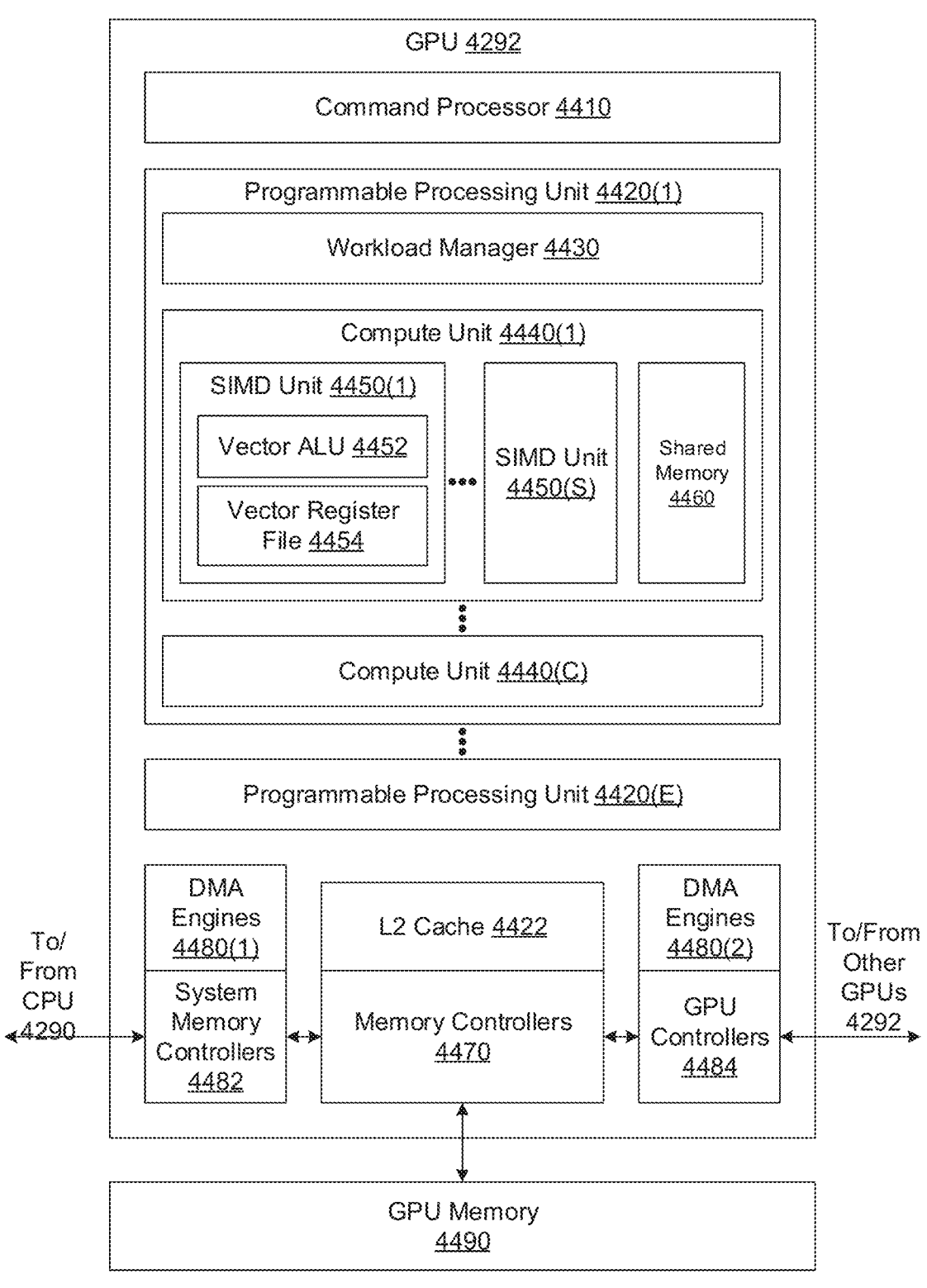
FIG. 44 illustrates non-CUDA-enabled GPU of FIG. 42C in greater detail, in accordance with at least one embodiment.

FIG. 44 illustrates non-CUDA-enabled GPU 4292 of FIG. 42C in greater detail, in accordance with at least one embodiment. In at least one embodiment, GPU 4292 is developed by AMD corporation of Santa Clara. In at least one embodiment, GPU 4292 can be configured to perform compute operations in a highly-parallel fashion. In at least one embodiment, GPU 4292 is configured to execute graphics pipeline operations such as draw commands, pixel operations, geometric computations, and other operations associated with rendering an image to a display. In at least one embodiment, GPU 4292 is configured to execute operations unrelated to graphics. In at least one embodiment, GPU 4292 is configured to execute both operations related to graphics and operations unrelated to graphics. In at least one embodiment, GPU 4292 can be configured to execute device code included in HIP source code 4230.

In at least one embodiment, GPU 4292 includes, without limitation, any number of programmable processing units 4420, a command processor 4410, an L2 cache 4422, memory controllers 4470, DMA engines 4480(1), system memory controllers 4482, DMA engines 4480(2), and GPU controllers 4484. In at least one embodiment, each programmable processing unit 4420 includes, without limitation, a workload manager 4430 and any number of compute units 4440. In at least one embodiment, command processor 4410 reads commands from one or more command queues (not shown) and distributes commands to workload managers 4430. In at least one embodiment, for each programmable processing unit 4420, associated workload manager 4430 distributes work to compute units 4440 included in programmable processing unit 4420. In at least one embodiment, each compute unit 4440 may execute any number of thread blocks, but each thread block executes on a single compute unit 4440. In at least one embodiment, a workgroup is a thread block.

In at least one embodiment, each compute unit 4440 includes, without limitation, any number of SIMD units 4450 and a shared memory 4460. In at least one embodiment, each SIMD unit 4450 implements a SIMD architecture and is configured to perform operations in parallel. In at least one embodiment, each SIMD unit 4450 includes, without limitation, a vector ALU 4452 and a vector register file 4454. In at least one embodiment, each SIMD unit 4450 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4460.

In at least one embodiment, programmable processing units 4420 are referred to as "shader engines." In at least one embodiment, each programmable processing unit 4420 includes, without limitation, any amount of dedicated graphics hardware in addition to compute units 4440. In at least one embodiment, each programmable processing unit 4420 includes, without limitation, any number (including zero) of geometry processors, any number (including zero) of rasterizers, any number (including zero) of render back ends, workload manager 4430, and any number of compute units 4440.

In at least one embodiment, compute units 4440 share L2 cache 4422. In at least one embodiment, L2 cache 4422 is partitioned. In at least one embodiment, a GPU memory 4490 is accessible by all compute units 4440 in GPU 4292. In at least one embodiment, memory controllers 4470 and system memory controllers 4482 facilitate data transfers between GPU 4292 and a host, and DMA engines 4480(1) enable asynchronous memory transfers between GPU 4292 and such a host. In at least one embodiment, memory controllers 4470 and GPU controllers 4484 facilitate data transfers between GPU 4292 and other GPUs 4292, and DMA engines 4480(2) enable asynchronous memory transfers between GPU 4292 and other GPUs 4292.

In at least one embodiment, GPU 4292 includes, without limitation, any amount and type of system interconnect that facilitates data and control transmissions across any number and type of directly or indirectly linked components that may be internal or external to GPU 4292. In at least one embodiment, GPU 4292 includes, without limitation, any number and type of I/O interfaces (PCIe) that are coupled to any number and type of peripheral devices. In at least one embodiment, GPU 4292 may include, without limitation, any number (including zero) of display engines and any number (including zero) of multimedia engines. In at least one embodiment, GPU 4292 implements a memory subsystem that includes, without limitation, any amount and type of memory controllers (e.g., memory controllers 4470 and system memory controllers 4482) and memory devices (e.g., shared memories 4460) that may be dedicated to one component or shared among multiple components. In at least one embodiment, GPU 4292 implements a cache subsystem that includes, without limitation, one or more cache memories (L2 cache 4422) that may each be private to or shared between any number of components (SIMD units 4450, compute units 4440, and programmable processing units 4420).

Figure 45:
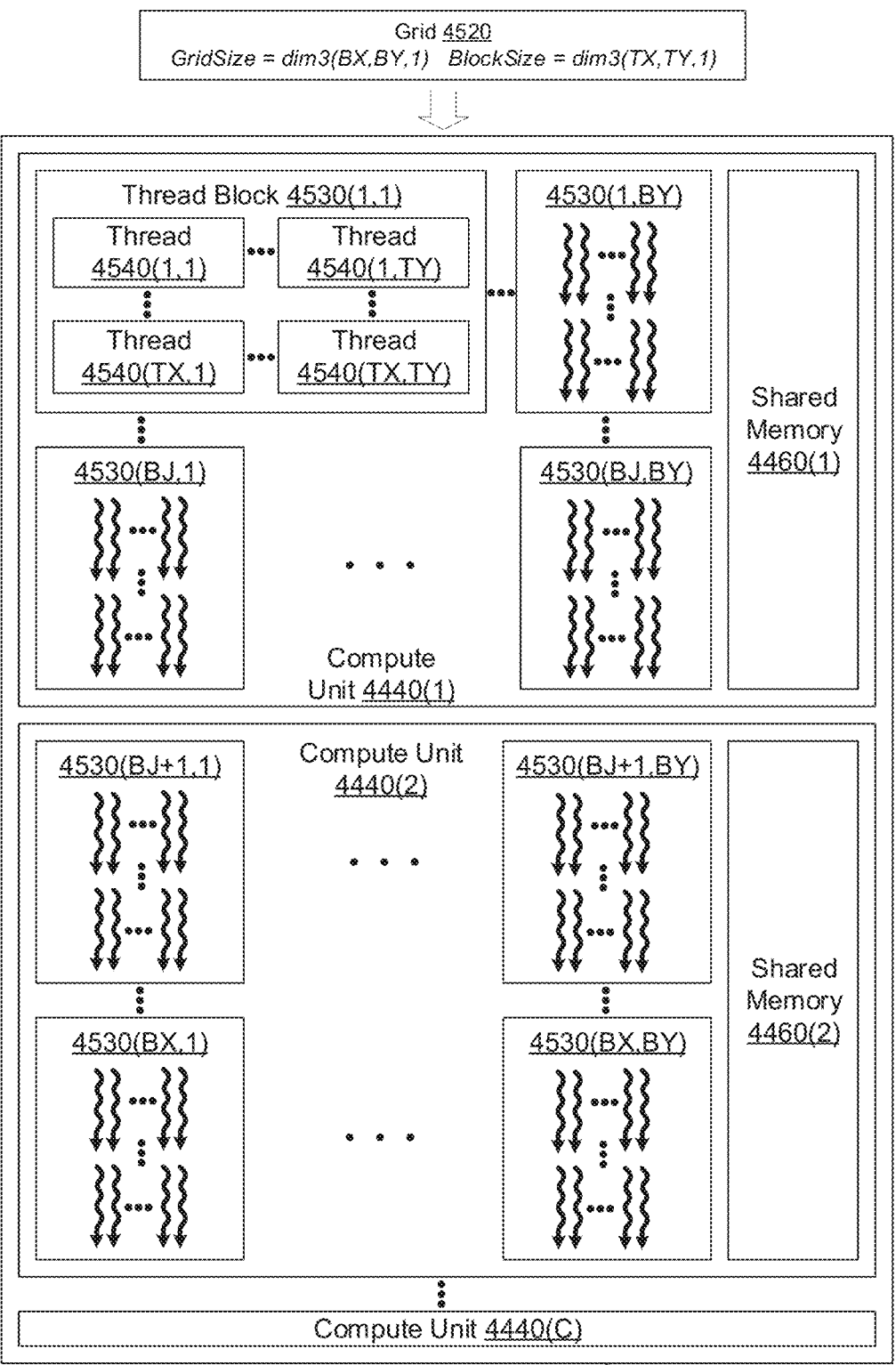
FIG. 45 illustrates how threads of an exemplary CUDA grid are mapped to different compute units of FIG. 44, in accordance with at least one embodiment.

FIG. 45 illustrates how threads of an exemplary CUDA grid 4520 are mapped to different compute units 4440 of FIG. 44, in accordance with at least one embodiment. In at least one embodiment and for explanatory purposes only, grid 4520 has a GridSize of BX by BY by 1 and a BlockSize of TX by TY by 1. In at least one embodiment, grid 4520 therefore includes, without limitation, (BX*BY) thread blocks 4530 and each thread block 4530 includes, without limitation, (TX*TY) threads 4540. Threads 4540 are depicted in FIG. 45 as squiggly arrows.

In at least one embodiment, grid 4520 is mapped to programmable processing unit 4420(1) that includes, without limitation, compute units 4440(1)-4440(C). In at least one embodiment and as shown, (BJ*BY) thread blocks 4530 are mapped to compute unit 4440(1), and the remaining thread blocks 4530 are mapped to compute unit 4440(2). In at least one embodiment, each thread block 4530 may include, without limitation, any number of warps, and each warp is mapped to a different SIMD unit 4450 of FIG. 44.

In at least one embodiment, warps in a given thread block 4530 may synchronize together and communicate through shared memory 4460 included in associated compute unit 4440. For example and in at least one embodiment, warps in thread block 4530(BJ,1) can synchronize together and communicate through shared memory 4460(1). For example and in at least one embodiment, warps in thread block 4530(BJ+1,1) can synchronize together and communicate through shared memory 4460(2).

At least one embodiment can be described in view of at least one of the following clauses:

1. A processor, comprising:
   one or more circuits to generate a third video frame based, at least in part, on one of a plurality of possible motions of one or more objects from a first video frame to a second video frame.

2. The processor of clause 1, wherein the one or more circuits are further to determine the plurality of possible motions based, at least in part, on backward pointing motion vectors associated with pixels of the second video frame.

3. The processor of any one of clauses 1-2, wherein the one or more objects are pixels.

4. The processor of any one of clauses 1-3, wherein the one or more circuits are further to generate the third video frame based, at least in part, on one or more motions of a camera viewpoint.

5. The processor of any one of clauses 1-4, wherein the one or more circuits are to select the one of the plurality of possible motions based, at least in part, on depth information.

6. The processor of any one of clauses 1-5, wherein the one or more circuits are to generate one or more additional video frames based, at least in part, on backward pointing motion vectors associated with pixels of the second video frame, and one or more motions of a camera viewpoint.

7. The processor of any one of clauses 1-6, wherein the one or more circuits are to generate the third video frame based, at least in part on receiving the first video frame, the second video frame, depth information, and backward pointing motion vectors from one or more buffers.

8. A machine-readable medium having stored thereon a set of instructions, which if performed by one or more processors, cause the one or more processors to at least: generate a third video frame based, at least in part, on one of a plurality of possible motions of one or more objects from a first video frame to a second video frame.

9. The machine-readable medium of clause 8, wherein each of the plurality of possible motions corresponds to a backward pointing motion vector from the second video frame to the first video frame in a set of backward pointing motion vectors associated with pixel depth values of the second video frame, and the instructions, which if performed by the one or more processors, further cause the one or more processors to: identify the one of the plurality of possible motions based, at least in part, on a depth value associated with one of the set of backward pointing motion vectors; and generate the third video frame based, at least in part, on the identified motion.

10. The machine-readable medium of any one of clauses 8-9, wherein the one or more objects are pixels.

11. The machine-readable medium of any one of clauses 8-10, wherein the instructions, which if performed by the one or more processors, further cause the one or more processors to:

determine a change in a camera viewpoint matrix between the first video frame and the second video frame; and generate the third video frame based, at least in part, on the determined change in the camera viewpoint matrix.

12. The machine-readable medium of any one of clauses 8-11, wherein the instructions, which if performed by the one or more processors, further cause the one or more processors to:

determine a set of occluded pixel locations in the third video frame;

determine a set of dis-occluded pixel locations in the third video frame; and generate the third video frame based, at least in part, on the set of occluded pixel locations and the set of dis-occluded pixel locations.

13. The machine-readable medium of any one of clauses 8-12, wherein the instructions, which if performed by the one or more processors, further cause the one or more processors to:

generate a set of estimated forward pointing motion vectors from the first video frame to the second video frame based, at least in part, on a set of backward pointing motion vectors, wherein the set of backward pointing motion vectors are from the second video frame to the first video frame; and generate the third video frame based, at least in part, on the generated set of estimated forward pointing motion vectors and the set of backward pointing motion vectors.

14. The machine-readable medium of any one of clauses 8-13, wherein the instructions, which if performed by the one or more processors, further cause the one or more processors to:

generate a set of intermediate forward pointing motion vectors from the third video frame to the second video frame based, at least in part, on the generated set of estimated forward pointing motion vectors;

generate a set of intermediate backward pointing motion vectors from the third video frame to the first video frame; and generate the third video frame based, at least in part, on the set of intermediate forward pointing motion vectors and the set of intermediate backward pointing motion vectors.

15. The machine-readable medium of any one of clauses 8-14, wherein the instructions, which if performed by the one or more processors, further cause the one or more processors to:

generate the third video frame based, at least in part, on receiving the first video frame, the second video frame, depth information, and backward pointing motion vectors from one or more buffers.

16. A method, comprising:

generating a third video frame based, at least in part, on one of a plurality of possible motions of one or more objects from a first video frame to a second video frame.

17. The method of clause 16, further comprising determining the plurality of possible motions based, at least in part, on backward pointing motion vectors associated with pixels of the second video frame, wherein each of the plurality of possible motions corresponds to a backward pointing motion vector that points to a same pixel location in the first video frame.

18. The method of any one of clauses 16-17, wherein the one or more objects are pixels.

19. The method of any one of clauses 16-18, further comprising:

determining one or more motions of a camera viewpoint between the first video frame and the second video frame; and generating the third video frame based, at least in part, on the determined one or more motions of the camera viewpoint.

20. The method of any one of clauses 16-19, wherein selecting the one of the plurality of possible motions is based, at least in part, on depth information of pixels in the second video frame.

21. The method of any one of clauses 16-20, further comprising:

generating an occlusion mask;

generating a dis-occlusion mask; and generating the third video frame based, at least in part, on the occlusion mask and the dis-occlusion mask.

22. The method of any one of clauses 16-21, wherein generating the third video frame is based, at least in part, on receiving the first video frame, the second video frame, depth information, and backward pointing motion vectors from one or more buffers.

23. A system, comprising:

one or more processors to generate a third video frame based, at least in part, on one of a plurality of possible motions of one or more objects from a first video frame to a second video frame; and one or more memories to store the third video frame.

24. The system of clause 23, wherein the one or more processors are further to:

determine the plurality of possible motions based, at least in part, on backward pointing motion vectors associated with pixels of the second video frame; and select one of the plurality of possible motions based, at least in part, on depth information.

25. The system of any one of clauses 23-24, wherein the one or more objects are pixels.

26. The system of any one of clauses 23-25, wherein the one or more processors are further to:

determine a camera viewpoint change between the first video frame and the second video frame; and generate the third video frame based, at least in part, on the determined camera viewpoint change.

27. The system of any one of clauses 23-26, wherein the one or more processors are further to:

identify a pixel location of the third video frame that has a corresponding pixel identified using an intermediate motion vector in only one of the first video frame and the second video frame, and sample pixel data of only the video frame having the corresponding pixel for the identified pixel location.

28. The system of any one of clauses 23-27, wherein the one or more processors are to generate the third video frame based, at least in part, on receiving the first video frame, the second video frame, depth information, and backward pointing motion vectors from one or more buffers.

29. A processor, comprising:

one or more circuits to:

sample a first set of pixel data of a first video frame;

sample a second set of pixel data of a second video frame based, at least in part, on a set of forward pointing motion vectors from the first video frame to the second video frame; and generate an intermediate video frame between the first video frame and the second video frame based, at least in part, on the first set of pixel data and the second set of pixel data.

30. The processor of clause 29, wherein the one or more circuits are to sample the first set of pixel data based, at least in part, on a set of backward pointing motion vectors from the second video frame to the first video frame.

31. The processor of any one of clauses 29-30, wherein the one or more circuits are to identify a pixel of the intermediate video frame that has a corresponding pixel identified using a motion vector in only one of the first video frame and the second video frame, and sample pixel data of only the video frame having the corresponding pixel for the identified pixel.

32. The processor of any one of clauses 29-31, wherein the one or more circuits are also to generate a set of intermediate forward pointing motion vectors from the intermediate video frame to the second video frame based, at least in part, on the set of forward pointing motion vectors, and wherein the one or more circuits are to sample the second set of pixel data based, at least in part, on the set of intermediate forward pointing motion vectors.

33. The processor of any one of clauses 29-32, wherein the one or more circuits are further to:

generate a set of intermediate forward pointing motion vectors from the intermediate video frame to the second video frame;

generate a set of intermediate backward pointing motion vectors from the intermediate video frame to the first video frame; and generate the intermediate video frame based, at least in part, on the set of intermediate forward pointing motion vectors and the set of intermediate backward pointing motion vectors.

34. The processor of any one of clauses 29-33, wherein the one or more circuits are further to:

generate the set of intermediate forward pointing motion vectors based, at least in part, on depth values of pixels in the first video frame; and generate the set of intermediate backward pointing motion vectors based, at least in part, on depth values of pixels in the second video frame.

35. The processor of any one of clauses 29-34, wherein the one or more circuits are further to:

generate an occlusion mask;

generate a dis-occlusion mask; and generate the intermediate video frame based, at least in part, on the occlusion mask and the dis-occlusion mask.

36. The processor of any one of clauses 29-35, wherein the one or more circuits are to generate the intermediate frame based, at least in part, on receiving the first video frame, the second video frame, depth information, forward pointing motion vectors, and backward pointing motion vectors from one or more buffers.

37. The processor of any one of clauses 29-36, wherein each forward pointing motion vector in the set of forward pointing motion vectors comprises a projected vertex movement.

38. A machine-readable medium having stored thereon a set of instructions, which if performed by one or more processors, cause the one or more processors to at least:

sample a first set of pixel data of a first video frame;

sample a second set of pixel data of a second video frame based, at least in part, on a set of forward pointing motion vectors from the first video frame to the second video frame; and generate an intermediate video frame between the first video frame and the second video frame based, at least in part, on the first set of pixel data and the second set of pixel data.

39. The machine-readable medium of clause 38, wherein the instructions, which if performed by the one or more processors, further cause the one or more processors to:

sample the first set of pixel data based, at least in part, on a set of backward pointing motion vectors from the second video frame to the first video frame.

40. The machine-readable medium of any one of clauses 38-39, wherein the intermediate video frame is a first intermediate video frame, and the instructions, which if performed by the one or more processors, further cause the one or more processors to:

generate a second intermediate video frame between the first video frame and the second video frame based, at least in part, on the first set of pixel data and the second set of pixel data.

41. The machine-readable medium of any one of clauses 38-40, wherein the instructions, which if performed by the one or more processors, further cause the one or more processors to:

generate the intermediate video frame based, at least in part, on a weighted average of pixel color information from the first set of pixel data and the second set of pixel data for pixels of the intermediate video frame that have a corresponding pixel in the first video frame identified using a first motion vector and in the second video frame identified using a second motion vector.

42. The machine-readable medium of any one of clauses 38-41, wherein the pixel color information is a first set of RGB values from the first set of pixel data, and a second set of RGB values from the second set of pixel data.

43. The machine-readable medium of any one of clauses 38-42, wherein the instructions, which if performed by the one or more processors, further cause the one or more processors to:

determine set of occluded pixels;

determine a set of dis-occluded pixels; and generate the intermediate video frame based, at least in part, on the set of occluded pixels and the set of dis-occluded pixels.

44. The machine-readable medium of any one of clauses 38-43, wherein each forward pointing motion vector in the set of forward pointing motion vectors comprises a projected vertex movement.

45. A method, comprising;

sampling a first set of pixel data of a first video frame;

sampling a second set of pixel data of a second video frame based, at least in part, on a set of forward pointing motion vectors from the first video frame to the second video frame; and generating an intermediate video frame between the first video frame and the second video frame based, at least in part, on the first set of pixel data and the second set of pixel data.

46. The method of clause 45, wherein sampling the first set of pixel data is based, at least in part, on a set of backward pointing motion vectors from the second video frame to the first video frame.

47. The method of any one of clauses 45-46, further comprising:

generating a set of intermediate forward pointing motion vectors from the intermediate video frame to the second video frame; and generating a set of intermediate backward pointing motion vectors from the intermediate video frame to the first video frame, wherein sampling the first set of pixel data is based, at least in part, on the set of intermediate backward pointing motion vectors.

48. The method of any one of clauses 45-47, wherein generating the set of intermediate forward pointing motion vectors is based, at least in part, on depth values of pixels in the first video frame.

49. The method of any one of clauses 45-48, further comprising:

identifying a pixel of the intermediate video frame that does not have a corresponding pixel in the second video frame identified using a forward pointing motion vector, or a corresponding pixel in the first video frame identified using a backward pointing motion vector;

setting the identified pixel of the intermediate video frame to a color of one of a pixel at a same location as the identified pixel in the first video frame or the second video frame based, at least in part, on depth values of the pixels at the same location of the identified pixel in the first video frame and the second video frame.

50. The method of any one of clauses 45-49, further comprising:

generating an occlusion mask;

generating a dis-occlusion mask;

sampling the first set of pixel data based, at least in part, on the occlusion mask; and sampling the second set of pixel data based, at least in part, on the dis-occlusion mask.

51. The method of any one of clauses 45-50, wherein each forward pointing motion vector in the set of forward pointing motion vectors comprises a projected vertex movement.

52. A system, comprising:

one or more processors to:

sample a first set of pixel data of a first video frame;

sample a second set of pixel data of a second video frame based, at least in part, on a set of forward pointing motion vectors from the first video frame to the second video frame; and generate an intermediate video frame between the first video frame and the second video frame based, at least in part, on the first set of pixel data and the second set of pixel data; and one or more memories to store the intermediate video frame.

53. The system of clause 52, wherein the one or more processors are to:

receive the set of forward pointing motion vectors and a set of backward pointing motion vectors from one or more buffers; and sample the first set of pixel data based, at least in part, on the set of backward pointing motion vectors.

54. The system of any one of clauses 52-53, wherein the one or more processors are to:

receive a first set of depth values from a buffer;

generate a set of intermediate forward pointing motion vectors from the intermediate video frame to the second video frame based, at least in part, on the set of forward pointing motion vectors and the first set of depth values; and generate the intermediate video frame based, at least in part, on the set of intermediate forward pointing motion vectors.

55. The system of any one of clauses 52-54, wherein the one or more processors are to:

receive a second set of depth values;

generate a set of intermediate backward pointing motion vectors from the intermediate video frame to the first video frame based, at least in part, on a set of backward pointing motion vectors and the second set of depth values; and generate the intermediate video frame based, at least in part, on the set of intermediate backward pointing motion vectors.

56. The system of any one of clauses 52-55, wherein the one or more processors are to:

generate an occlusion mask;

generate a dis-occlusion mask; and generate the intermediate video frame based, at least in part, on the occlusion mask and the dis-occlusion mask.

57. The system of any one of clauses 52-56, wherein the one or more processors are further to:

generate one or more additional intermediate video frames between the first video frame and the second video frame based, at least in part, on the first video frame, the second video frame, the set of forward pointing motion vectors, a set of backward pointing motion vectors, and a set of depth indicators.

58. The system of any one of clauses 52-57, wherein each forward pointing motion vector in the set of forward pointing motion vectors comprises a projected vertex movement.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:
one or more circuits to:
sample a first set of pixel data from a first video frame;
sample a second set of pixel data from a second video frame based, at least in part, on a set of forward pointing motion vectors from the first video frame to a pixel location in the second video frame, wherein the first video frame and the second video frame were captured at different times;
determine weight factors to be applied to the first and second sets of pixel data by:
generating an occlusion mask and a dis-occlusion mask;
for pixels not affected by the occlusion mask or the dis-occlusion mask, determining the weight factors based at least in part on first and second amounts of time between an intermediate video frame and the first and second video frames, respectively; and
for pixels affected by the occlusion mask or the dis-occlusion mask, selecting the weight factors from a set of predetermined values; and
generate the intermediate video frame at least in part by applying the weight factors to the first set of pixel data and the second set of pixel data.

2. The processor of claim 1, wherein the one or more circuits are to sample the first set of pixel data based, at least in part, on a set of backward pointing motion vectors from the second video frame to the first video frame.

3. The processor of claim 1, wherein a portion of the pixels affected by the occlusion mask or the dis-occlusion mask each have a corresponding pixel identified using an intermediate motion vector in only one of the first video frame or the second video frame, and for the portion, pixel data is sampled from only the one of the first video frame or the second video frame.

4. The processor of claim 1, wherein the one or more circuits are also to generate a set of intermediate forward pointing motion vectors from the intermediate video frame to the second video frame based, at least in part, on the set of forward pointing motion vectors, and wherein the one or more circuits are to sample the second set of pixel data based, at least in part, on the set of intermediate forward pointing motion vectors.

5. The processor of claim 1, wherein the one or more circuits are further to:
generate a set of intermediate forward pointing motion vectors from the intermediate video frame to the second video frame;
generate a set of intermediate backward pointing motion vectors from the intermediate video frame to the first video frame; and
generate the intermediate video frame based, at least in part, on the set of intermediate forward pointing motion vectors and the set of intermediate backward pointing motion vectors.

6. The processor of claim 5, wherein the one or more circuits are further to:
generate the set of intermediate forward pointing motion vectors based, at least in part, on depth values of pixels in the first video frame; and
generate the set of intermediate backward pointing motion vectors based, at least in part, on depth values of pixels in the second video frame.

7. The processor of claim 1, wherein the set of predetermined values comprises one and zero.

8. The processor of claim 1, wherein the one or more circuits are to generate the intermediate video frame based, at least in part, on receiving the first video frame, the second video frame, depth value associated with at least pixel data of a first portion of the first video frame or a second portion of the second video frame, the set of weight factors, forward pointing motion vectors, and backward pointing motion vectors from one or more buffers.

9. The processor of claim 1, wherein each forward pointing motion vector in the set of forward pointing motion vectors comprises a projected vertex movement.

10. A non-transitory computer-readable storage medium having stored thereon a set of instructions which, if performed by one or more processors, causes the one or more processors to at least:
sample a first set of pixel data from a first video frame;
sample a second set of pixel data from a second video frame based, at least in part, on a set of forward pointing motion vectors from the first video frame to a pixel location in the second video frame, wherein the first and second video frames were captured at different times;
determine weight factors to be applied to the first and second sets of pixel data;
generate an occlusion mask and a dis-occlusion mask, for pixels not affected by the occlusion mask or the dis-occlusion mask, the weight factors to be based at least in part on first and second amounts of time between an intermediate video frame and the first and second video frames, respectively, and for pixels affected by the occlusion mask or the dis-occlusion mask, the weight factors to be selected from a set of predetermined values; and generate the intermediate video frame by applying the weight factors to the first set of pixel data and the second set of pixel data.

11. The non-transitory computer-readable storage medium of claim 10, wherein the set of instructions, if performed by the one or more processors, further cause the one or more processors to:
sample the first set of pixel data based, at least in part, on a set of backward pointing motion vectors from the second video frame to the first video frame.

12. The non-transitory computer-readable storage medium of claim 10, wherein the intermediate video frame is a first intermediate video frame, and wherein the set of instructions, if performed by the one or more processors, further cause the one or more processors to:
generate a second intermediate video frame between the first video frame and the second video frame based, at least in part, on the first set of pixel data and the second set of pixel data.

13. The non-transitory computer-readable storage medium of claim 10, wherein the set of instructions, if performed by the one or more processors, further cause the one or more processors to:
generate the intermediate video frame based, at least in part, on a weighted average of pixel color information from the first set of pixel data and the second set of pixel data for pixels of the intermediate video frame that have a corresponding pixel in the first video frame identified using a first intermediate motion vector and a corresponding pixel in the second video frame identified using a second intermediate motion vector.

14. The non-transitory computer-readable storage medium of claim 13, wherein the pixel color information comprises a first set of RGB values from the first set of pixel data, and a second set of RGB values from the second set of pixel data.

15. The non-transitory computer-readable storage medium of claim 10, wherein the set of predetermined values comprises one and zero.

16. The non-transitory computer-readable storage medium of claim 10, wherein each forward pointing motion vector in the set of forward pointing motion vectors comprises a projected vertex movement.

17. The non-transitory computer-readable storage medium of claim 10, wherein each forward pointing motion vector in the set of forward pointing motion vectors is from a respective one of a plurality of pixel locations in the first video frame to the pixel location in the second video frame.

18. A method, comprising:
sampling a first set of pixel data from a first video frame;
sampling a second set of pixel data from a second video frame based, at least in part, on a set of forward pointing motion vectors from the first video frame to a pixel location in the second video frame, wherein the first and second video frames were captured at different times;
generating an occlusion mask and a dis-occlusion mask;
for pixels not affected by the occlusion mask or the dis-occlusion mask, determining weight factors based at least in part on first and second amounts of time between an intermediate video frame and the first and second video frames, respectively;
for pixels affected by the occlusion mask or the dis-occlusion mask, selecting the weight factors from a set of predetermined values; and generating the intermediate video frame at least in part by applying the weight factors to the first set of pixel data and the second set of pixel data.

19. The method of claim 18, wherein sampling the first set of pixel data is based, at least in part, on a set of backward pointing motion vectors from the second video frame to the first video frame.

20. The method of claim 18, further comprising:
generating a set of intermediate forward pointing motion vectors from the intermediate video frame to the second video frame; and
generating a set of intermediate backward pointing motion vectors from the intermediate video frame to the first video frame, wherein sampling the first set of pixel data is based, at least in part, on the set of intermediate backward pointing motion vectors.

21. The method of claim 20, wherein generating the set of intermediate forward pointing motion vectors is based, at least in part, on depth values of pixels in the first video frame.

22. The method of claim 18, further comprising:
identifying a pixel of the intermediate video frame that does not have a corresponding pixel in the second video frame identified using a forward pointing motion vector, or a corresponding pixel in the first video frame identified using a backward pointing motion vector; and
setting the identified pixel of the intermediate video frame to a color of one of a pixel at a same location as the identified pixel in the first video frame or the second video frame based, at least in part, on depth values of the pixels at the same location as the identified pixel in the first video frame and the second video frame.

23. The method of claim 18, wherein the set of predetermined values comprises one and zero.

24. The method of claim 18, wherein each forward pointing motion vector in the set of forward pointing motion vectors comprises a projected vertex movement.

25. The method of claim 18, further comprising:
displaying the generated intermediate video frame.

26. A system, comprising:
one or more processors to:
sample a first set of pixel data from a first video frame;
sample a second set of pixel data from a second video frame based, at least in part, on a set of forward pointing motion vectors from the first video frame to a pixel location in the second video frame, wherein the first video frame and the second video frame were captured at different times;
determine weight factors to be applied to the first and second sets of pixel data;
generate an occlusion mask and a dis-occlusion mask, for any pixels not affected by the occlusion mask or the dis-occlusion mask, the weight factors to be based at least in part on first and second amounts of time between an intermediate video frame and the first and second video frames, respectively, and for any pixels affected by the occlusion mask or the dis-occlusion mask, the weight factors to be selected from a set of predetermined values; and
generate the intermediate video frame at least in part by applying the weight factors to the first set of pixel data and the second set of pixel data.

27. The system of claim 26, wherein the one or more processors are further to:

receive the set of forward pointing motion vectors and a set of backward pointing motion vectors from one or more buffers; and sample the first set of pixel data based, at least in part, on the set of backward pointing motion vectors.

28. The system of claim 27, wherein the one or more processors are to:

generate the intermediate video frame at least in part by forward warping the set of forward pointing motion vectors and the set of backward pointing motion vectors based, at least in part, on the sampled first set of pixel data and the sampled second set of pixel data.

29. The system of claim 26, wherein the one or more processors are further to:

receive depth information that includes a first set of depth values from a buffer;

generate a set of intermediate forward pointing motion vectors from the intermediate video frame to the second video frame based, at least in part, on the set of forward pointing motion vectors and the first set of depth values; and generate the intermediate video frame based, at least in part, on the set of intermediate forward pointing motion vectors.

30. The system of claim 29, wherein the one or more processors are further to:

receive a second set of depth values;

generate a set of intermediate backward pointing motion vectors from the intermediate video frame to the first video frame based, at least in part, on a set of backward pointing motion vectors and the second set of depth values; and generate the intermediate video frame based, at least in part, on the set of intermediate backward pointing motion vectors.

31. The system of claim 24, further comprising:

one or more memories to store the intermediate video frame.

32. The system of claim 26, wherein the one or more processors are further to:

generate one or more additional intermediate video frames between the first video frame and the second video frame based, at least in part, on the first video frame, the second video frame, the set of forward pointing motion vectors, a set of backward pointing motion vectors, and a set of depth indicators.

33. The system of claim 26, wherein each forward pointing motion vector in the set of forward pointing motion vectors comprises a projected vertex movement.

34. The system of claim 24, wherein the set of predetermined values comprises one and zero.

35. The system of claim 26, wherein:

the first and second video frames are consecutive video frames; and the intermediate video frame is interpolated between the first and second video frames.

* * * * *